United States Patent
Story et al.

(10) Patent No.: US 11,922,678 B2
(45) Date of Patent: Mar. 5, 2024

(54) CARBON ESTIMATION

(71) Applicant: Descartes Labs, Inc., Santa Fe, NM (US)

(72) Inventors: Kyle Tyler Story, Burlingame, CA (US); Jason David Schatz, Santa Fe, NM (US); Manuel Weber, San Francisco, CA (US)

(73) Assignee: Descartes Labs, Inc., Santa Fe, NM (US)

( * ) Notice: Subject to any disclaimer, the term of this patent is extended or adjusted under 35 U.S.C. 154(b) by 0 days.

(21) Appl. No.: 18/139,824

(22) Filed: Apr. 26, 2023

(65) Prior Publication Data

US 2023/0351732 A1 Nov. 2, 2023

Related U.S. Application Data

(60) Provisional application No. 63/403,263, filed on Sep. 1, 2022, provisional application No. 63/335,363, filed on Apr. 27, 2022.

(51) Int. Cl.
| | |
|---|---|
| *G06V 10/774* | (2022.01) |
| *G06V 20/10* | (2022.01) |
| *G06V 20/13* | (2022.01) |
| *G06V 20/70* | (2022.01) |

(52) U.S. Cl.
CPC ............ *G06V 10/774* (2022.01); *G06V 20/13* (2022.01); *G06V 20/194* (2022.01); *G06V 20/70* (2022.01)

(58) Field of Classification Search
CPC .... G06V 10/774; G06V 20/13; G06V 20/194; G06V 20/70
See application file for complete search history.

(56) References Cited

U.S. PATENT DOCUMENTS

| | | | |
|---|---|---|---|
| 2017/0148222 A1* | 5/2017 | Holzer | H04N 23/698 |
| 2017/0169607 A1* | 6/2017 | Miller | G06V 20/176 |
| 2019/0205748 A1* | 7/2019 | Fukuda | G06N 3/044 |
| 2019/0378006 A1* | 12/2019 | Fukuda | G06N 3/08 |
| 2020/0309689 A1* | 10/2020 | Nguyen | G01N 21/359 |
| 2021/0034971 A1* | 2/2021 | Han | G06N 3/045 |
| 2021/0056718 A1* | 2/2021 | Wang | G06T 5/50 |
| 2021/0118097 A1* | 4/2021 | Guan | G06T 5/001 |
| 2021/0201023 A1* | 7/2021 | Zhao | G06V 10/267 |
| 2021/0201460 A1* | 7/2021 | Gong | G06T 7/001 |
| 2021/0303930 A1* | 9/2021 | Wang | G06N 3/084 |
| 2022/0050995 A1* | 2/2022 | Laszlo | G06F 18/2163 |
| 2022/0156965 A1* | 5/2022 | Zheng | G06F 18/214 |
| 2022/0188622 A1* | 6/2022 | Nagano | G06F 18/2185 |
| 2022/0301301 A1* | 9/2022 | Marciano, Jr. | G06F 18/217 |
| 2022/0335209 A1* | 10/2022 | Kuo | G06N 3/09 |
| 2022/0358658 A1* | 11/2022 | Chaurasia | G06N 3/045 |
| 2023/0028237 A1* | 1/2023 | Wei | G06T 7/77 |
| 2023/0053716 A1* | 2/2023 | Weinzaepfel | G06N 3/04 |
| 2023/0091396 A1* | 3/2023 | Khoreva | G06V 10/774 382/157 |
| 2023/0154167 A1* | 5/2023 | Li | G06T 7/73 382/159 |
| 2023/0208539 A1* | 6/2023 | Condon | H04B 7/18519 455/12.1 |

* cited by examiner

*Primary Examiner* — Ming Y Hon
(74) *Attorney, Agent, or Firm* — Van Pelt, Yi & James LLP

(57) ABSTRACT

Training an estimation model using soft labels includes receiving an image. It further includes generating a continuous target map corresponding to the image that includes hard labels and soft labels. A model is trained using the corresponding continuous target map.

19 Claims, 34 Drawing Sheets

Obtain list of images to download

Optional [
    filter list of images [
        obtain metadata for images
        apply filter to select images of a given type or in a given region
            or for a given period of time
    ]
]

Download data
For each image in list:
    Check if we have already retrieved image
    If not [
    Download image
    copy image to long-term cloud storage
    if download or copy fails:
        retry until success
]

FIG. 6

Pre-process data
For each new image in cloud storage:
    Tile image
    Optional [ interpolate / reproject / convert to reflectance ]
    Copy processed image tiles to cloud storage
    if anything fails:
        retry until success
    Put metadata entry in key/value store for each image tile
]

FIG. 7

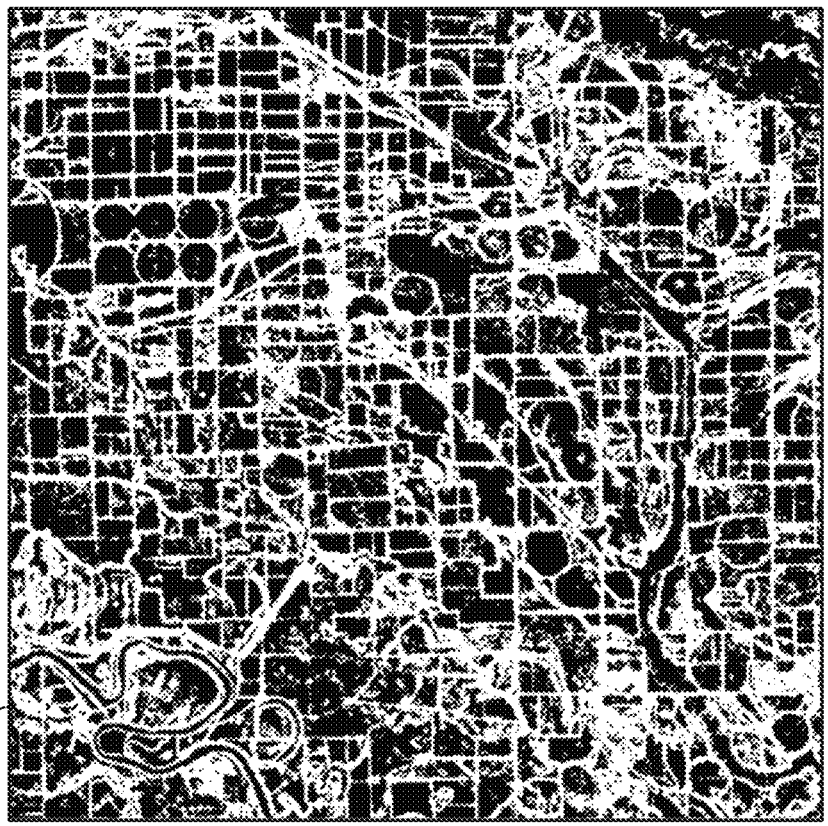
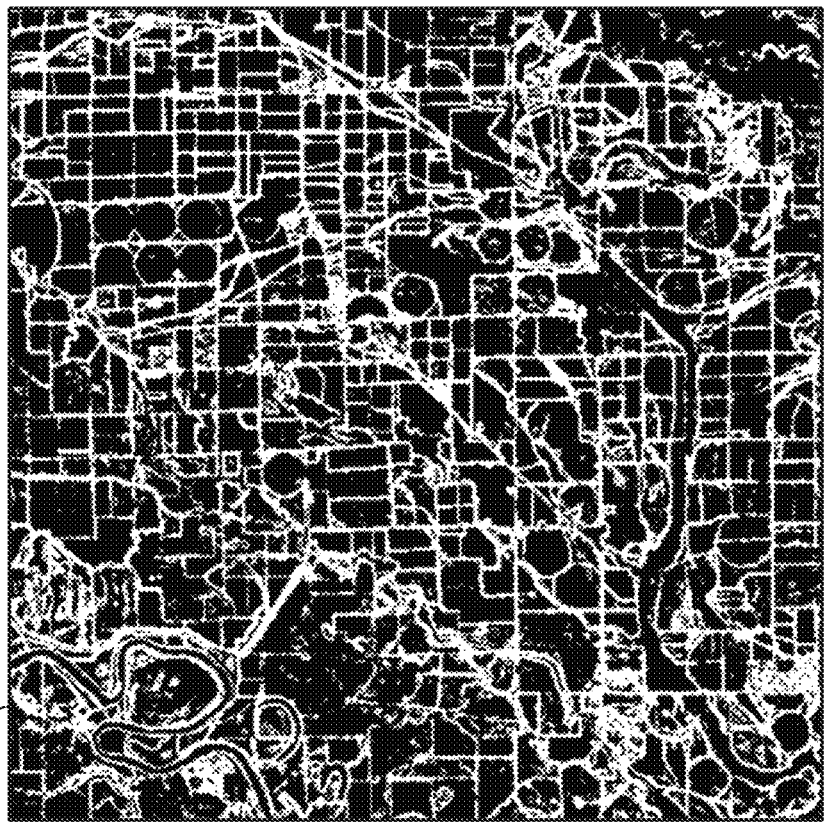
FIG. 14

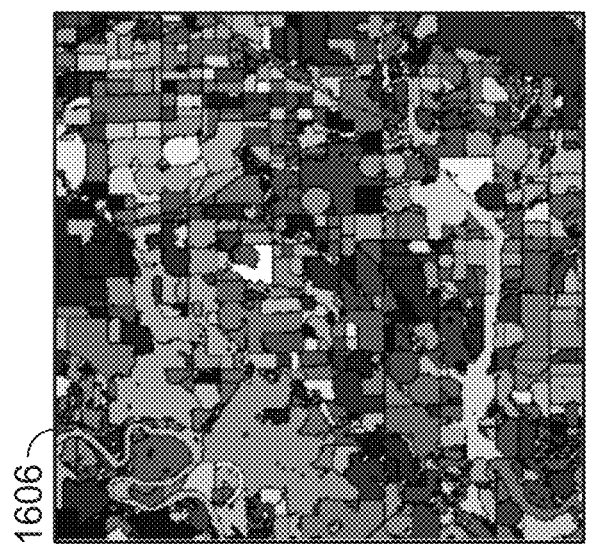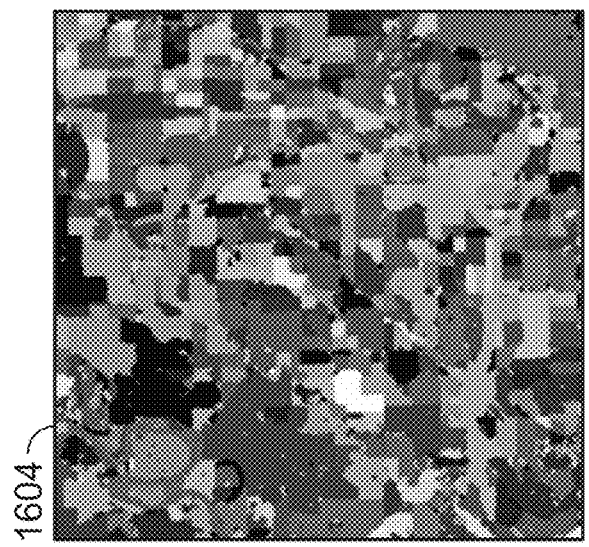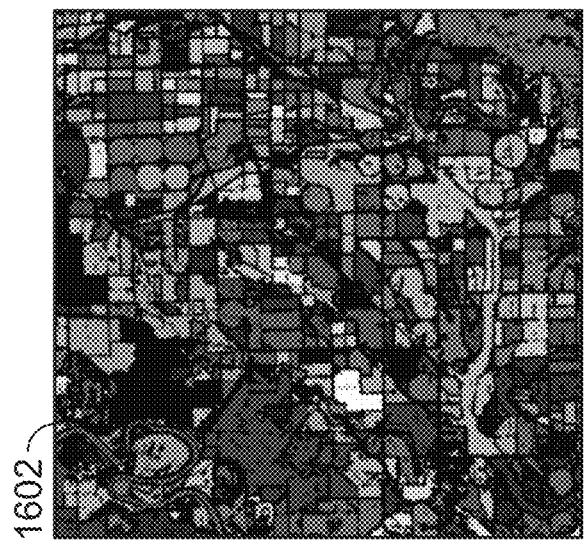
FIG. 16

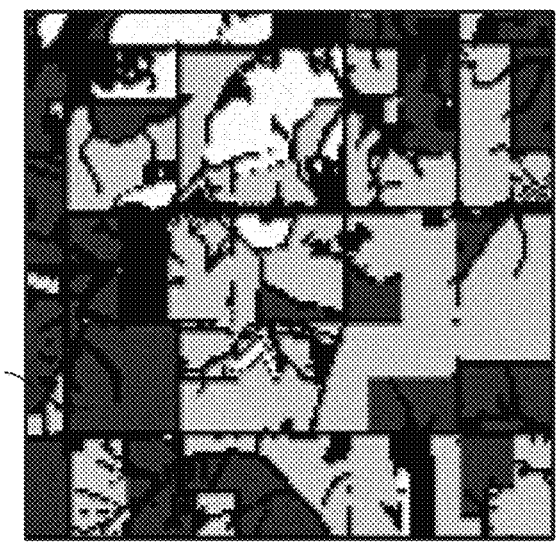
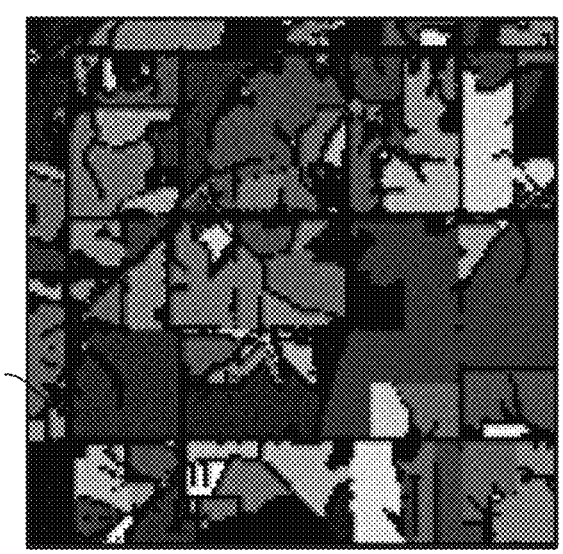
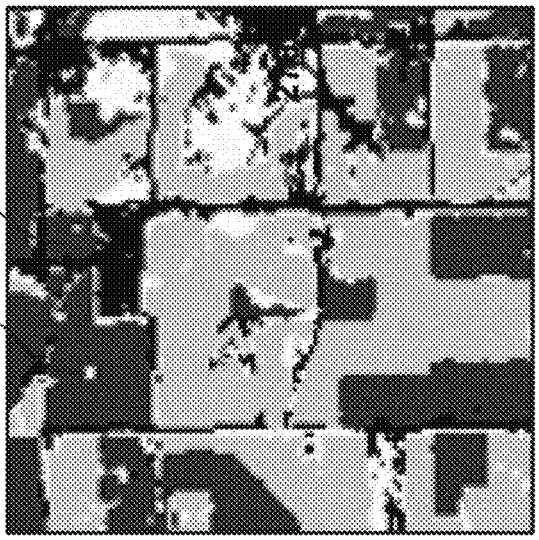
FIG. 20C
FIG. 20B
FIG. 20A

2450

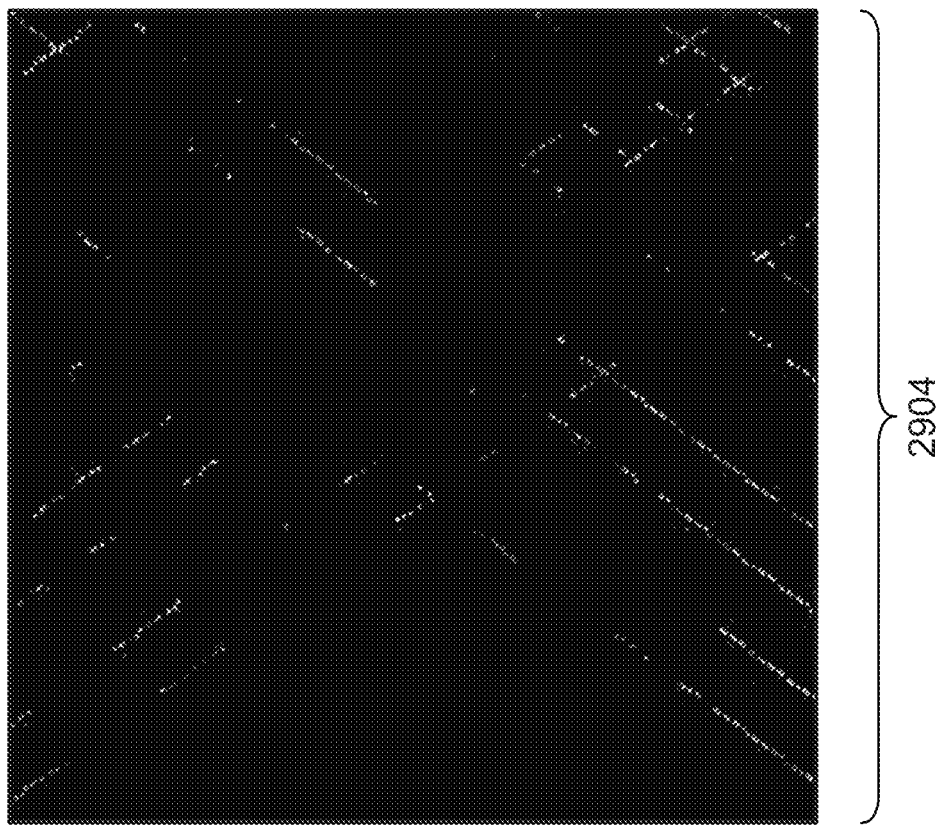
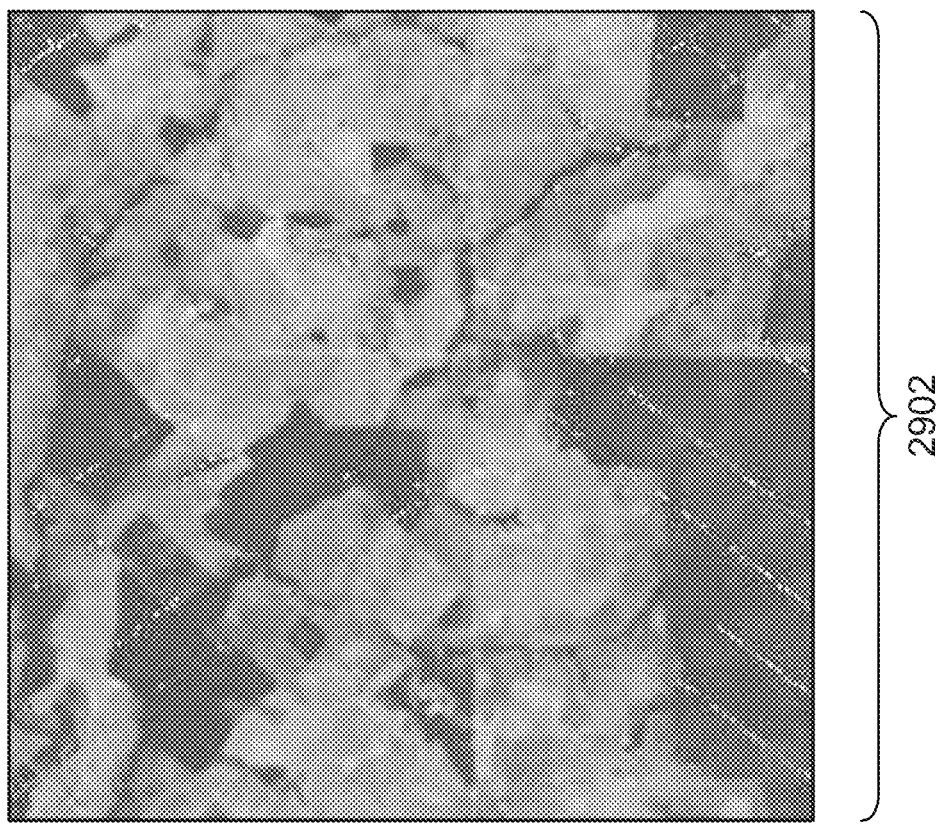
FIG. 29

CARBON ESTIMATION

CROSS REFERENCE TO OTHER APPLICATIONS

This application claims priority to U.S. Provisional Patent Application No. 63/335,363 entitled CARBON ESTIMATION filed Apr. 27, 2022 which is incorporated herein by reference for all purposes, and claims priority to U.S. Provisional Patent Application No. 63/403,263 entitled ABOVE GROUND BIOMASS ESTIMATION filed Sep. 1, 2022 which is incorporated herein by reference for all purposes.

BACKGROUND OF THE INVENTION

There are various contexts and applications, such as for environmental monitoring, for which it would be beneficial to have fully spatial models for making estimations. However, development of accurate models can be challenging when the available training data is sparse. Improved techniques for training spatial models on sparse training data are needed.

BRIEF DESCRIPTION OF THE DRAWINGS

Various embodiments of the invention are disclosed in the following detailed description and the accompanying drawings.

FIG. 6 depicts an example of pseudocode for ingesting data.

FIG. 7 depicts an example of pseudocode for preprocessing data.

FIG. 14 depicts gradient presence images.

FIG. 16 depicts boundary maps.

FIG. 20A illustrates an example of a portion of land classified without use of a boundary map.

FIG. 20B illustrates an example of a boundary map.

FIG. 20C illustrates an example result of providing the time series used to produce a classification map, and a boundary map, to a classifier.

FIG. 29 illustrates an embodiment of a sample input image and corresponding ground truth data.

DETAILED DESCRIPTION

Figure 1:
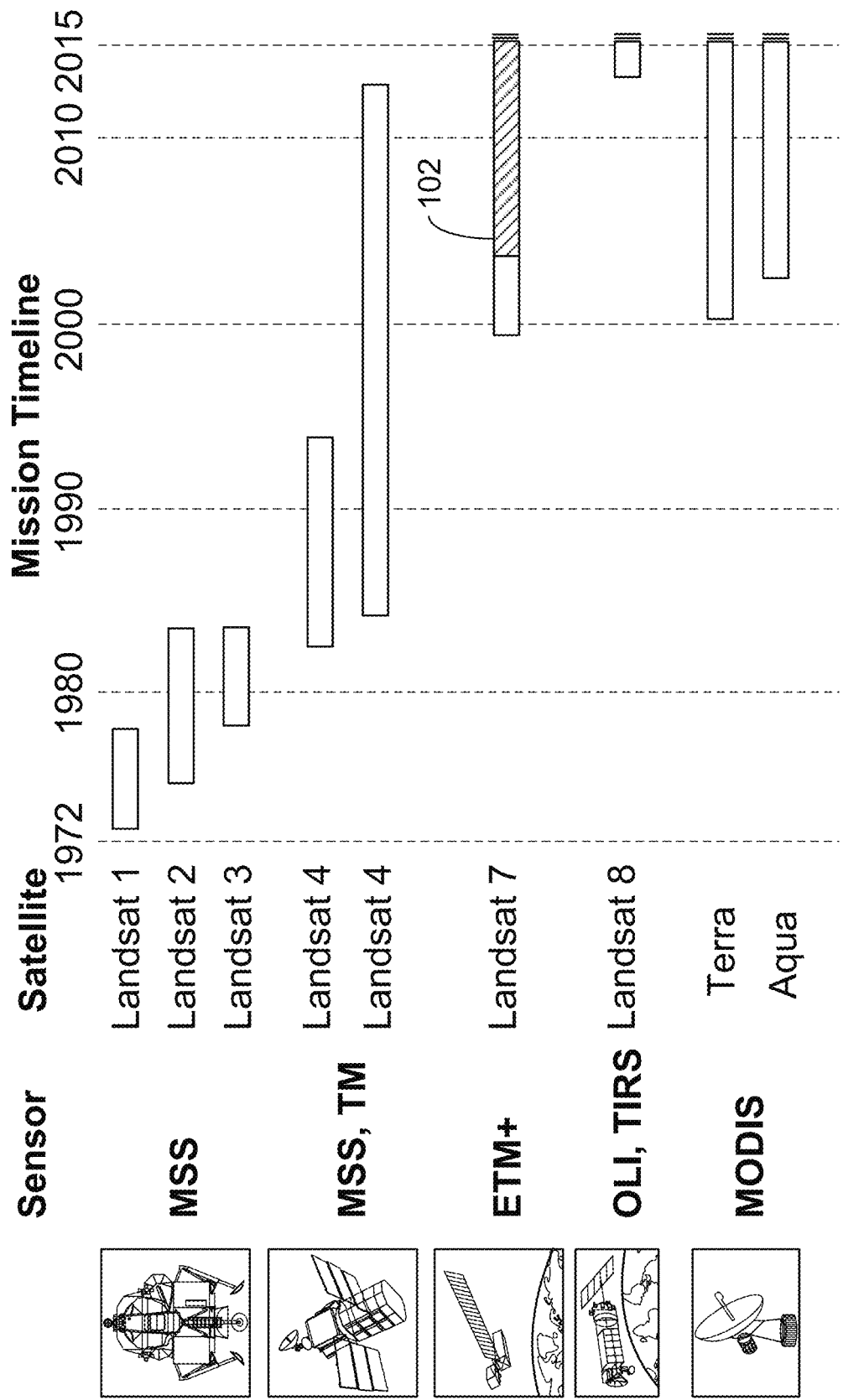
FIG. 1 shows NASA/USGS Landsat and MODIS satellites and sensors providing data that can be processed using embodiments of techniques described herein.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques described herein can be used to process and analyze data such as multi-decadal observations of the Earth by constellations of satellites. For example, described herein are techniques for operating on over a petabyte (8×1015 bits) of compressed raw data from 2.8 quadrillion pixels (2.8 petapixels) acquired by sources such as the U.S. Landsat and MODIS Earth remote sensing programs over the past forty years. As described herein, such data can be converted from a raw form to a calibrated, georeferenced, and multi-resolution tiled format suitable for further additional processing/analysis, facilitating further space and time-domain analysis, including fusion of the Landsat and MODIS (and other) datasets, as applicable. The techniques described herein are efficient—allowing, in various embodiments, for the detection, in real time, of events that occur anywhere on the globe. The techniques described herein can be deployed using commodity cloud computing resources (using a "Cloud architecture"), but can also be deployed using other architectures, including traditional high-performance computing architectures, in various embodiments, as applicable.

I. OVERVIEW

A. Overview of Example Data Sources

The NASA/USGS Landsat program has routinely collected approximately monthly snapshots of the world's land surface since 1972. The Landsat program has evolved over its lifetime, with the eight Landsat satellites hosting a series of moderate-resolution multispectral imaging systems, from the Multispectral Scanner (MSS), to the Thematic Mapper (TM) and Enhanced Thematic Mapper (ETM+), and most recently the Operational Land Imager (OLI) and Thermal Infrared Sensor (TIRS). FIG. 1 shows NASA/USGS Landsat and MODIS satellites and sensors providing data that can be processed using embodiments of techniques described herein. Landsat 6 failed on launch, and a failure in the Landsat 7 scanline corrector (SLC) is indicated in region 102. Complementing the Landsat program is a range of lower-spatial resolution systems optimized for daily global imaging, of which the most widely used is the Moderate Resolution Imaging Spectroradiometer (MODIS) instrument on the NASA satellites EOS Terra (launched 1999) and Aqua (launched 2002). Landsat and MODIS are two examples of sources of observational data. Other sources can also be processed/analyzed in addition to/instead of Landsat/MODIS data in accordance with various embodiments. For example, observational data collected from other constellations (e.g., PlanetScope, RapidEye, Dove, Sentinel-1, and Sentinel-2), as well as higher-resolution imagery (e.g., collected via airplane/drones) can also be used in accordance with embodiments of techniques described herein.

Figure 2:
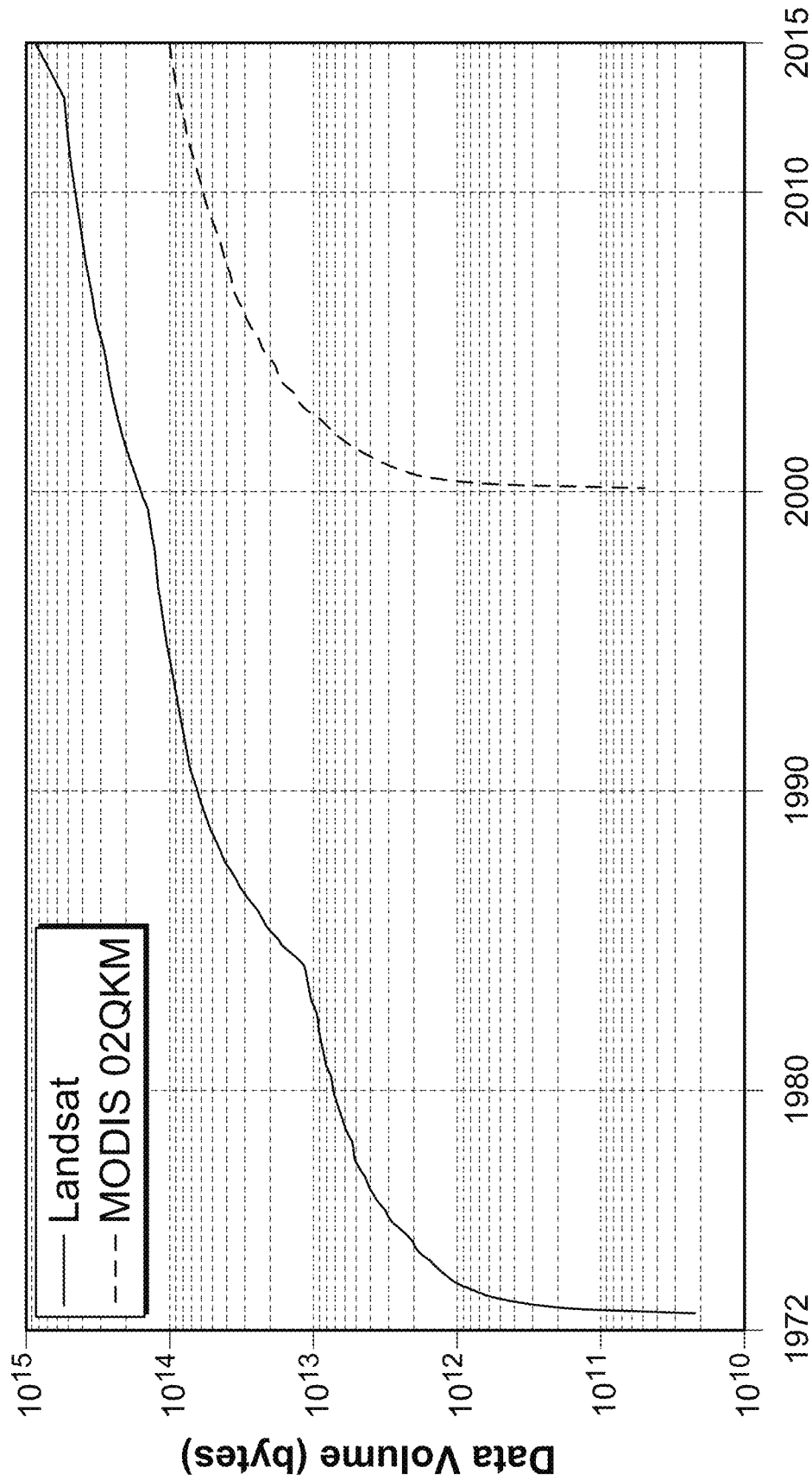
FIG. 2 shows the growth of Landsat and MODIS data volume over time.

FIG. 2 shows the growth of Landsat and MODIS data volume over time. To be most useful (e.g., to the community of researchers and policy makers), the Landsat and MODIS datasets need to be available globally on data systems that support high-bandwidth access, and the data itself needs to be stored in a data format that supports scientific analysis and is compatible with common visualization tools. At the time of the Landsat 1 launch on Jul. 23, 1972, the fastest computer in the world was the CDC 7600, capable of approximately 10 Mflops. Each Landsat 1 MSS scene consisted of 20 Mpixels (170 km×185 km image at 79 m ground sample distance in 4 spectral bands). The long-term storage options for these huge images involved magnetic tape and conversion to large-format photographic film. Hundreds of thousands of frames of photographic film remain in the USGS Eros data center, and efforts were taken in the early 1990s to convert the film data from Landsat 1 through 5 MSS and TM observations back to a digital format.

Google Earth Engine and the Amazon-NASA Earth Exchange (NEX) have placed historical (and are continuing to place newly-collected) Landsat and MODIS data into freely accessible storage in the cloud. Unfortunately, this data is often provided to the public in a format which requires more resources to store and process than necessary, and can prevent some forms of analysis entirely. As one example, bzip compressed tar files (often used to store such imagery) prevent random access to the data within them. Additionally, if answering a specific question requires access to the entire time series of data within a relatively small region (e.g., tens of kilometers), more than 1000 large image files spanning 185 km would need to be decompressed in their entirety, and then further spatially subdivided in order to fit within the memory of a processing node. However, if, as will be described in more detail below, the data is provided in a multi-resolution tiled format, only the data of interest needs to be accessed, reducing the cost and complexity by a large factor.

B. Overview of Example Infrastructure

1. Hardware

A variety of infrastructural approaches can be used to process data at a petabyte scale. One option is to purchase hardware, and install and maintain one's own computing center. One drawback of this approach is that, where the peak requirements are very large, but the typical workload is much smaller, resources will often go wasted through idleness. Further, this approach requires an appropriate knowledge of how to design and provision the hardware and software environment, possibly before having a complete understanding of the resources required to solve the data processing problem at hand. This solution also potentially comes with a multi-year commitment, since there is not much of a market for slightly used supercomputers.

A second option is to use shared supercomputing resources (e.g., provided by one's company, university, or national supercomputing facility). There are hundreds of supercomputing installations with more than 10,000 cores that could potentially provide for the on-node processing of the datasets described herein. Unfortunately, the associated storage and network resources are not so readily available. One major limitation to processing very large datasets using traditional supercomputing hardware is the difficulty of transferring the data to a parallel file system where it can be processed. At typical supercomputing center transfer rates, retrieving a petabyte from an archival storage location over the Internet could take a month or more.

Another issue is how to store the data while it is being collected. Parallel file systems commonly attached to supercomputers, such as Lustre and Panasas, have been designed for high performance, and their high cost limits their utility for long-term data storage. They are typically reserved for temporary, scratch storage. Lower cost archival storage such as magnetic tapes are available, but are not designed to support the use case of staging a petabyte at a time onto a parallel datastore. Yet another issue is how to perform further analysis and/or distribute results after a large data processing run has completed. Supercomputing centers typically do not provide a friendly environment for interactive data analysis and visualization, and additional infrastructure to provide web-enabled public or private access to large amounts of processed data can run afoul of traditional security models.

Instead of purchasing dedicated hardware to perform calculations, and/or performing them at an existing supercomputing center, an alternate approach is to leverage public cloud computing resources. Cloud computing represents a further step in the commoditization of computational resources, with associated benefits in agility, elasticity, and reliability. One aspect of cloud computing is that its pay-as-you-go model promotes transparency of resource costs, and thus allows free-market economic feedback loops which are largely suppressed in the traditional supercomputing environment. In the following Specification reference is made to Google Compute Engine, which is the Infrastructure as a Service (IaaS) component of Google Cloud Platform. Other platforms provided by other companies can also be used, and the techniques adapted as applicable.

Figure 3:
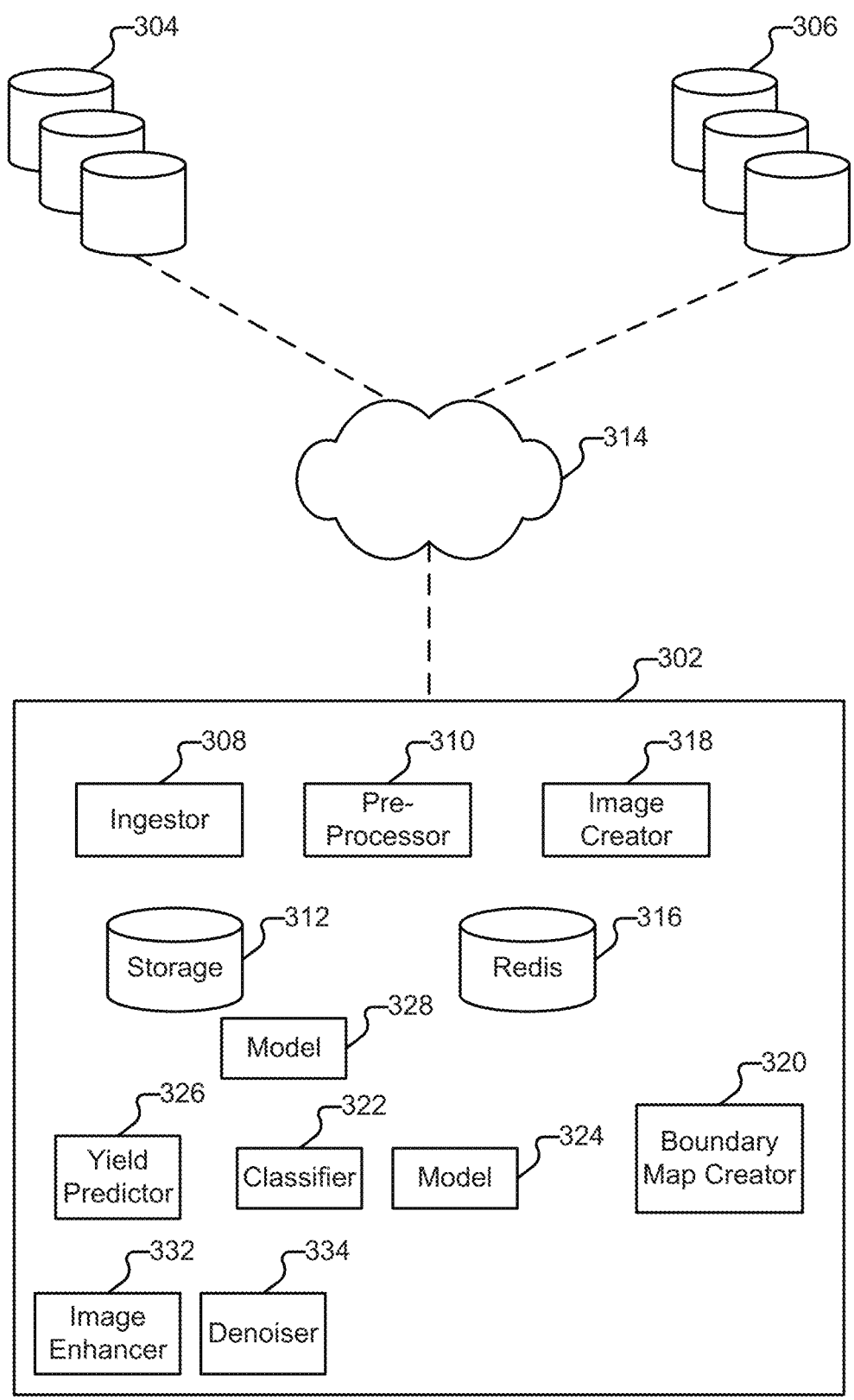
FIG. 3 depicts an example environment for processing and analyzing data in accordance with various techniques described herein.

FIG. 3 (described in more detail below) depicts an example environment for processing and analyzing data in accordance with various techniques described herein. As explained throughout the Specification, platform 302 (and/or various elements thereof) can be implemented using traditional server hardware, and can also be implemented using cloud computing resources. Various elements of the environment shown in FIG. 3 are depicted as individual units (e.g., ingestor 308 and pre-processor 310). It is to be understood that such elements need not be implemented on a single node, but can also be implemented across multiple nodes configured to cooperate to perform tasks (e.g., leveraging various industry standard cloud computing techniques, as well as various approaches described herein). Further, whenever platform 302 is described as performing a task, a single component, a subset of components, or all components of platform 302 may cooperate to perform the task. Similarly, whenever a component of platform 302 is described as performing a task, a subcomponent may perform the task and/or the component may perform the task in conjunction with other components. Various logical components and/or features of platform 302 may be omitted and the techniques described herein adapted accordingly. Similarly, additional logical components/features can be added to embodiments of platform 302 as applicable.

2. Software

The availability of useful, high-quality, and interoperable software packages continually increases (e.g., as the knowledge and effort of many software developers integrates over time in a code base counted in hundreds of millions of lines). The ecosystem that has developed around the collaborative development of software is a remarkable example of how the solution to a problem can be scaled across a large number of people. A corollary to the observation that there is vastly more high-quality open source software available now than there was in the past, is that much of the complexity of managing software has moved from writing one's own code to interfacing one's code with software written by others.

Python offers a good compromise between rapid code development and high performance. Accordingly, in various embodiments, various pipelines (and/or components thereof) are predominantly written in Python, leveraging Numpy for numerical array operations. Cython is used as a glue to interface to other software libraries, and the Geospatial Data Abstraction Library (GDAL) is also used. The code is revision controlled with Git, which is also used as the vehicle for code deployment to worker nodes. Other languages/packages/etc. can also be used in accordance with various embodiments of the techniques described herein. As one example, a Landsat metadata file parser from the Landsat ecosystem disturbance adaptive processing system (LEDAPS) can be written in the C programming language, comprising approximately 500 lines of code, supporting either the old or new Landsat metadata format, depending on the version used. A Python metadata file parser in accordance with embodiments of the techniques described herein requires less than 40 lines, and can support both old and new Landsat metadata formats with the addition of an 80 line translation dictionary. Landsat metadata information can be propagated into an XML container within JPEG 2000 output files, providing a self-documenting provenance for the data the processing pipeline produces.

Various approaches can be used to reduce the cost of resources involved in the various kinds of processing and analysis described herein. For example, memory usage can be reduced to allow for execution on the smallest memory (and least expensive per core) Google Compute Engine nodes, which contain somewhat less than 2 GBytes of memory per hardware core, and use no conventional disk storage on the compute nodes at all (beyond the minimum 10 GB partition required to boot the system), working entirely in memory or from the Linux tmpfs RAM disk. As another example, intermediate writes to the local file system can be reduced, instead going from memory buffer to memory buffer between application libraries. As a specific example, rather than copying a bzipped Landsat image tar file from Google Cloud Storage to local storage and then decompressing and reading the file into memory, the data can be streamed directly into memory using a Python tarfile module reading from a gsutil cat pipe. The data in memory can then be passed directly to GDAL via the gdal.FileFromMemBuffer interface.

3. Initial Dataset—Landsat/MODIS

One example input dataset for use in conjunction with techniques described herein comprises $915.52 \times 10^{12}$ bytes of Landsat data in 5,693,003 bzip compressed GeoTIFF files (available at gs://earthengine-public/), and $101.83 \times 10^{12}$ bytes of MODIS Level 1B (2QKM) band 1 (red) and 2 (near infrared) data in 613,320 sz compressed Hierarchical Data Format (HDF4) files (e.g., collected from the NASA ftp site (1204) and stored in Google Cloud Storage (1212)), for a total of $1017.35 \times 10^{12}$ bytes and 6,306,323 files. The oldest image was collected Jul. 25, 1972, and (in this example data set) the recent image was collected on 2015-04-13 at 06:10:04Z. All of the input data is publicly available.

In various embodiments, the processing stages for each Landsat image in the dataset include: retrieving the image from Google Cloud Storage, uncompressing the image, parsing the metadata, identifying the bounding rectangle that contains valid data, cleaning the edges of the image, converting the raw pixel information into meaningful units (e.g., calibrated top of atmosphere reflectance using the appropriate constants for each satellite and accounting for solar distance and zenith angle), cutting each image into appropriately sized pieces using a consistent equal-area worldwide tiling of the sphere, performing any necessary coordinate transformations, compressing the data into a JPEG 2000 format (or another appropriate format), and storing the result back into Cloud Storage.

4. JPEG 2000 Image Coding

Aspects of JPEG 2000 include:
- Rate-distortion performance that is somewhat superior to that of traditional JPEG at high bit-rates (i.e., low compression ratios) and substantially superior at low bit-rates (i.e., high compression ratios).
- Much greater flexibility in terms of the types of images that can be coded, including single and multi-band images, and bit-depths between 1 and 32 bits per band (e.g., as compared to traditional JPEG).
- Support for both lossless and lossy compression.
- A scalable codestream that can be truncated to obtain a lower bitrate representation of the image of similar quality to that which would have been obtained if the image had been coded to target that reduced bit-rate. The codestream can be ordered for various forms of scalability, giving priority, for example, to either resolution (a high-fidelity low-resolution representation is obtained first) or fidelity (a low-fidelity full-resolution representation is obtained first).

The above features are all provided by the baseline, defined in "Part 1" of the standard, which also defines a standard file format for the codestream, referred to as JP2. Further flexibility, such as support for user-defined wavelet transforms and inter-band transforms, is provided by "Part 2" extensions to the standard, which also defines the more flexible JPX file format.

5. Generations of Landsat Imagery: MSS, TM, ETM+, AND OLI

Landsat images comprise 6 or 7 spectral channels, a higher-resolution panchromatic channel (only available in Landsat 7 ETM+ and Landsat 8 OLI), and one or more mask images. Example ways to combine groups of them are in the following set of JPEG 2000 encoded images in JP2 file format:
- a three-band image comprising the spectral channels with the closest correspondence to visible red, green, and blue bands (lossy coding),
- a three-band image comprising the near infrared (NIR) and short wave infrared (SWIR) bands (lossy coding),
- a single thermal infrared (TIR) band (lossy coding), coding),
- a single high-resolution panchromatic (PAN) band for ETM+ and OLI (lossy coding),
- a single band 1-bit image representing the data validity mask (lossless coding), and
- a single band 8-bit image representing the most important bit-planes in the Landsat 8 Quality Assessment Band (lossless coding).

The above layout does not fully exploit all of the flexibility of the JPEG 2000 standard, which would allow all bands to be included within a single JPX file, or all multi-spectral bands to be included as multiple components within the same JP2 file. Example reasons for this choice are (i) the optimum layout is strongly influenced by the optimal chunk size for access while minimizing costs for cloud file operations, and (ii) a JP2 file format was preferred over the more flexible JPX format due to the much wider support by libraries for decoding JPEG 2000 format images. In other embodiments, other layouts can also be used.

JPEG 2000 performance in reversible coding of bitplanes is inferior to that of a coding technique, such as JPEG-LS, specifically designed for this type of content. However, to avoid the complexity of using multiple coding standards, in various embodiments, JPEG 2000 is also used for bands of this type. A substantial performance improvement can be obtained, at the expense of losing resolution scalability, by effectively disabling the wavelet transform by setting the number of transform level to zero.

6. JPEG 2000 Parameters

A variety of libraries can be used for manipulating image data. For example, the commercial Kakadu library can be used, as can an open-source option such as OpenJPEG. Using the Kakadu library offers an advantage in encoding speed. One application of the imagery described herein is as an input to a classifier. In various embodiments, the desired level of compression is specified to the Kakadu encoder using the rate-allocation slope rather than a target bitrate (which is less robust to changes with image content in delivering a consistent reconstruction distortion). As applicable, suitable compression ratios can be selected, e.g., by performing a classification experiment on processed JP2 imagery over a wide range of compression ratios. As one example, suppose for each ratio, thirteen 2048×2048 frames for the same thirteen 2048×2048 frames for the same spatial location (e.g., a region in Kansas) are selected from different times in 2011, and 1800 rows of pixels are used in each of the six spectral bands as training data, with the remaining 248 rows of pixels as testing data. The ground truth in this example is whether each pixel location is identified by the United States Department of Agriculture (USDA) CropScape Data Layer (CDL) as containing wheat. The 78-dimensional training inputs for each of the 3,686,400 training pixels can be input into an artificial neural network comprising three fully-connected layers, using the open source Caffe library. In this example, suppose the classification performance varies from 87.52% for uncompressed data to 87.13% for the most compressed imagery. A compression ratio can be selected such that it is sufficiently high to give a substantial reduction in storage costs, but for which image structure (e.g., edges) is just perceptible in the difference image between original and decoded images.

7. Visualization in the Browser

Being able to quickly view and interrogate a given image or montage of images can be helpful for verification and validation of a processing pipeline. Unfortunately, even though the use of JPEG 2000 enables superior performance in terms of compression ratios and multi-resolution representation of imagery, modern web browsers such as Google Chrome, Mozilla Firefox, and Apple Safari may not natively support the format. Accordingly, output JP2 files that could otherwise be viewable directly in the Google Developers'

Console Storage Browser must first be downloaded to a local workstation and viewed using an image viewer capable of parsing JP2 files. The situation is aggravated by the files having up to 10 different components, requiring the usage of layout-specific visualization scripts. One solution is to use a Google Chrome Javascript-based extension to view images directly from within the web browser. While an entire JP2-capable parser can be purely in Javascript, in various embodiments, the Emscripten LLVM compiler toolchain is used to compile the C99 OpenJPEG 2.1.0 library to LLVM bytecode and translate the result into optimized Javascript. The base library can be augmented by implementing additional C library functions that are used to specify additional decoding parameters and yield direct access to image component data without first writing to a temporary PNG or RAW image. An HTML5 Canvas object can then be filled with the data array, providing scaling and gamma correction functionality through a simple web GUI. This moves the image inspection procedure directly to wherever the data resides (in terms of its location on a website). Progressive decoding of the bytestream can be performed as it arrives from the server, allowing for a seamless integration into traditional websites.

8. Example System and Environment—Google Compute Engine

As explained above, in various embodiments, the data processing and analysis techniques described herein are implemented using commercially available public cloud resources with an on-demand cost model. These include Google Cloud Platform resources, such as Compute Engine and Cloud Storage, but other platform resources by other vendors can also be used, as applicable (e.g., as offered by Amazon). Cloud vendors such as Google divide physical hardware into virtual resources to divide workloads into isolated environments, which allows customers to use compute capacity with an on-demand cost model. Once the task is complete, the customer can deprovision the system, ending their costs. The virtual infrastructure and its underlying physical resources can then be returned to the available resource pool for the next customer to use. Construction and management of data centers, purchasing of hardware, utilities, and staffing are all removed for the task of building a large distributed system. This allows for focus on the actual problem being solved. Google has multiple geographic availability zones, any/all of which are used in various computations described herein. Geographical diversity creates design options for robust failover and scaling.

Google Compute Engine allows for development teams to specify virtual hardware such as CPU, RAM, SSDs, network, security, etc., along with software such as an operating system, custom software, and dependencies. This flexibility allows the costs and benefits of different hardware to be factored into the software engineering decision process, as a tradeoff against the cost of optimizing the code to work with lower priced virtual hardware. In various embodiments, worker nodes comprise four virtual machine CPU (vCPU) models, based on what is available in the four geographic zones. Examples are as follows:

| Zone | Virtual Machine | CPU Hardware |
| --- | --- | --- |
| us-central1-a | highcpu-16vCPU | Intel Sandy Bridge 2.6 GHz Xeon E5 |
| us-central1-b | highcpu-16vCPU | Intel Haswell 2.3 GHz E5 v3 |

-continued

| Zone | Virtual Machine | CPU Hardware |
| --- | --- | --- |
| us-central1-c | highcpu-32vCPU | Intel Haswell 2.3 GHz E5 v3 |
| us-central1-f | highcpu-32vCPU | Intel Ivy Bridge 2.5 GHz E5 v2 |

Other virtual hardware specifications such as RAM, SSD, and network are identical across zones. Software is identical with the exception of worker processes corresponding to the vCPUs available. Zone variations (primarily 16 and 32 vCPU instances) necessitate multiple VM templates. Datacenter regions also allow the specification of templates inside a group, such as the specification of the number of VMs to be created, and auto-scaling of the group based on factors such as network traffic or CPU load.

9. Example Software Deployment and Configuration

In various embodiments, software deployment and configuration is accomplished with two techniques: bash scripts and Linux containers (e.g., Docker). VM templates allow for a custom script to be specified and executed post startup. With the bash script technique, the code is pulled from a private Github repository along with dependencies, and configuration files deploy the code onto the virtual machines and start the worker processes. In the second approach, a pre-built Docker container that contains source code, dependencies, and configurations built inside the container is deployed onto the VM and the container is executed in daemon mode. Docker containers provide an API around several Linux kernel features (libvirt, LXC, systemd, and libcontainer) to create an isolation mechanism from the host OS while utilizing the existing Linux kernel. Traditional virtual machines fully isolate operating systems on top of a hypervisor. Docker containers also use a copy-on-write layered file system approach where identical layers need not be duplicated, creating considerably smaller storage requirements than traditional virtual machines. Because the container is leveraging the existing kernel's CPU, memory, and network, additional performance overhead can be minimal. Containers can be executed on both virtual machines and bare metal hardware, which provides an efficient mechanism to move configured, functional, versioned, compute capabilities to where the data resides, which often could be a different cloud vendor, private datacenter, or collaborator's laptop. Just as source code can be branched and versioned inside modern source code repositories such as Git, pre-built containers can be versioned and branched in container repositories at a fraction of the size of versioning virtual machines, since only the changes in the layered file system are differentiated. In an example deployment, containers are built with all required dependencies, configurations, and source code from GitHub, and then stored in a private Google Container Registry located inside a Google Cloud Storage bucket. This allows for the latest container to be pulled down and executed in daemon mode on startup in a consistent manner across the cluster. Containers also provide a reproducible archival mechanism for others to later execute code to attempt to duplicate results with minimal effort.

Various observational data (e.g., the Landsat dataset) is stored inside Google Cloud Storage as a publicly available dataset, persistent and accessible from all four us-central zones. As an alternative to using a large NFS for all worker nodes to write results, Google Cloud Storage buckets can be used as a persistent, common datastore across all nodes. As a further benefit, this data is also available in other geographical zones, enhancing availability and tolerance to hardware failures.

To manage the creation of asynchronous tasks for processing millions of scenes across the worker nodes, an asynchronous task queue approach (e.g., the Python Celery library) is used in some embodiments. Celery's API allows multiple asynchronous job queues to be created, the list of tasks and their parameters to be managed, and for their insertion into a pluggable backend key-value pair store (e.g., Redis 316). As worker nodes are provisioned and start, they connect to the Celery broker to receive processing tasks in the queue. To optimize performance, Redis 316 can be configured to keep the queue in memory.

10. Scalability and Performance—Example Execution

In one example execution (e.g., of the tiling process described in more detail below), processing of a petabyte of satellite imagery begins at 02:15 UTC, when 250 nodes in zone us-central1-f are started, processing Landsat TM images. Additional compute instances are then created across zones a, b, c, and f, accounting for approximately 15,000 physical compute cores. At 11:34 UTC, nodes running the MODIS processing pipeline are started, and an equivalent number of Landsat nodes are shut down. At 15:45 UTC, a list of tasks which have not completed and have not been automatically re-tried by the task manager is resubmitted. By 16:15 UTC, the bulk of the Landsat tasks are complete, and the remaining Landsat MSS tasks are added. At 17:11 UTC, the MODIS processing completes, and at 17:41 UTC on April 16 all tasks have completed. During the 15.5 hour process, the petabyte of input data is read from the distributed Google Cloud Storage system at an average rate of 18.1 Gbytes/sec. After decompression, this represents 55.2 Gbytes/sec into processor memory. The peak input network bandwidth exceeds 25 Gbytes/sec (200 gigabits/sec). The output bandwidth back to Google Cloud Storage averages about 4.5 Gbytes/sec, written to over 185 million individual files.

Figure 4A:
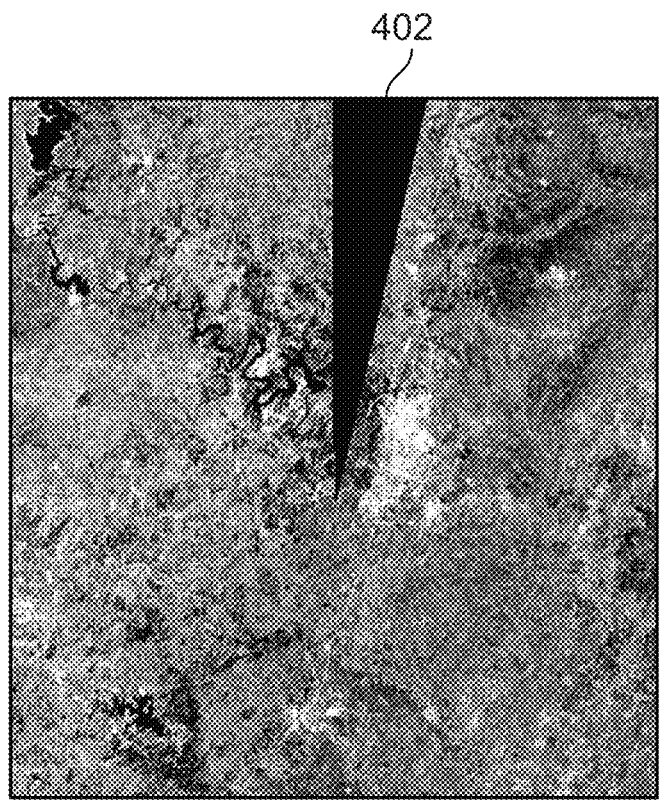
FIGS. 4A-4C illustrate processed tiles.
Figure 4B:
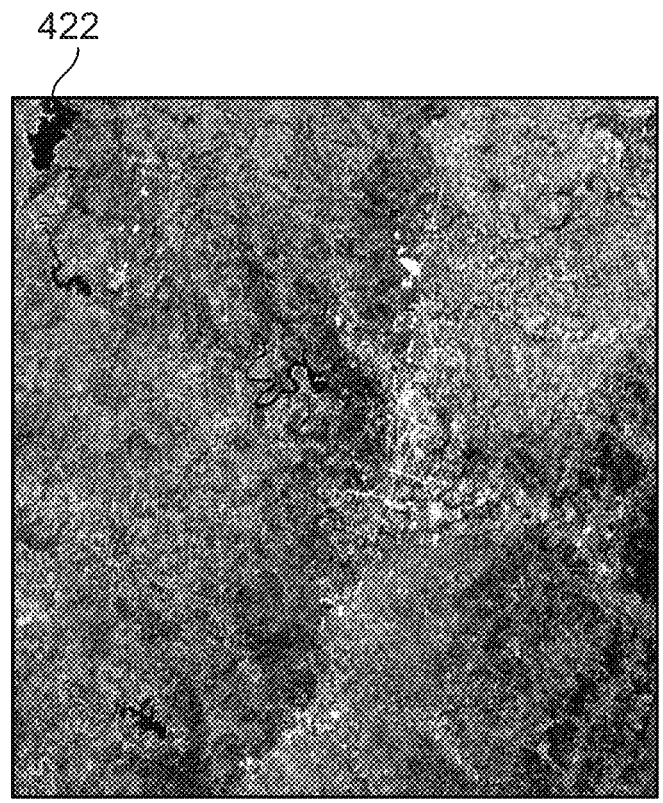
Figure 4C:
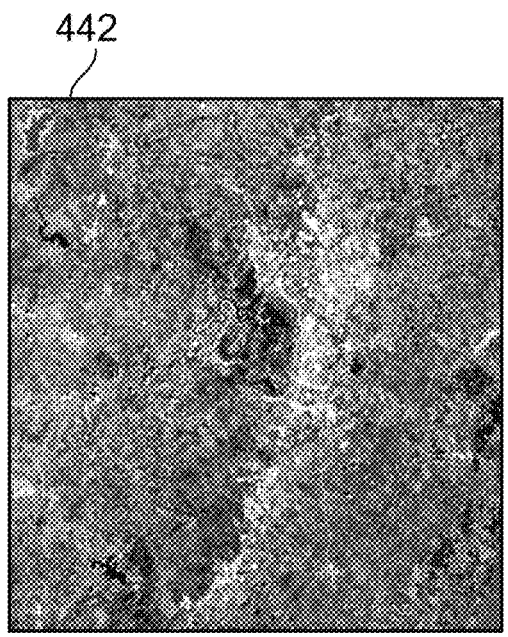

FIGS. 4A-4C show examples of processed tiles of the Austin, Texas area. FIG. 4A depicts March 1973 (Landsat 1 MSS), FIG. 4B depicts September 1994 (Landsat 5 TM, 10B), and FIG. 4C depicts March 2015 (Landsat 8 OLI, 10C), respectively. The tiles are 2048×2048 pixels, and are calibrated and georeferenced. The Landsat 1 image (FIG. 4A) is a false-color image (RGB display channels mapped to near IR, visible red, visible green), due to the MSS sensor lacking a visible blue band. All three panels are composites of four processed tiles, where each panel is formed from tiles collected over several days, showing the consistency of the processing across Landsat scenes and between sensors. Region 402 in FIG. 4A is a region where no data was available in that Landsat 1 MSS observation. Changes in the extent of urbanization surrounding Austin are clearly visible from panel to panel, as is a significant change in Buchanan Lake between FIGS. 4B (region 422) and 4C (region 442).

II. INGESTION AND PRE-PROCESSING

Figure 5:
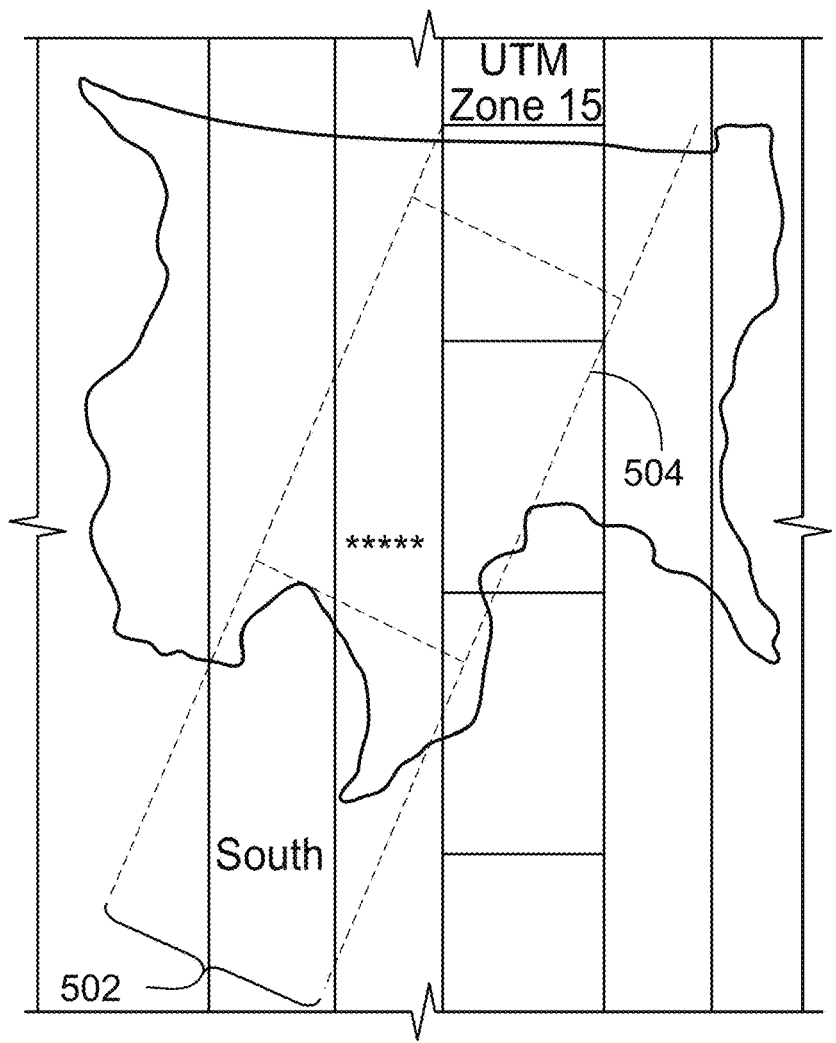
FIG. 5 depicts an illustration of the United States, as observed from satellite.

FIG. 5 depicts an illustration of the United States, as observed from a satellite. In particular, FIG. 5 illustrates a granule (504) of data—five minutes of orbit along a swath (502). The path of the spacecraft is down through the center of the swath.

A. Map Projections

Two common map projections which represent the spherical surface of the Earth as a regular grid are the Web Mercator projection and the Universal Transverse Mercator (UTM) projection. A single image of the Earth with pixel scales less than about 10 km can be too large to process efficiently, so the map is "tiled," or split into pieces which can be processed independently.

The Web Mercator projection can readily be tiled, because the image dimensions are precisely a power of two in both coordinates. The level of the decomposition divides the world into $4^n$ level pieces. An appropriate level can be chosen to satisfy various constraints, mainly, the number of time slices of a given tile that can fit into processor memory at one time. Web Mercator is suitable for simple map interfaces, but can be problematic for applications beyond simple analysis because the pixel areas are not equal: as a pixel becomes farther from the equator, it represents a smaller and smaller area on the surface of the Earth.

The UTM projection is not as simple. UTM first splits the world into 60 zones, and within each zone pixels are split into nearly equal areas referenced by their "x" or "Easting" coordinate and their "y" or "Northing" coordinate. All UTM distances are measured in meters. The number of pixels which span a zone in the East-West direction depends on the distance from the equator.

For the MODIS sensor carried on the Aqua and Terra satellites, sensor values come as a logically rectangular grid of latitude/longitude co-ordinates (a swath), but projected on to the surface the sample points are not on a regular grid (points become farther apart towards the edges of the swath). For other sensors, the image values are delivered in UTM coordinates. A shared, common coordinate reference system can be used to further the most efficient and accurate processing of multiple datasets. Most of the input data is delivered in UTM coordinates, and operations to interpolate pixels to a different map projection or resolution can affect the data quality and require additional computational resources. Accordingly, in various embodiments, UTM is used as a common map projection. The tiling techniques described herein can also be adapted for use with other projections, as applicable.

B. UTM Tiling Parameters

UTM tiling (e.g., as used by embodiments of platform 302) can be described by a number of parameters. It is applied to each of the 60 UTM zones with identical parameters, with the zone designated by z. A similar construction can be applied to the polar UPS projection. The parameters are as follows:

z: the UTM zone,
$x_0 y_0$: the origin of the tiling system,
$x_n y_n$: the number of pixels in the tile,
$x_b y_b$: the border size of the tile,
r: the spatial resolution of the pixel.

Each pixel can be located by its spatial global index offset from the origin of the tiling system $g_i g_j$, or its index i, j, within a specific tile tit (also referred to as column and row).

An example size for tile images (e.g., given current computer architectures and memory storage capacities) $x_n y_n$ is approximately 4096×4096 pixels. Since a UTM zone is 6 degrees across, that represents 668 km at the equator. For pixel scales $x_r$ larger than approximately 200 meters, a single tile will cover the east-west extent of a UTM zone. For smaller pixel scales, multiple tiles are required. For example, for r=10 m resolution (e.g., Sentinel-2), seventeen 4096 pixel wide tiles would be required $$\left( \frac{668 \text{ km} * \frac{1000 \text{ m}}{10 \text{ m}}}{4096} \right).$$

In the y-dimension, the distance from the equator to the pole is near 10000 km, so the number of 4096×4096 tiles to span that distance is approximately 10 for a 250 m pixel tile, and 244 for a 10 m tile. The southern hemisphere can be handled with a similar number of tiles using a negative index referenced from the equator, or referenced by their northing coordinate from the south pole using the southern "S" designator for the zone.

There are several potential choices for the origin of the tiling. The first uses the native UTM 0,0 as the origin, which is at the intersection of the false easting of the zone (500 km) and the equator. One drawback of this choice is that the tiles are not symmetric within a zone. Another choice is to use the intersection of the central meridian of the zone with the equator, which is located at UTM $x_0y_0$=500000,0.

The border size represents overlap with adjacent tiles, which allows the reduction of "edge" effects for processing which requires neighboring pixels. One choice is to use some fraction of the tile size to reduce duplicate storage. For a 4096×4096 tile, an example choice is some power of 2 between 32 and 256.

There are also various choices for the optimal pixel resolution "r." One approach is to accommodate as many sensors as possible using powers of two of a fundamental resolution. Examples of such tilings are as follows:

r=5 m accommodates RapidEye and PlanetScope (native 5 m), and Sentinel-2 (native 10 m/20 m).

r=15 m accommodates pan-sharpened Landsat 7/8 (15 m), Landsat 5/7/8 (native 30 m), and MODIS (240 m).

For high-resolution sensors (e.g., NAIP aerial photography at 1 m resolution), r=1m can be used as the fundamental tiling, with small interpolation adjustments as needed to accommodate the existing sensors (e.g., with RapidEye and PlanetScope adjusted to 4 m (level 2), Sentinel-2 to 8 m (level 3), pan-sharpened Landsat at 16 m (level 4), Landsat at 32 m (level 5), and MODIS at 256 m (level 8)).

C. Example Conversion to Pixel/Tile Index

The following example shows an assignment of a specific WGS84 latitude/longitude from the MODIS sensor to a pixel and tile. Longitude −106.3017 and Latitude 35.8785 is UTM Zone 13N Easting 382497.99 Northing 3971254.80. For a pixel resolution of 1 meter, this would fall in the pixel whose upper left corner is at 382497, 3971255 which is identical to the zone pixel $g_i, g_j$ address. For a pixel resolution of 240 meters, the sample would be in the pixel with upper left location 382320, 3971280 and $g_i, g_j$ address 1593, 16547. The global pixel indices can be calculated via $$g_i = r^* \left\lfloor \frac{\text{Easting}}{r} \right\rfloor \text{ and } g_j = r^* \left\lfloor \frac{\text{Northing}}{r} + 1 \right\rfloor.$$

The corresponding tile indices for r=1, $x_0$=0, $y_0$=0, $x_n$=4096, $y_n$=4096 are $t_i$=93, $t_j$=970. Using a central meridian origin ($x_0$=500000), $t_i$=−29, $t_j$=970. For the MODIS 240 m pixel and $x_n$=4096, $y_n$=4096, $t_i$=0, $t_j$=5. The tile indices can be calculated from the pixel indices via $$t_i = \left\lfloor \frac{g_i}{x_n} \right\rfloor \text{ and } t_j = \left\lfloor \frac{g_j}{y_n} + 1 \right\rfloor.$$

Tile indices are mapped to a string which is part of the file name (along with date of acquisition and sensor) stored in a long-term storage 312 (e.g., Google Cloud Storage or Amazon S3). An example for MODIS would be "2006-06-09-1800_12N_12 MO_09qkm.jp2," which was collected on Jun. 9 2006 at 18:00 UTC in Zone 12N with $t_j$=12 by the Terra sensor. There is no $t_i$ because a tile covers the entire E-W span of the zone. An example for Landsat 7 would be "2015-01-18-L7-034033_13N_007_069_321.jp2" which was collected on Jan. 18, 2015 from zone 13N with $t_i$=7 and $t_j$=69.

D. Ingestion Process

FIG. 3 depicts an example environment for processing and analyzing data in accordance with various techniques described herein. Platform 302 includes an ingestor module 308 (comprising one or more Google Compute Engine instances and a Celery master). Ingestor module 308 connects (e.g., via one or more networks depicted in FIG. 3 as a single network cloud 314) to various sources of observational data. Two examples shown in FIG. 3 are NASA FTP site 304 and a proprietary repository 306 (e.g., storing aerial photography). Ingestor module 308 retrieves data (e.g., using the FTP protocol) from the repositories and writes them to storage 312 (e.g., creating a local mirror of the retrieved data).

The following is an example of how ingestor 308 obtains data, and in this particular example, the ingestion of MODIS data. As explained throughout the Specification, other sources of data (in other formats) can also be processed using embodiments of the techniques described herein.

In various embodiments, ingestor module 308 executes a shell script that manages ingestion. The shell script executes (e.g., as a cronjob running every four hours) and launches an LFTP process to obtain a directory listing of FTP site 304. Ingestor module 308 identifies files that are new since the last time the script ran, by parsing the directory listing into a list of potential files to retrieve, and then checking against a Redis database 316 to see whether the files were previously retrieved. Previously retrieved files are ignored and threads are started to download any new items. In an example operation, 50 to 100 new files are identified in NASA's MODIS collection each time the ingestor script executes (depending, e.g., on when NASA's MODIS processing occurs). Each raw MODIS Hierarchical Data Format (HDF) file obtained from FTP site 304 is approximately 140 MB. Multiple files can be downloaded in parallel (e.g., using threads), and locks can be used to prevent multiple threads from trying to download the same file simultaneously. In the event the download fails (e.g., due to a network connectivity problem, or if the file length is not correct when it is finished), the script can restart the download as needed. Newly seen files are copied to storage 312 and entries are made in Redis database 316 (e.g., using python) indicating the new files as having been downloaded successfully.

The raw data (e.g., MODIS data obtained from NASA) is stored in "granules." In various embodiments, every pixel in a granule is stored. In other embodiments, a cloud mask (included by NASA with the granule) is used to shrink the number of pixels stored. The following is an example file name for a granule stored in storage 312, and mirrors NASA's nomenclature:

gs://modis/allData/6/MOD02QKM/2015/200/
MOD02QKM.A2015200.0040.006. 2015200134321.hdf The components of the path name are:
gs://: Google Storage designator
modis: storage bucket
allData: (inherited from NASA storage path)
6: collection number (equivalent to a NASA version number)
MOD02QKM: data type (MODIS 02 quarter kilometer (250 m) bands)
2015: year
200: Julian day of year
MOD02QKM.A2015200.0040.006.2015200134321.hdf: a file name assigned by NASA using NASA's naming scheme In an example embodiment, platform 302 handles twelve types of data granules, each produced every five minutes over daylight portions of the globe. There are approximately 1,728 new files per day, 630,000 files per year, and 10 million files total.

An example of pseudocode for ingesting data (e.g., from site 304 by ingestor module 308) is shown in FIG. 6. An example of pseudocode of preprocessing data (e.g., by preprocessor 310 of the data ingested by ingestor module 308) is shown in FIG. 7.

E. Pre-Processing

Pre-processor module 310 (also comprising one or more Google Compute Engine instances and a Celery master) takes all of the newly retrieved files (e.g., the 50 to 100 MODIS files obtained by ingestor 308 every four hours) and pre-processes them. In various embodiments, pre-processing executes as a cron job (e.g., every four hours), and executes as a first portion of the process the ingestion processing described above. Pre-processing can also be triggered by an event, such as the appearance in a particular directory of new data.

A given granule can be split into smaller tiles (e.g., approximately twenty tiles) by pre-processor module 310. The smaller tiles are easier to perform various operations on by platform 302. Pre-processor module 310 can also process large repositories of historical data (e.g., the last n years of data stored with NASA FTP site 304) by performing a parallel run using an appropriate number of nodes (e.g., 200 multi-processor nodes). The Celery system distributes the workload over the (e.g., 200) nodes, with each node executing the same script as is executed for the newly-seen files (but in parallel).

The following is an example file name for a .xz file stored in storage 312:

gs://modis-xz/utm_v7q_09/15N/03/2015-06-20-1935-MY_15N_03.bin.xz

The components of the path name are:
gs://: Google Storage designator
modis-xz: storage bucket
utm_v7q_09: type and version
15N: zone
03: tile y index
2015-06-20-1935-MY_15N_03.bin.xz: file name An .xz file comprises an array of N samples. The samples are x and y coordinates as 16-bit unsigned integers quantized to 30 UTM pixel indices, followed by b bands of pixel location (DN) values. The array of N samples is compressed using the Lempel-Ziv-Markov chain compression technique. As previously mentioned, a given granule may have associated with it a cloud mask provided by the original data source (e.g., a NASA provided cloud mask). In such a scenario, the cloud mask can be used to reduce the number of points included in the .xz file, with the file structure remaining the same.

The .xz tiling process can be bypassed, as applicable, and JPEG2000 compressed image tiles can be created directly from the raw MODIS data using an appropriate interpolation method. The following is an example file name for a .jp2 file stored in storage 312:

gs://descartes-modis/2015-07-29-1620_16N_09_MO_09qkmjp2

The components of the path name are:
gs://: Google Storage designator
descartes-modis: storage bucket
2015-07-29-1620_16N_09_MO_09qkm.jp2: file name, date, time, zone, row, sensor, data type, and file type.

In various embodiments, additional (optional) preprocessing is performed (e.g., prior to the .xy tile being written). One example of such additional processing is scaling DN values to top of atmosphere reflectance. The physical meaning of the numbers associated with each pixel location (DN) varies by sensor. Various operations (e.g., performing cloud removal, described in more detail below) make use of values which represent reflectance as observed at the top of the atmosphere. Some sensors, such as Sentinel-2, deliver data in this format, and do not require scaling. Sensors such as MODIS and Landsat, however, deliver data in radiance units, which require various scaling to obtain reflectance. The metadata associated with the image data contains some of the appropriate constants, while others (such as the distance from the sun to the earth) can be tabulated from other sources as needed. The conversion formula to reflectance in the range of 0.0 to 1.0 is:

$$\text{gain} = \frac{(L\text{MAX} - L\text{MIN})}{(Q\text{CALMAX} - Q\text{CALMIN})}$$

$$\text{bias} = L\text{MIN} - \text{gain} * Q\text{CALMIN}$$

$$toar_f = \frac{\pi * \text{earth\_sun\_dist\_in\_au}^2}{\text{sol\_irrad} * \cos(\text{solar\_zenith\_angle})}$$

$$\text{scaledDN} = DN * toar_f * \text{gain} + toar_f * \text{bias}.$$

To store the reflectance in a 16-bit integer, it is scaled by an additional factor of 10000. As another example of optional preprocessing, pixels for which no data is present (e.g., due to scanline errors) can have their values set to zero, which can be used in later applications, as described in more detail below.

III. CREATING IMAGES WITH REDUCED ATMOSPHERIC OBSTRUCTIONS

Figure 8A:
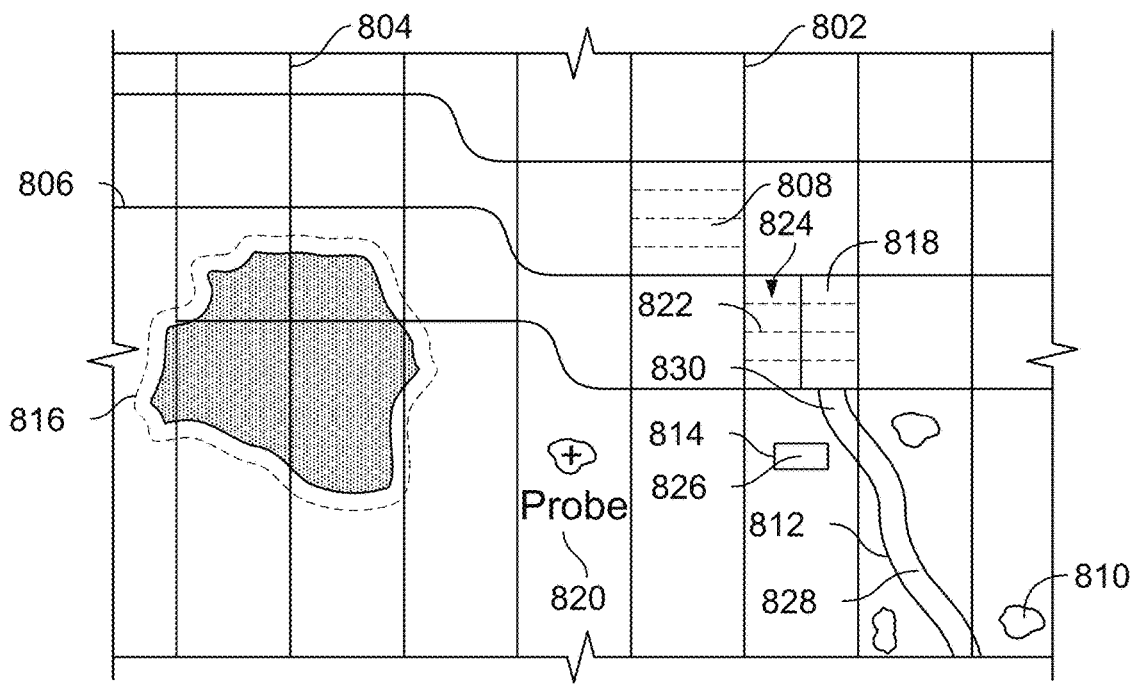
FIG. 8A illustrates an example portion of the Earth as viewed from above (e.g., by a satellite).

FIG. 8A illustrates an example of a portion of the Earth as viewed from above (e.g., by a satellite). Suppose FIG. 8A illustrates a portion of Iowa. Lines such as 802, 804, and 806 are gravel roads—generally spaced one mile apart. Other elements visible (e.g., to a satellite) are fields, such as field 808, tree 810, river 812, and house 814. Region 816 of FIG. 8A is obscured by clouds. In some cases, an obstruction (such as a cloud) may completely obscure the ground underneath it. In such a scenario, the optical depth can be represented as a "0," indicating that an obstruction can't be seen through. Correspondingly, a cloudless (i.e., completely visible) portion of ground can be considered as having an optical depth of "1." For some datasets (e.g., Landsat), a cloud mask accompanies the granule (e.g., as obtained from site 304), indicating for a given pixel (in a binary manner) whether the pixel represents a cloud or not.

Figure 8B:
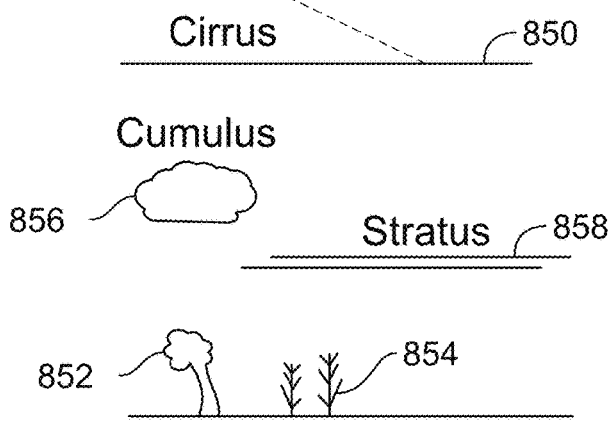
FIG. 8B illustrates an example portion of the Earth as viewed from the side.

As shown in FIG. 8B, clouds can take a variety of forms, and different types of clouds (or other atmospheric obstructions, such as smoke, snow, haze, and smog) can conceal the ground beneath them in different ways and to different degrees. In FIG. 8B, a tree (852) and corn plants (854) are shown. Example clouds are also shown, such as a cumulus cloud 856 (which will be opaque in the center part, but have fuzzy edges), low foggy stratus clouds (858), and very high cirrus clouds 850 (where the sun shines through the cloud but the illumination is affected by the cloud).

As mentioned above, sometimes the cloud may completely obstruct what is underneath it, and sometimes the view may be completely unobstructed. Sometimes, the optical depth value is inconclusive/insufficient to articulate whether a pixel is a cloud or not. For example, around the edges of pixels that have optical depths of 0 or 1, there will typically be pixels with optical depths somewhere in between 0 and 1 (e.g., 0.276). In some embodiments, a "cloud" pixel is defined as a pixel with an optical depth of less than 0.4 (or another appropriate value), and used as a mask. Cloud masks can also be more than 1 bit (e.g., 2 or 3 bits, indicating cloud, not cloud, or maybe cloud) per pixel.

One value that can be used in image processing/analysis is the normalized difference vegetation index (NDVI), which is a ratio $$\frac{NIR - VIS}{NIR + VIS},$$

where VIS and NIR stand for the spectral reflectance measurements acquired in the visible (red) and near-infrared regions. If a cloud affects each of these bands equally (e.g., it reduces each one by 10%), the ratio is unchanged. As an example, dust in the atmosphere scatters blue light more preferentially than green and red light. A cloud that affects red more than infrared will change the vegetation index. But, if that change occurs evenly across the whole scene, a correction can potentially be applied. For example, if a probe 820 is present for which the NDVI is known, and a different NDVI value is measured, if a sufficient number of probes are present in the scene, it could be possible to correct the whole scene for whatever obscuration is happening that is impacting the red and the infrared differently. Accordingly, a refinement to the definition of a "cloud" is something that affects NDVI in an uncorrectable way.

One approach to mitigating cloud cover (and other atmospheric obstructions) in imagery is to use the temporal dimension (e.g., to examine a set of images across time). One option is to opt for the largest number of samples in each pixel, without regard for resolution. A second option is to opt for the best resolution, with fewer samples per pixel.

Satellites (and other image sources) have a temporal period. For example, a given satellite might be above a given portion of land every 16 days. There may also be multiple satellites (e.g., two satellites), taking images on alternate days, where on one of the days the satellite will be directly above a region, and alternate days the satellite will be off to one side or another. Accordingly, for a given pixel, there could exist 20 observations, collectively, by various satellites over a 16 day period. Of those 20 observations of a given pixel, many may be masked out because of clouds (or other atmospheric obstructions). However, of those 20 observations of a given pixel, one pixel is the "best" pixel (e.g., the least obstructed). And, a composite image of an area can be created using data associated with each of the "best" pixels from a sequence of images covering the area, using techniques described in more detail below. The "best" pixel can be considered the one in a set (e.g., a time series) for which given spectral information associated with that pixel was last obscured by atmospheric obstruction.

Figure 9:
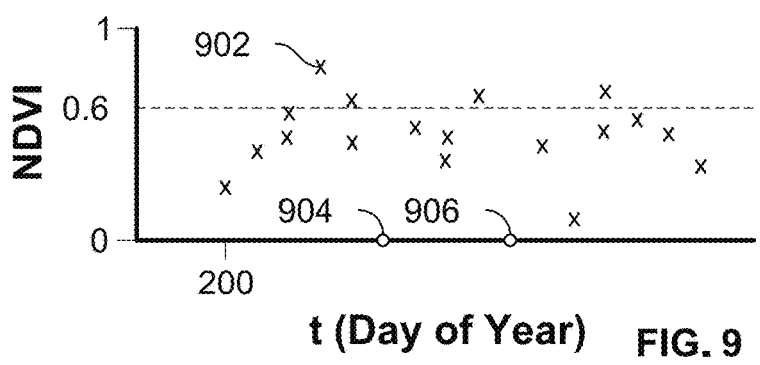
FIG. 9 illustrates a set of NDVI values for a given pixel in a sixteen day period.

A variety of approaches can be used to select the "best" pixel. One example is to use the NDVI value associated with the pixel (a one-sided error distribution). FIG. 9 illustrates a set of twenty NDVI values observed for a given pixel in a sixteen day period (starting on the $200^{th}$ day of the year). While an NDVI value can range from −1 to 1, in this example, values below 0 have been excluded. In the sixteen day period, four "cloud free" observations are present (the points above the threshold NDVI line, set in this example at 0.6). Of those four observations, the observation on day 203 of the particular pixel being examined has the highest NDVI value (902) and is thus the "best" pixel in the sixteen day sequence.

For a given pixel in a given sequence of images, in some cases, no data may be present. One reason for the missing data is that a cloud mask (e.g., provided by NASA and described above) was applied. Another reason for missing data is that aberrations (due to satellite position) yield unusable image information. Suppose days 205 and 209 are missing data for the pixel being examined in FIG. 9. In various embodiments, the NDVI values of pixels with missing data are set to zero (e.g., as shown at 904 and 906). As mentioned above, in addition to clouds, a variety of other atmospheric obstructions can be "removed" in the composite image. For example, a composite image of a region affected by a wildfire can be created by selecting, collectively, the least smoky pixels from a bin of images. And, a set of images collected during a dust storm (e.g., on Earth, or elsewhere) can be used to create a composite image with the least amount of dust present in each pixel, etc. Other examples of "obstructions" that can be reduced in accordance with techniques described herein include digital defoliation (e.g., selecting for the pixel least obscured by plant cover using an appropriate index) and using a water index to select for a maximum (minimum) value to see a composite image of the ground at its wettest (or driest) as applicable.

The use of the NDVI value for cloud detection relies on the fact that clouds are spectrally "flat." In other words, the reflectance for each band is similar. This is equivalent to clouds being white, or a shade of gray. The formula for NDVI $$\frac{NIR - VIS}{NIR + VIS}$$

means clouds have an NDVI value near zero, since the terms in the numerator cancel. Selecting maximum value pixels is particularly effective with vegetation pixels, which have NDVI values which are much higher, since near-infrared (NIR) reflectance is much larger than red (VIS) reflectance. The same approach works for other differential indexes such as the normalized difference water index (NDWI), normalized difference snow index (NDSI), shortwave infrared $$\left(\frac{SWIR - VIS}{SWIR + VIS}\right),$$

or various permutations of differential vegetation index (e.g., using visible green instead of visible red). Other cloud rejection algorithms can work using other features of clouds. For example, since clouds are white or gray and are usually brighter than land cover they can be rejected over a background which is not white or gray by using an HSV (hue/saturation/value) decomposition of the RGB (red/green/blue) values and selecting pixels which are the lowest value or the lowest saturation.

Figure 10:
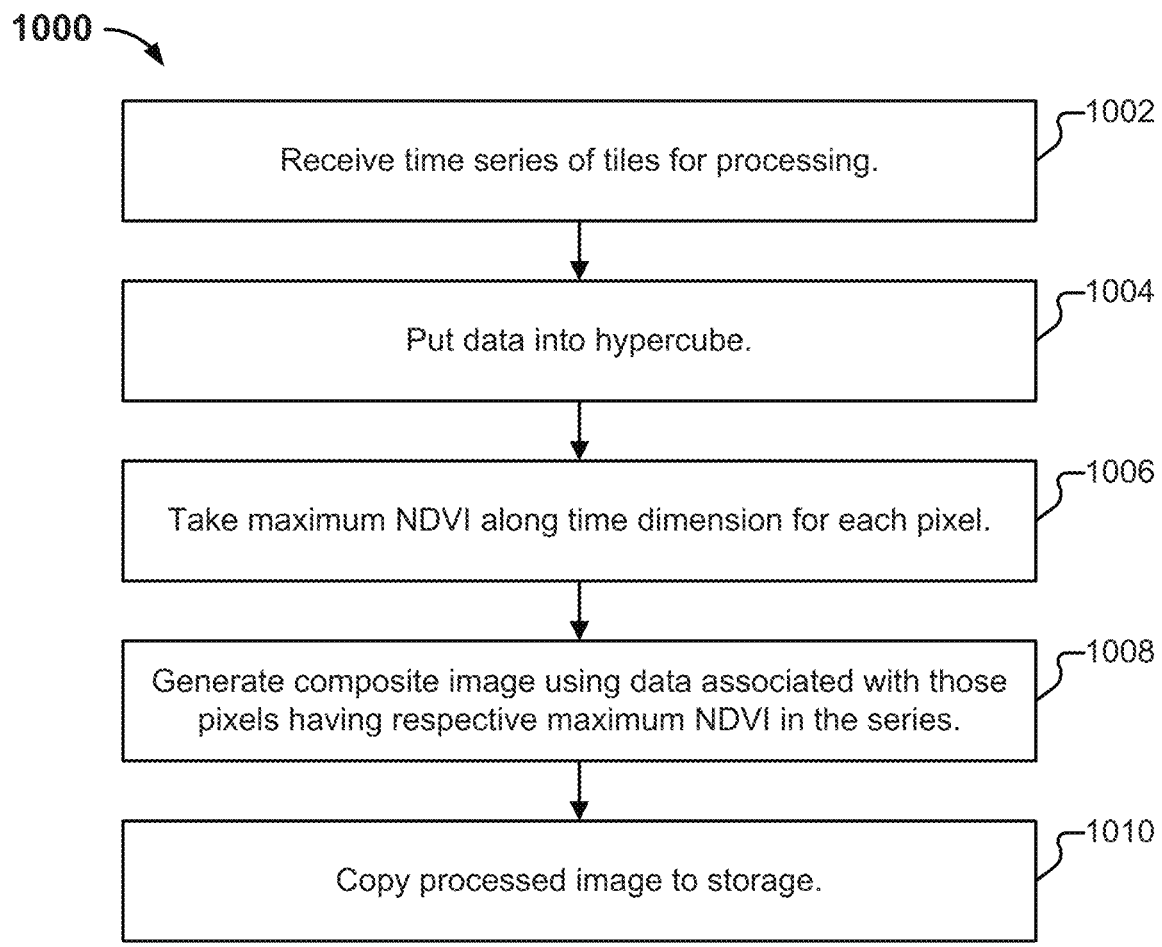
FIG. 10 illustrates an example of a process for creating a composite image.

FIG. 10 illustrates an example of a process for creating a composite image. In various embodiments, process 1000 is performed by image creator module 318.

The process begins at 1002, when a first tile is received for processing, and the previous fifteen (or other appropriate number of) tiles in a time series are also received. As one example, at 1002 image creator module 318 (comprising one or more Google Compute Engine instances and a Celery master) determines that a recently preprocessed tile (e.g., an output of pre-processor module 310) is available and retrieves that tile for additional processing. The images corresponding to the previous fifteen days' worth of that particular tile are also retrieved. As another example, predetermined time sequences of tiles (e.g., days 0-15, 16-31, etc.) are selected for processing (e.g., as the days elapse). Other size bins of data (i.e., other than 16 days) can also be used. Further, different size bins can be used for different regions (e.g., larger bins for cloudier areas) and/or different times of year (e.g., smaller bins in fall and larger bins in spring, where there are fewer clouds in a region in the fall than in the spring). Further, the images included in a bin need not be adjacent temporally. For example, a ten year stack of tiles from the same day of the year (e.g., Jan. 1, 1990; Jan. 1, 1991; Jan. 1, 1992; etc.) can be used as a bin, as can an arbitrary number of tiles selected at arbitrary intervals (e.g., depending on the application).

At 1004, a data hypercube is created by stacking each of the multi-band image tiles in the bin. In one example, the data hypercube created at 1004 is 4-dimensional, with the dimensions being pixel dimension (e.g., Red, Green, Blue, Near-Infrared, NDVI, Collection date), x-dimension, y-dimension, and time dimension. In various other embodiments, additional and/or different bands comprise the multi-band information included in the data hypercube. As process 1000 progresses, the time dimension is compressed to a single layer, and the data is reduced to a cube of values, or a 2-dimensional plane for each image component as applicable.

At 1006, the maximum NDVI is taken along the time dimension (e.g., by a python script). As a simplified example of the processing performed at 1006, suppose the data being operated on at 1006 includes a 3×3 image plane for the NDVI component on a particular day, and that only a total of two days' worth of tiles are used in the time series. Example data for a first day is as follows:

0 143 199
10 155 202
12 147 198

Example data for the second day for the NDVI plane is as follows:

20 122 204
10 157 199
11 141 206

After taking the maximum NDVI over the two days, the image plane would be:

20 143 204
10 157 202
12 147 206.

At 1008, a composite image is generated. As mentioned above, the maximum NDVI is used to determine, for a given pixel position (e.g., 1×1, . . . 3×3), which image's pixel in that position was the most cloud free in the time series. At 1008, the spectral information (e.g., any/all of RGB, NDVI, Infrared, etc.) associated with the "best" pixel (e.g., the one having the maximum NDVI for that pixel position in the set) is used to generate the composite image.

In various embodiments, additional metadata is included in the composite image. For example, the particular day of the year that was selected as the "best" for each pixel can be stored (e.g., day 203). As another example, the total number of valid observations that were considered can be stored. An example of a "valid" observation is any of the non-zero observations seen in FIG. 9 (i.e., not 904 or 906). In various embodiments, other processing (e.g., downstream of process 1000) can make use of the number of valid observations. For example, if out of 20 observations, only two are deemed valid, this could indicate a particularly stormy set of weeks (and that the maximum value recorded for that pixel during those two weeks is not likely to be representative of a cloud free image). A later process can have a requirement that (e.g., a minimum of three valid observations be seen in order for that pixel in that particular composite image to be considered representative.

Finally at 1010 the processed image is stored (e.g., to storage 312). The following is an example file name for a composite image file:

gs://modis-max/utm_v7r_max/2015/
max_2015_df200_15N_03_v7r.tif

The components of the path name are:
gs://: Google Storage designator
modis-max: storage bucket for
utm_v7r_max: type and version
2015: year
max_2015_df200_15N_03_v7r.tif: file name, with day=200, 15N=zone, and row=3

In some embodiments, there is one composite image per tile per day, with approximately 1200 MODIS tiles covering the globe. The resulting composite image can store a variety of features in a single or multiple bands as applicable. For example, the resulting composite image can store a single scalar feature in a single band, or can store one or more vector features in multiple bands.

A variety of analyses/manipulations can be performed using data such as the image data stored in storage 312, whether in conjunction with process 1000 (e.g., as one or more additional steps), or as a separate process (e.g., after the storing performed at 1010, or entirely independent of the execution of process 1000). Further, data from one (e.g., MODIS), or multiple (e.g., MODIS and Landsat) sources can be operated on during embodiments of process 1000, whether individually or in combination.

A variety of example applications using a variety of such techniques are described below. As one example, an image (or set of images, as applicable) can be used to generate a boundary map (an example of which is a field map). The boundary map can be used in a variety of ways. As one example, the map can be used to reduce the noisiness of an image. As a second example, the map can be used in image restoration to reduce artifacts. A boundary map can be also used as a mask to classify regions of an image (e.g., to produce an image of average values within the boundary or otherwise homogenize the pixel values for at least one band of information within the boundary, such as by taking a median value, a minimum value, etc.).

IV. CREATING A BOUNDARY MAP

Some imagery applications work on an image as a whole. As one example, an image search application may take as input a photograph of a giraffe, and provide as output other photographs of giraffes selected from a corpus of photographs. As another example, in some applications (e.g., involving remote-sensing imagery) it is desirable to operate on the smallest area of an image possible (e.g., at the pixel level, which typically corresponds to the smallest area resolvable by the imaging sensor). For yet other applications however (e.g., various applications involving land use classification), it can be more desirable to operate over regions larger than a pixel (but smaller than the image as a whole).

Returning to the example of FIG. 8A, suppose field 808 is a corn field, as is field 818. Field 822 is a soybean field. Each of fields 808, 818, and 822 is an example of a "Common Land Unit (CLU)," described by the Farm Service Agency (FSA) as an individual contiguous farming parcel that has a permanent, contiguous boundary, a common land cover and land management, and a common owner and/or common producer association. The boundaries of a CLU are generally delineated from relatively permanent features such as fence lines, roads, and/or waterways. More generally, as used herein, a field is an example of a region bounded by edges that are temporally persistent.

In various applications, the ability to treat a given pixel as being part of a particular region would be desirable. For example, agricultural land use will generally be uniform over a given field, which will typically occupy multiple pixels in a particular image. Processing each pixel independently can thus be (1) unnecessarily computationally expensive, to the extent that the results of the processing produce different outcomes for a field's pixels, and (2) will also necessarily be needlessly inaccurate. By incorporating the knowledge that groups of pixels should be considered collectively, more accurate results can be produced, with greater efficiency. Accordingly, being able to treat all pixels (e.g., pixel 824) within a given region of a satellite image (e.g., within field 822) uniformly can be beneficial (e.g., when classifying field 822 as containing soybeans vs. corn vs. water). When examining the image depicted in FIG. 8A for land use classification purposes, all of field 808 should be designated "corn field," as should all of field 818. All of field 822 should be designated soybeans.

The USDA makes CLU data available (e.g., as CLU maps). Unfortunately, access to CLU data is restricted to entities certified by the FSA as working in cooperation with the Secretary of Agriculture. A company (or individual), such as an environmental research company or a land use planner (unaffiliated with the Secretary of Agriculture) will accordingly be unlikely to benefit from CLU data.

Even where an entity has access to CLU data, such data has various limitations. As one example, CLU data can become stale. An entity wanting a current boundary map for a particular region (e.g., where land usage has changed and/or where existing CLU data is inaccurate) may have to wait a year or longer for an updated set of government-provided CLU data. As another example, non-agricultural land uses (e.g., rivers, lakes, residential development, industrial development, mines, etc.) are outside the narrow definition of a CLU, as are farming plots outside of the United States and/or potentially American farming plots not associated with the FSA/USA. The ability to uniformly treat all pixels bounded by house 814 (e.g., including pixel 826), or all pixels bounded by river 812 (e.g., including pixels 828 and 830) can be beneficial, despite those regions not representing CLUs.

Using techniques described herein, boundary maps can be created, e.g., from imagery stored in storage 312. In addition to delineating CLUs (also referred to interchangeably herein as "fields"), boundaries of other types of contiguous land use (e.g., forests, grasslands, mines, parking lots, etc.) can also be determined. Further, the approaches described herein can be applied to other forms of imagery (e.g., other than land observations). Accordingly, as used herein, "fields," "regions," and "segments" will generally be used interchangeably, with a CLU being an example of a field/region/segment. While various examples described herein will refer to agricultural fields (e.g., a corn field adjacent to another corn field or a soybean field), "fields" (and the approaches described herein) are not limited to an agriculture context.

A first step in extracting fields (e.g., as a dataset) is to find their boundaries. As mentioned above, field boundaries manifest themselves in satellite imagery as edges that are temporally persistent. That temporal persistence, together with the ability to analyze a stack of satellite images, allows field boundaries to be distinguished from edges arising from ephemeral phenomena (e.g., clouds).

The source imagery for boundary map creation can include satellite imagery from any of several different sources, each of which have been preprocessed and divided into uniform tiles, and stored in Google Cloud Storage (GCS) buckets (e.g., as described above). Images can come from government sources (e.g., Landsat, NAIP) and/or 3rd-party sources (e.g., Planet Labs, RapidEye), as applicable. It is to be noted that while cloud removal has been described as a technology that can be applied to imagery data (e.g., stored in storage 312), cloud-free images are not necessary as input to the applications described below.

One approach to mitigating the effects of cloud and other image clutter is to average pixel values over many images, taken over a long time interval. However, averaging also tends to diminish differences between fields. Adjacent fields with different land uses can look very similar after averaging, diminishing the strength of the edge between them. An alternate approach is to determine edges for each image of a temporal stack, and then average the results over time. While field boundaries may be obscured in some images, over a long enough period of time, they will appear in a greater fraction of the images than ephemeral edges.

The pixel values of a satellite image can be regarded as samples of an underlying function $f(x,y)$, defined at every point on the ground contained within the image. In terms of this function, the values of $f(x,y)$ will change much more at a field boundary than within a field. This can be measured by computing $|\nabla f(x,y)|$. Edges can be characterized as those points $(x,y)$ for which $|\nabla f(x,y)|$ is large, whereas within a field, the gradient will be zero (in an ideal case).

For images, the points $(x,y)$ are only defined at discrete points $\{x_1, x_2, \ldots, x_M\}$ and $\{y_1, y_2, \ldots, y_N\}$. Finite differences can be used to approximate $$\nabla f(x, y) = \left(\frac{\partial f}{\partial x}(x, y), \frac{\partial f}{\partial y}(x, y)\right). \tag{1}$$

-continued $$\frac{\partial f}{\partial x}(x_i, y_j) \approx f(x_{i+1}, y_j) - f(x_i, y_j) = D_x f(x_i, y_j),$$

$$\frac{\partial f}{\partial y}(x_i, y_j) \approx f(x_i, y_{j+1}) - f(x_i, y_j) = D_y f(x_i, y_j). \quad (2)$$

(For i=M or j=N, Neumann boundary conditions can be used. That is, $D_x f(x_M, y_j) = 0 = D_y f(x_i, y_N)$ is assigned.)

The discrete gradient magnitude:

$$|Df(x_i, y_j)| = \sqrt{|D_x f(x_i, y_j)|^2 + |D_y f(x_i, y_j)|^2}. \quad (3)$$

is defined for images with multiple spectral bands, so that each $f(x_i, y_j)$ is a vector $(f(x_i, y_j), \ldots, f_L(x_i, y_j))$, and $D_x f$ and $D_y f$ will be vector-valued as well. Then $|D_x f(x_i, y_j)|$ is the length of this vector:

$$|D_x f(x_i, y_j)|^2 = \sum_{k=1}^{L} (D_x f_k(x_i, y_j))^2, \quad (4)$$

and similarly for $|D_y f(x_i, y_j)|$.

The finite difference operators $D_x$, $D_y$ are implemented using sparse matrices, so that the "differentiation" process includes reshaping an image $f$ into a vector, multiplying by the appropriate matrix, then reshaping back into an image. The construction of the sparse matrices is as follows. First, one-dimensional finite differencing (with Neumann boundary conditions) of a vector with K components is obtained with the following matrix:

$$B_K = \begin{pmatrix} -1 & 1 & 0 & 0 & \ldots & 0 \\ 0 & -1 & 1 & 0 & \ldots & 0 \\ \vdots & & \ddots & \ddots & & \vdots \\ 0 & \ldots & 0 & -1 & 1 & 0 \\ 0 & \ldots & 0 & 0 & -1 & 1 \\ 0 & \ldots & 0 & 0 & 0 & 0 \end{pmatrix}. \quad (5)$$

Accounting for the location of indices to correspond to differentiation with respect to x or y is accomplished using Kronecker products. If $I_L$ denotes the L×L identity matrix, then for use with M×N×L images, $$D_x = (I_M \otimes B_N) \otimes I_L, \quad (6)$$

$$D_y = (B_M \otimes I_N) \otimes I_L. \quad (7)$$

This produces matrices that are (MNL)×(MNL) in size. They are constructed so that if $f$ is an M×N×L image, unwinding the pixel values of f into a vector, multiplying this vector by the matrix, and then reshaping the product back into an image will give the desired finite-difference derivative.

A. Example Process

Figure 11:
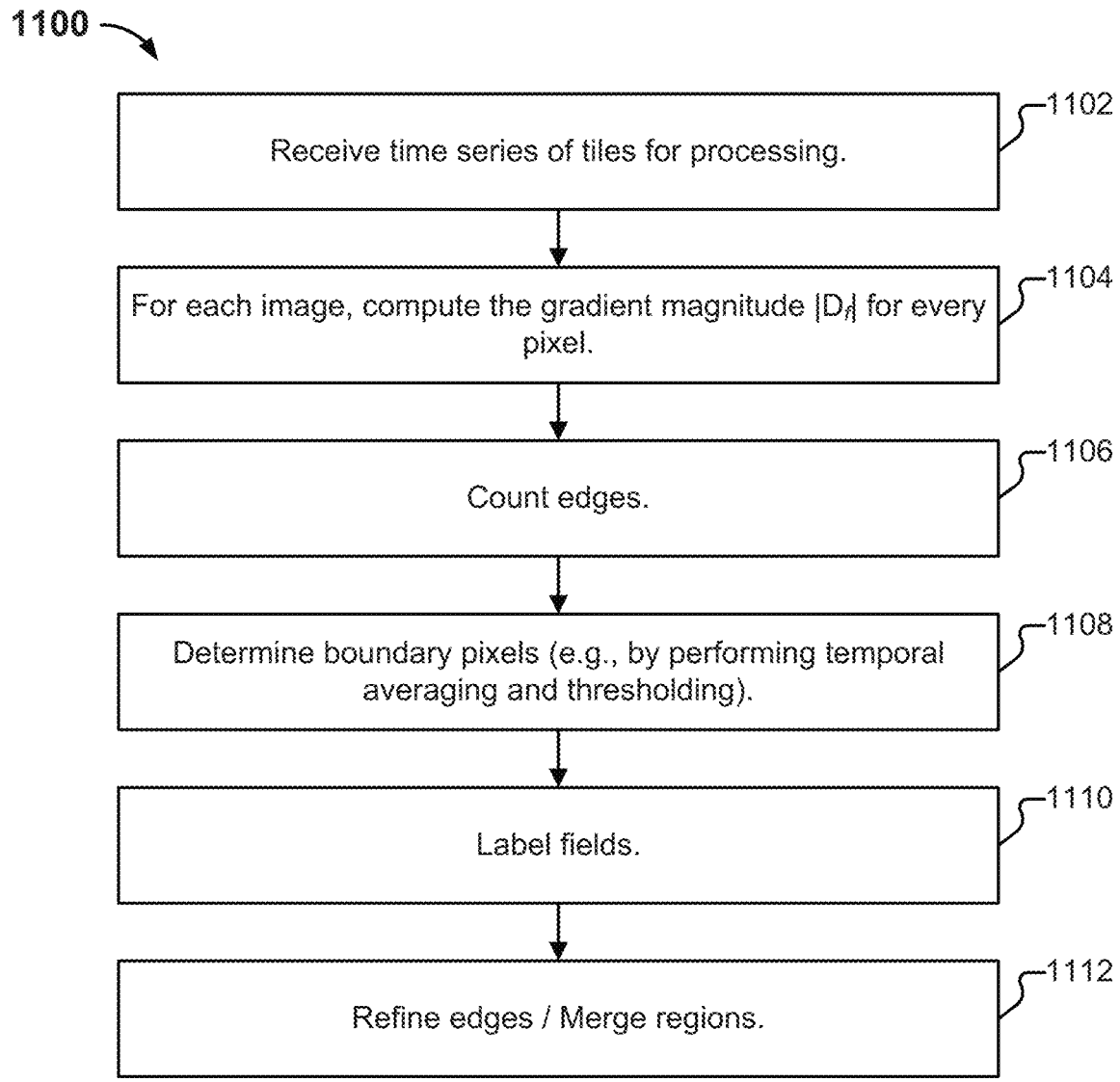
FIG. 11 illustrates an example of a process for creating a boundary map.

FIG. 11 illustrates an example of a process for creating a boundary map. In various embodiments, process 1100 is performed by boundary map creator module 320. The map is created by extracting fields from satellite images of a particular location, for which there may be many different observations over a period of many years. As will be described in more detail below, process 1100 can be terminated prior to the completion of the boundary map, as intermediate products (e.g., the output of portion 1108 of the process) are also useful for various applications.

One example way to implement boundary map creator module 320 is (as with other components of platform 302) to use a combination of python scripts and libraries (e.g., NumPy, sciPy, scikit-image). In particular, computation can be performed using a set of one or more Google Compute Engine virtual machine instances. Parallelization over tiles and dates (the latter for gradient computation, which is done independently with each image) can be performed using either a Celery master or with Bash shell scripts, depending on the geographic scope of the computation.

Figure 12B:
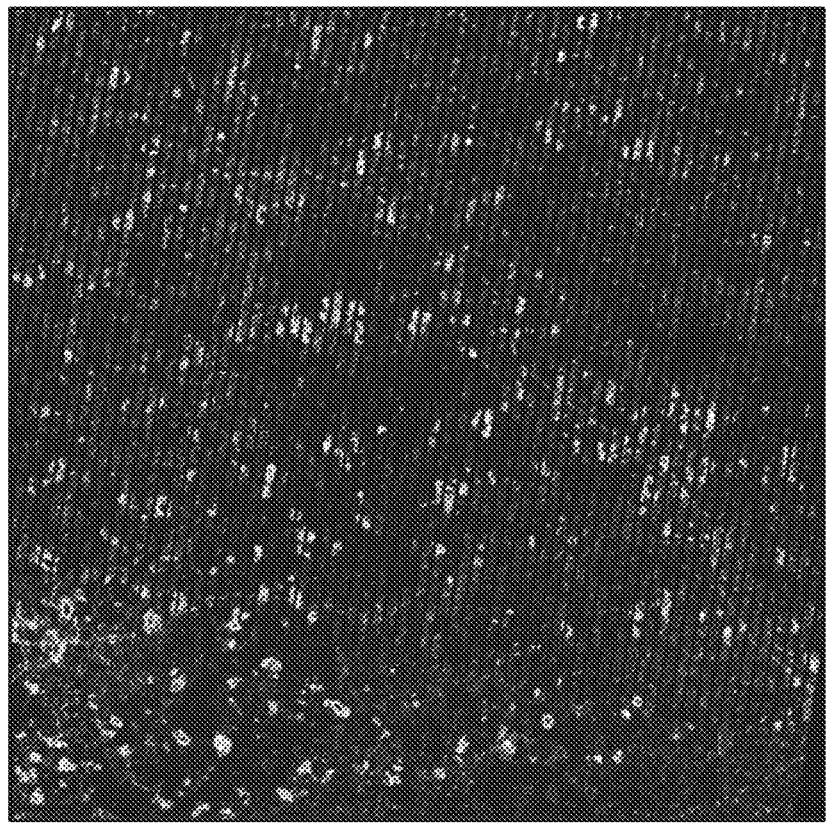
FIG. 12B depicts a gradient magnitude image.
Figure 12A:
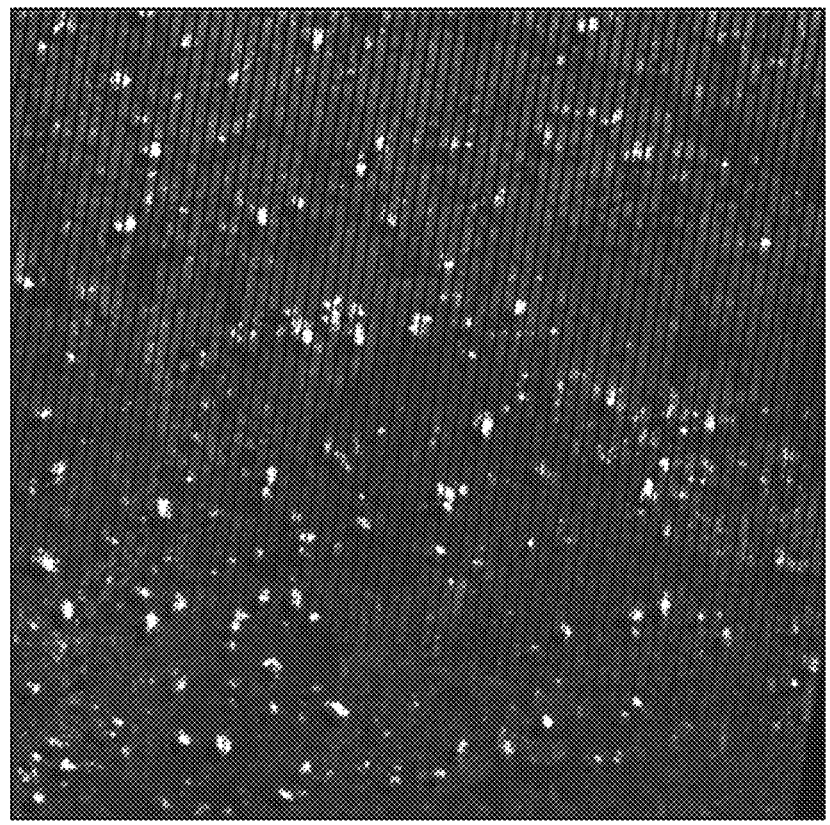
FIG. 12A depicts a portion of a Landsat 7 image.

The process begins at 1102, when a set of images corresponding to a particular tile is received. As one example, at 1102 boundary map creator module 320 receives an instruction (e.g., in response to the execution of a periodic script, or in response to a user request submitted via a web frontend) to generate a boundary map for a particular portion of land (e.g., by receiving a set of bounding coordinates, an identification of a particular tile identifier, etc.). A set of tiles corresponding to the location is retrieved for processing. As one example, suppose a request is received to generate a boundary map for the portion of land depicted in FIG. 12A. FIG. 12A is an example of a 2048×2048 sized portion of a Landsat 7 image and includes clouds, cloud shadows, incomplete tile coverage, and the scanline corrector artifact. At 1102, tile 1200 is retrieved, along with a time series of other tiles depicting that portion of land. In one example, fifteen years of imagery, with approximately forty observations a year, is retrieved at 1102 (approximately 600 images retrieved).

The scope of the set of tiles retrieved at 1102 can be adjusted as applicable (e.g., taking into account tradeoffs). The longer the time series (e.g., fifteen years vs. two years), the less likely it will be for clutter (e.g., scanline artifacts, incomplete tile coverage, clouds, etc.) to erroneously impact boundary lines. However, a longer time series can also result in reduced currency. For example, suppose a field was bisected three years ago (or its usage changed (e.g., from rural to urban)). When fifteen years of images are examined, the changes made three years ago may not be identified as sufficiently persistent. Similarly, boundary maps for portions of land that are generally less cloudy (e.g., portions of Arizona desert) may achieve results of similar quality to those of cloudier environments (e.g., portions of Colorado) with a smaller time series (e.g., three years of observations instead of fifteen). As yet another example, process 1100 can be performed using multiple kinds of observations (e.g., processed Landsat tiles and drone photographs that have been preprocessed to align with the portion of land being operated on). For example, a farmer or other entity may desire a highly accurate boundary map to be generated for a 50-mile radius of a particular grain elevator using a set of recent observations (e.g., obtained once a day over the last week via low flying aircraft).

At 1104, a gradient magnitude image is created for each image in the set of images retrieved at 1102. The gradient magnitude $|D_f|$ is computed for every pixel in a given image in the set of retrieved images of the location (e.g., using python code with a differentiation library and a sparse matrix library). A threshold value of $|Df|$ that empirically provides a reasonable separation between edge pixels and within-field pixel fluctuations is selected. One example of such a threshold value is 50. It is also possible to leave $|Df|$ unthresholded, or to use a threshold value of 0, and rely on temporal persistence to seperate edge pixels from within-field pixel fluctuations. In the case of multi-band imagery, each band can be independently processed in accordance with process 1100, and the results can be variously combined. As one example, suppose a set of imagery includes six bands of spectral information. Six gradients can be respectively determined at 1104 (e.g., in parallel) for each of the six bands, and a six component vector generated. The gradient magnitude image created for each received image at 1104 can be stored in storage 312 (e.g., as a GeoTIFF image, preserving georeferencing information). FIG. 19B depicts a gradient magnitude image corresponding to the image depicted in FIG. 12A. The content of the image shown in FIG. 12B is the magnitude of the gradient at every pixel in image 1200 and summing over bands (resulting in a single band image).

Figure 13:
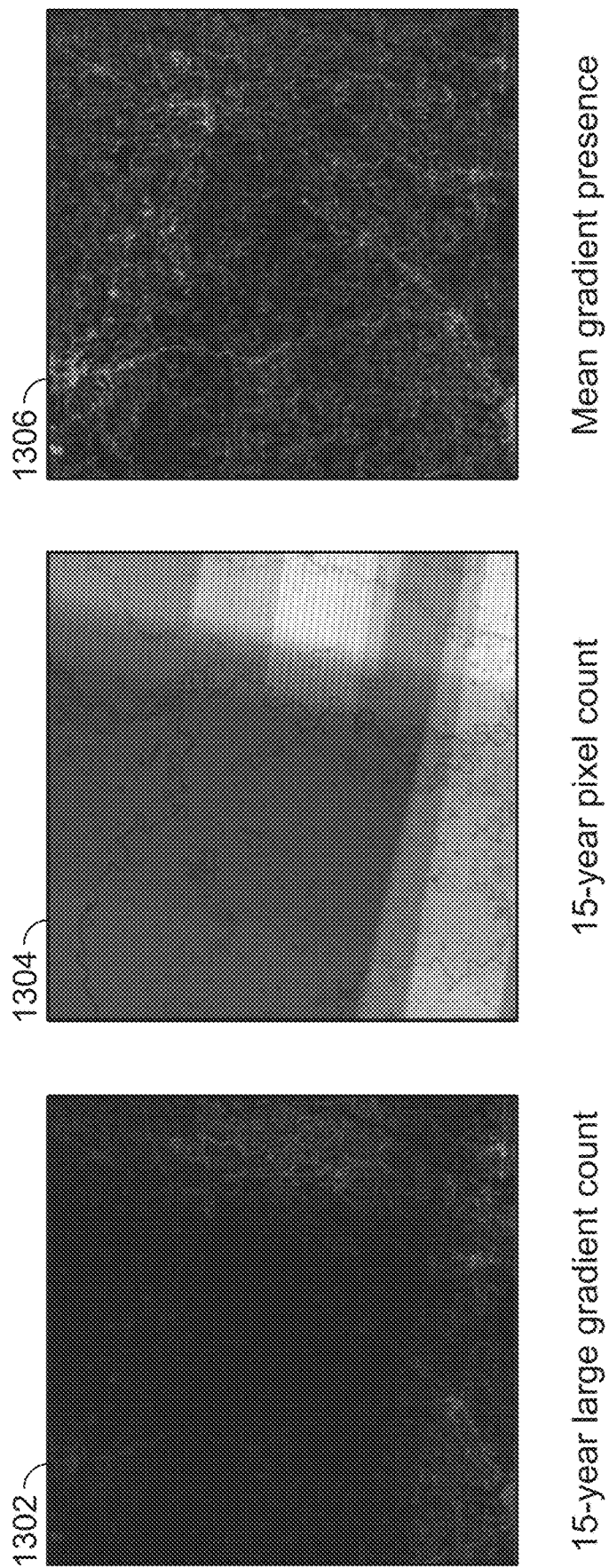
FIG. 13 depicts a gradient count image, a presence count image, and a gradient presence image.

At 1106, each of the gradient magnitude images (generated at 1104) is examined to tally the number of times a given pixel exceeds the gradient threshold. The edge count (across all the images in the set of retrieved images of the location) is saved as a gradient count image (e.g., as a GeoTiff image) in storage 312. An example of a gradient count image is shown at 1302 in FIG. 13. As shown at 1302, for each pixel, the brightness indicates how many times in the time series (e.g., set of 600 images) the pixel met the edge criteria (i.e., had a gradient magnitude that exceeded the threshold). As shown variously at 1302, structural outlines are present. Approximately 75% of the image (starting from the upper left corner of the image) is darker than the rest. The darkening is due to the Landsat pattern.

As mentioned above, in some cases, observational data for some pixels within a given observation may be missing. As one example, region 402 of the image depicted in FIG. 4A is a region where no data was available in a Landsat 1 MSS observation. If the observation depicted in FIG. 4A was the only observation used to make a boundary map, it might be the case that the edges of region 402 might erroneously be classified as edges. Where a time series of many tiles is used in process 1100, an occasional instance of missing observational data for a given pixel is unlikely to impact the final boundary map, as most of the other observations will contain usable data. It is possible, however, that many observations of the same region in a time series may be missing observational data. The varying intersection of an image with Landsat scenes means that some pixels are outside the intersection more often than others. Another issue is the scanline corrector artifact of Landsat 7, which affects some pixels more than others.

One approach to mitigating the erroneous classification as edges of the boundaries of observed pixels with pixels missing data is to tally the number of times each pixel is not within the NODATA region for each image. The presence count (across all the images in the set of retrieved images of the location) is also saved as an image. An example of a presence count image is shown at 1304 in FIG. 13. One way to determine which pixels are within the NODATA region is (e.g., during preprocessing of the image described above) to reserve a pixel data value of 0 for NODATA. A pixel for which data is present but the measured value is very low can be rounded up (if needed) to preserve the meaning of 0 as NODATA. As needed, the NODATA 0 value can be converted to a not a number (NaN) value for use in additional processing. As shown at 1304, for each pixel, the brightness indicates how many times in the time series (e.g., set of 600 images) the pixel was not in a NODATA region (i.e., data was captured by the imaging sensor for the pixel). As with 1302, as shown variously at 1304, structural outlines are present. And, approximately 75% of the image (starting from the upper left corner of the image) is darker than the rest. The darkening is due to the Landsat capture pattern. Further, scanline related errors are visible along the right side of the image as stripes, with some pixels having fewer observations than others due to obscuring by Landsat 7 artifacts.

The pixelwise quotient of the edge count and presence count (from the respective edge count image and presence count image) gives the frequency with which each pixel, when present, is considered to be an edge pixel (1306). This gives a measure of each pixel's edge persistence. Any arithmetic involving a NaN value will result in a NaN value (e.g., when the difference is taken), so the finite difference involving pixels in the NODATA region will also be a NaN.

Figure 15:
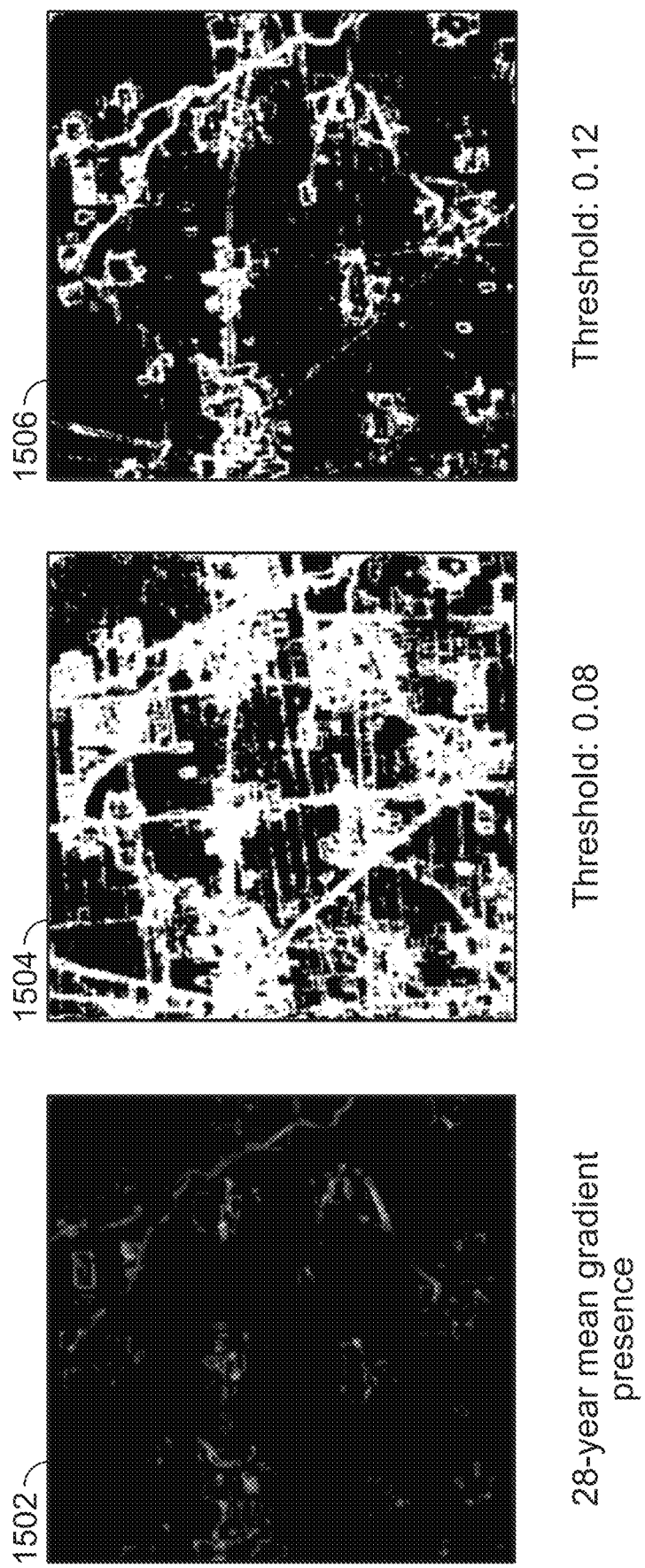
FIG. 15 depicts gradient presence images.

Suppose that the pixelwise quotient of the edge count and presence count for a given pixel is 0.20. This means that 20% of the time the pixel was observed, it was determined to be an edge pixel. A threshold for this quantity is chosen, and used at 1108 to make a final selection of those pixels that are considered to be part of field boundaries. The result is saved (e.g., in storage 312) as a binary GeoTIFF image, indicating which pixels are boundaries. Examples of two different thresholds (0.20 and 0.15) being applied to the same gradient presence image are shown in FIG. 14 (as image 1402 and image 1404). The tradeoff in selecting a threshold value is the inclusion of spurious edges (lower threshold) vs. edge incompleteness (higher threshold). FIG. 15 illustrates a 28-year mean gradient presence image of a portion of land in China at 1502. Greater cloudiness and smaller field sizes make boundary detection more challenging. Examples of two different thresholds (0.08 and 0.12) being applied to image 1502 are shown as image 1504 and image 1506.

The binary image generated as output at 1108 (an example of which is shown at 1306 in FIG. 13) can be used for a variety of purposes. One example is as a mask (e.g., indicating which portions of a region are edges/boundaries and, e.g., when the mask is inverted, which are not). Accordingly, in various embodiments, process 1100 ends at 1108, with the generation of a binary image such as image 1306.

The output of portion 1108 of process 1100 can be enhanced/refined, for example to generate a boundary/field map in which individual fields are identified and given labels. One approach is as follows. Take the set of identified non-boundary pixels (e.g., from the output of portion 1108), and separate them into connected components. One way to do this is using a Python package such as scikit-image, which provides image processing functionality (including for finding connected components) and uses NumPy arrays as image objects. Other packages providing morphological processing can also be used, as applicable (e.g., scipy.ndimage). At 1110, each such connected component is given a positive integer label as an identifier (e.g., using a "label" function made available by an appropriate Python package for labeling connected components). The set of pixels having a common label now constitute a field, and the boundary pixels are not (yet) assigned a field. The assignments are saved as an integer-valued image. FIG. 16, at 1602, depicts a set of fields (connected components) to which a random color map has been applied (i.e., with each pixel within an arbitrary field being colored the same as the other pixels in that field). Edges can be refined by alternately interpolating (1604) and redifferentiating (1606), described in more detail below.

Imperfections in the edge identification process can lead to issues such as excessively thick edges, and stray edge pixels wholly interior to fields. The boundaries can be optionally refined/improved (at 1112) using a variety of techniques. For example, skeletonizing can be used to thin edges to one-pixel thick, without changing connectivity.

Interpolation can be used to assign field labels to each edge pixel, according to which field each edge pixel is closest to. Recomputing edge pixels, by once again computing gradients and assigning nonzero pixels to edges, allows refinement processing to be repeated. For example, portions 1104-1108 of process 1100 can be performed using the output of 1110. Different thresholds can be used, e.g., with the gradient threshold being set at ≥1. Such processing can be terminated variously depending on application. As one example, a final boundary map can be created after skeletonization, resulting in a boundary map with fields having a one-pixel-thick edge. As another example, a final boundary map can be created after interpolation, resulting in a boundary map with every pixel assigned to a field. As mentioned above, each field is assigned (e.g., via labeling) a positive integer value that can be used as a field ID or other label. One example of a format for a final boundary map is to save it as a raster image (e.g., in storage 312) which has a field ID for each pixel. The field ID (minus 1) can be used as an index for conversion between rasters and field-value arrays. In various embodiments, additional types of output are saved in conjunction with process 1100, such as a variety of shapefiles that describe different field polygons, and state rasters (e.g., comprising those fields within their boundaries). The shapefiles provide the vertices of polygons in geographical coordinates. In various embodiments, certain types of land use, such as urban areas and large bodies of water are not enclosed in any polygons and are left blank.

Process 1100 has been described thus far in terms of creating a boundary map for a single tile. A boundary map over a larger area can also be created (e.g., over a region such as a state) by merging smaller-scale maps. In various embodiments, the margining is performed at 1108, so that fields can be (re)labeled at the larger scale, and to avoid artificial boundaries at the edges of the smaller scale maps.

Portions of process 1100 are described above as being performed on all tiles in the set (e.g., 1102 where tiles are received, followed by 1104 where each image has a gradient magnitude determined for each pixel). As explained above, in some embodiments processing on all tiles is performed in parallel, e.g., with all tiles being retrieved at once, and then each of the retrieved tiles having per-pixel gradient magnitudes determined in parallel (e.g., using Celery architecture). In other embodiments, at least some portions of process 1100 are performed serially, e.g., with a single image being retrieved at 1102, and portions 1104-1106 performed with respect to that image, followed by a second image being retrieved at 1102 and portions 1104-1106 performed with respect to the second image, etc., until all images have been processed in accordance with portions 1102-1106 and processing continues (for the set) at 1108.

B. Example Application: Improving Classification

Certain portions of land, such as agricultural fields, are generally uniform in what they contain. For example, in a given farmer's field (e.g., a CLU), typically one type of crop (e.g., corn or soybeans) will be grown. And, typically, the contents within a given field are likely to change over time in the same way (e.g., grow at the same rate, produce the same yield, be affected by pests in the same manner, etc.).

A field will typically, when observed with remote imagery sensors, comprise several pixels. Some forms of image analysis operate at the pixel level (and, e.g., arrive at a per-pixel result). When each pixel of the field is analyzed (e.g., by a land use classification technique or set of techniques), it is possible that while most of the pixels within the field will be classified as corn, various stray pixels within the field may be classified as soybeans, whether due to errors in classification technique, limitations in the image(s) being analyzed, etc. As explained above, for some applications (e.g., land use classification and yield prediction), it may be desirable for results to be made uniform across an area (e.g., treating the field as the fundamental unit and/or arriving at a per-field result). As will be described in more detail below, boundary maps can be used (e.g., in conjunction with per-pixel analysis approaches) to achieve more uniform results.

Figure 17:
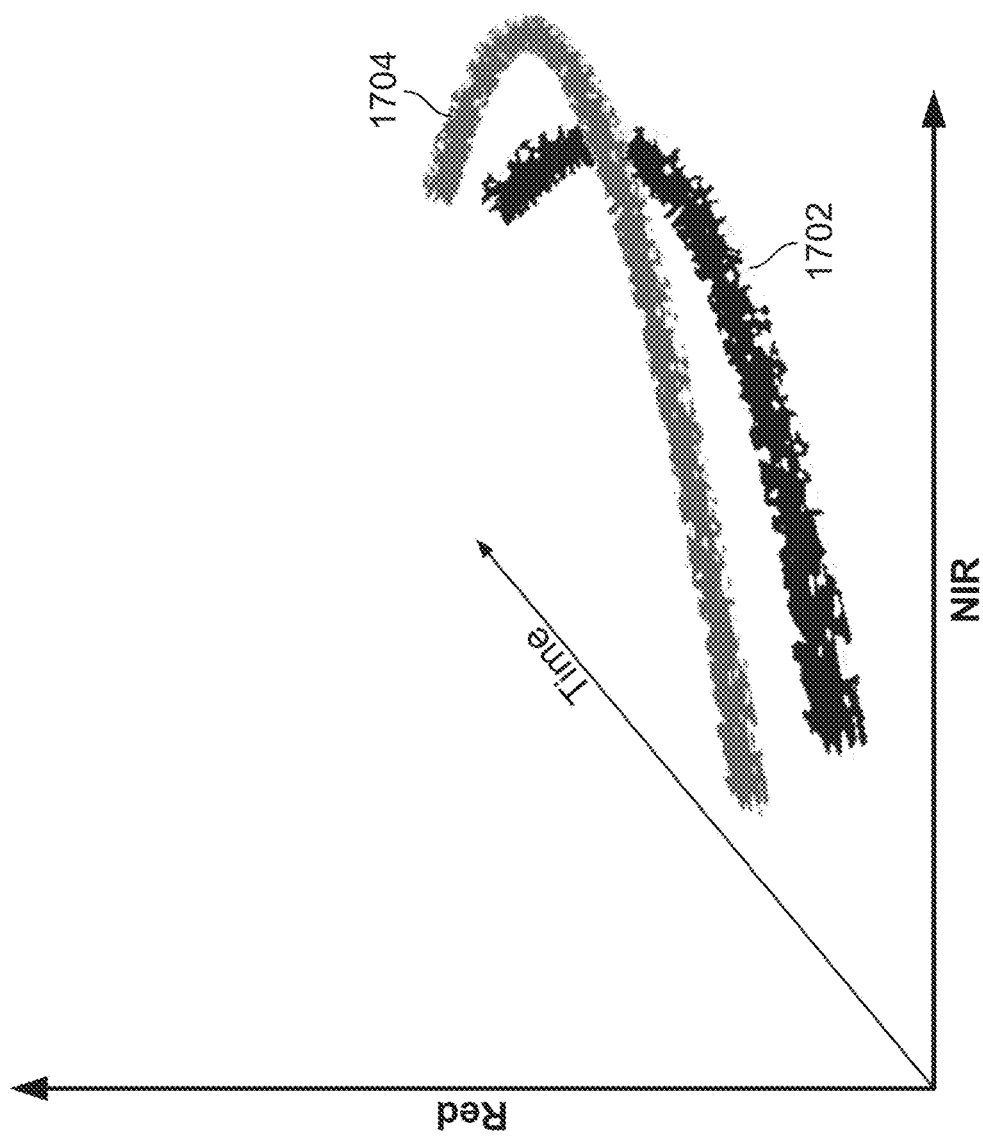
FIG. 17 illustrates a three-dimensional representation of how the spectral signatures of two different crops change over time during a typical growing season.

As shown in FIG. 3, platform 302 includes a classifier 322 (e.g., a land use classifier) that can classify portions of land. One way to implement classifier 322 is as a python script (or set of scripts). In various embodiments, classifier 322 takes as input an identification of a portion of land (e.g., a particular tile identifier, set of coordinates, etc.) and evaluates the land using a model 324. Model 324 is trained using a training set of imagery (and optionally additional data) for which land use classification has already been performed, and an appropriate machine learning technique, such as a random forest (e.g., using functionality provided by scikit-learn). FIG. 17 illustrates a three-dimensional representation of how the spectral signatures of two different crops (corn 1702 and soybeans 1704) change over time during a typical growing season. In particular, FIG. 17 tracks the brightness of a corn pixel and a soybean pixel, respectively, in the red and near infrared spectral bands, over time. Other bands can also be used instead of/in addition to the spectral bands represented in FIG. 17, and four-dimensional and other representations constructed similarly to what is depicted in FIG. 17.

Different types of land cover (e.g., corn, vs. soy, vs. forest, vs. pavement, etc.) will trace out different curves in a space such as is depicted in FIG. 17 (also referred to herein as "light curves"). The differences in such curves can be used in machine learning training (e.g., using a random forest and/or support vector machine) to differentiate between the different kinds of land usage and ultimately to classify images accordingly. Light curves can also be indicators of how healthy a crop is, and/or to predict yield. As one example, during the growing season, when a plant starts photosynthesizing actively, it becomes much more reflective in the near infrared than it is in the red, and so its NDVI values increase. As the plant matures, the NDVI value will increase even further, and then begin to plateau. Eventually, as the plant begins to brown, the NDVI will start to decrease, and, when the plant is harvested or otherwise removed from the land, the NDVI will drop significantly.

Figure 18A:
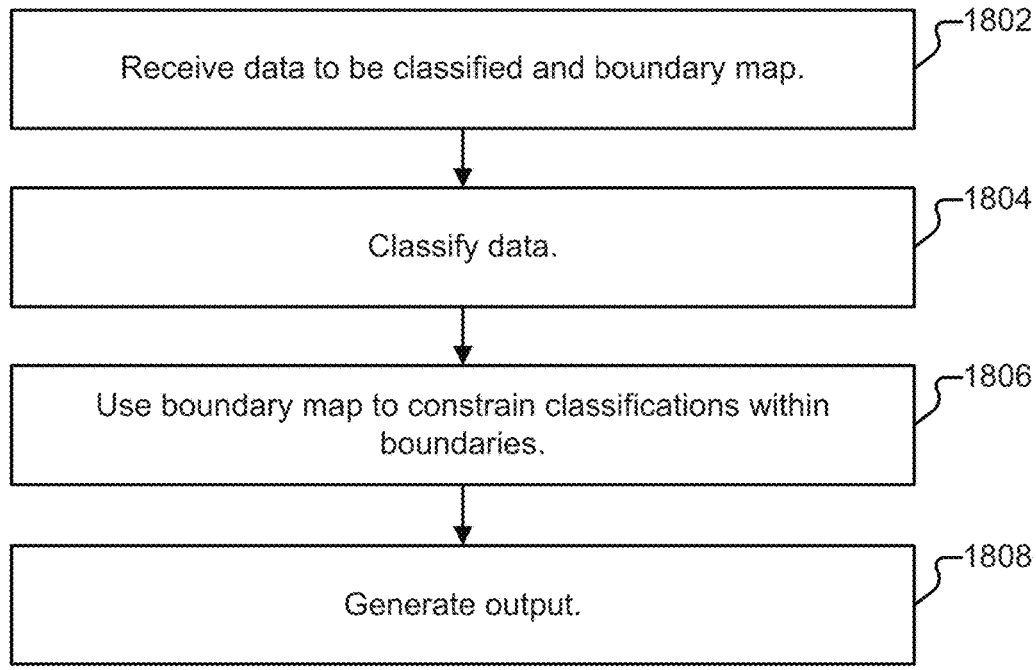
FIGS. 18A and 18B illustrate example processes for enhancing a classification using a boundary map.
Figure 18B:
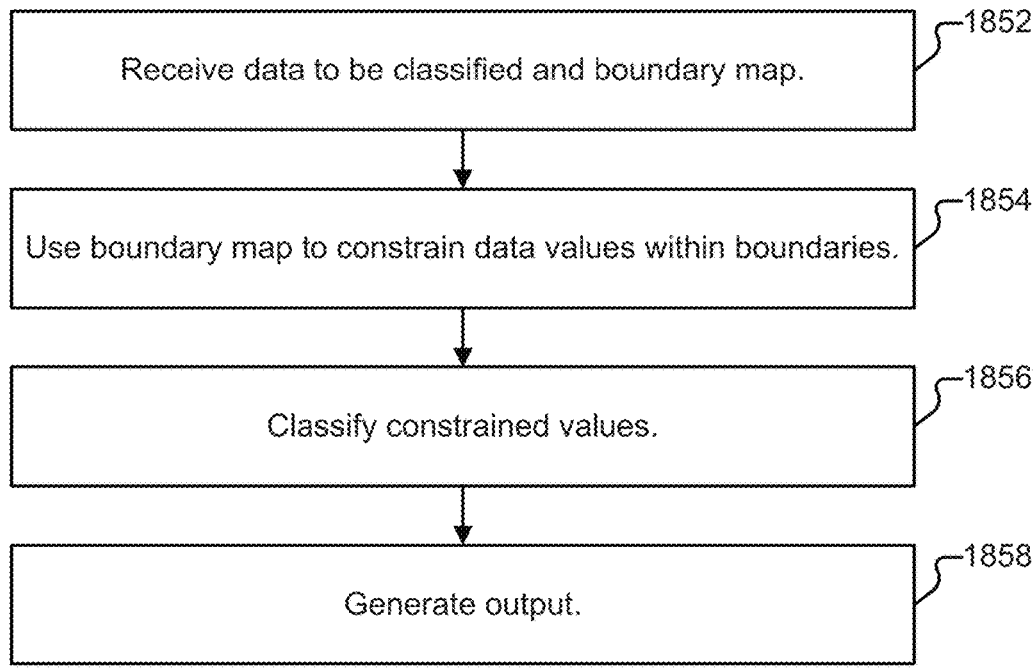

One approach to classifying land is to independently evaluate each pixel (e.g., using model 324) and classify each pixel (e.g., as corn, water, road, etc.) accordingly. A boundary map, such as one produced in accordance with process 1100, can be used as an additional input to classifier 322, to help improve the classification results. The boundary map can be applied after an initial classification is performed (FIG. 18A). The boundary map can also be applied prior to classification (FIG. 18B). Further, the boundary map can be used in conjunction with other types of analysis, such as yield estimation.

FIG. 18A illustrates an example of a process for enhancing a classification using a boundary map. In various embodiments, process 1800 is performed by classifier 322. The process begins at 1802 when data to be classified, and a boundary map, are received. One example of the data received at 1802 is a time series depicting the region shown in FIG. 8A across a time window such as a month, or a year.

At 1804, the data received at 1802 is classified. As one example, for each pixel in a given position (e.g., pixel 1,1 across all received images) classifier 322 evaluates the data associated with the pixel and assigns a classification. Examples of such data include a single spectral band (e.g., Near Infrared), a set of bands (e.g., all Landsat bands), and/or data from other sources associated with the pixel (e.g., a vector of statistical information such as rainfall statistics, ground temperature, etc. mapped to each pixel).

Figure 19:
FIG. 19 depicts various fields in Iowa.

FIG. 19 depicts various fields in Iowa, including corn fields (1904) and soybean fields (1902). Suppose classifier 322 is examining a stack of images corresponding to the land shown in FIG. 19. It classifies the land covered by pixels 1906 and 1910 as soybeans, but classifies the land covered by pixel 1908 as corn. It is possible that the land covered by pixel 1908 is in fact corn. It is also possible that a problem with the data and/or a problem with the classifier erroneously resulted in pixel 1908 being classified as corn. Irrespective of the reason pixel 1908 is identified as corn, for many applications, it would be desirable for pixel 1908 to be identified as soybeans.

Returning to process 1800, a boundary map can be used to constrain classification results so that, given a statistic or set of statistics associated with a given pixel in a time series, the results will be uniform over a field. For certain types of data (e.g., used in a field classification), each pixel within a field (e.g., sharing the same field ID) can vote for the value that should be applied to the field as a whole. So, for example, if 95% of the pixels within a field are classified as soybeans, and 5% are corn (or other classifications) at 1804, all pixels within the field boundaries can be classified as soybeans at 1806.

Other kinds of analysis can also be performed in accordance with process 1800 and process 1800 can be adapted as applicable. As one example, statistics such as rate of growth may be computed, per pixel, for the time series at 1804. And, at 1806, the average value can be determined across all pixels within each field.

Classifier 322 can generate a variety of different types of output at 1808 as applicable. For example, classifier 322 can generate a classification map (e.g., in GeoTIFF format) which identifies, at each pixel in the image, a numeric value corresponding to the land use classification determined by the classifier. In various embodiments, classifier 322 is trained using up to 256 classes (covered by an unsigned 8-bit integer) with, for example, "01" representing corn, "02" representing soybeans, "03" representing wheat, "04" representing evergreen trees, etc.

Classifier 322 can also generate, for each/arbitrary classifications, a binary mask (e.g., corn mask indicating whether a given pixel is corn (value=1) or not (value=0); a soybean mask indicating whether a given pixel is soybeans (value=1) or not (value=0); etc.). As another example, instead of (or in addition to) conclusively assigning a particular label ("01") to a given pixel, classifier 322 generates a probability (or confidence) that a particular pixel is a given classification. In this scenario, the land covered by an arbitrary pixel might be 78% likely to be corn (corn=0.78), 15% likely to be soybeans (soybeans=0.15), 4% likely to be wheat (wheat=0.04), etc. In this scenario, classifier 322 can optionally select as a classification for the pixel the land use that has the highest score (subject to a threshold, such as 40% confidence). As yet another example of output that can be generated at 1808, classifier 322 can store (e.g., in a table or other appropriate data structure) a classification for a given field ID, without (or in addition to) generating a classification map. (E.g., with an arbitrary field identified as fieldID=233982 having a classification of "02" and another field identified as fieldID=233983 having a classification of "01").

The output of classifier 322 can also be consumed by other processes/components of platform 302 for a variety of purposes. As one example, yield predictor 326 (a script or set of scripts) can take as input classification data (from classifier 1222) and additional data such as rainfall/sunlight, and light curve information for a given region, to generate yield estimates for the region (e.g., using a model 328 trained using historical information).

FIG. 18B illustrates an example of a process for enhancing a classification using a boundary map. In various embodiments, process 1850 is performed by classifier 322. The process begins at 1852 when data to be classified, and a boundary map, are received. One example of the data received at 1852 is a time series depicting the region shown in FIG. 8A across a time window such as a month, or a year.

At 1854, a boundary map is used to constrain the values that will be input into classifier 322. As one example, at 1854, for each image in the time series received at 1852, the average value across all pixels within a particular field is set as the value for each pixel within the field. Suppose, for a single image in a time series of images, pixel 1906 has a green channel value of 0.90, pixel 1908 has a green channel value of 0.60, and pixel 1910 has a green channel value of 0.80. At 1954, a green channel value of 0.77 will be set for all three pixels (1906, 1908, and 1910), prior to being provided to classifier 322. Average values for other channels will similarly be applied to pixels 1906, 1908, and 1910. (It is to be noted that the average value will be taken across all pixels within a given field, not just pixels 1906, 1908, and 1910. Values for the remaining pixels have been omitted for simplicity.)

At 1856, classifier 322 classifies the results of the processing performed at 1854. Specifically, classifier 322 will operate on the average value for each pixel in a given field, across the time series. As with process 1800, other kinds of analysis can also be performed in accordance with process 1850 and process 1850 can be adapted as applicable. And, as with process 1800, classifier 322 can generate a variety of different types of output at 1858 as applicable, including classification maps, tables of classifications, etc.

FIG. 20A illustrates an example of a portion of land classified without use of a boundary map (e.g., using classifier 322 on a time series of data without using a boundary map). As seen at 2002, a single pixel (or small set of pixels) has been classified as one type of crop in classification map 2000, but is surrounded by pixels classified as a second type of crop (in region 2004). FIG. 20B illustrates an example of a boundary map for the scene depicted in FIG. 20A. Boundary map 2010 is an example of a map that can be produced in accordance with process 1100. As shown in FIG. 20B, region 2006 is a single field. FIG. 20C illustrates an example result where the time series data used to produce the classification map 2000 and boundary map 2010 are both provided to classifier 322. As shown in FIG. 20C, all pixels in region 2008 are classified as the same crop. FIG. 20C depicts a classification map, which is an example of output producible using either process 1800 or 1850 (at 1808 or 1858).

C. Example Applications: Correcting Artifacts, Upsampling Images, and Denoising Images Boundary maps, such as those that can be created using embodiments of process 1100, can be used to improve land use classification results (e.g., as explained in conjunction with FIGS. 18A and 18B). Boundary maps (whether made in accordance with embodiments of process 1100 or otherwise provided, e.g., as CLU data) can also be used in other applications to improve other kinds of results. Examples of such other applications include correcting artifacts such as scanline correction errors, upsampling images, and denoising images.

Figure 21C:
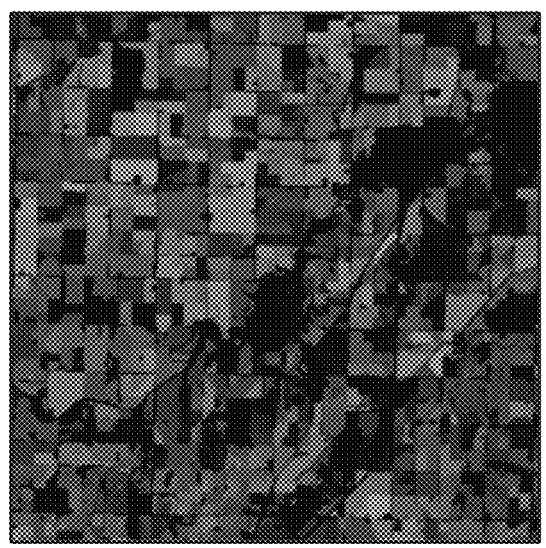
FIG. 21C illustrates a result of providing the image shown in FIG. 21A and the boundary map shown in FIG. 21B as input to process 2300.
Figure 21B:
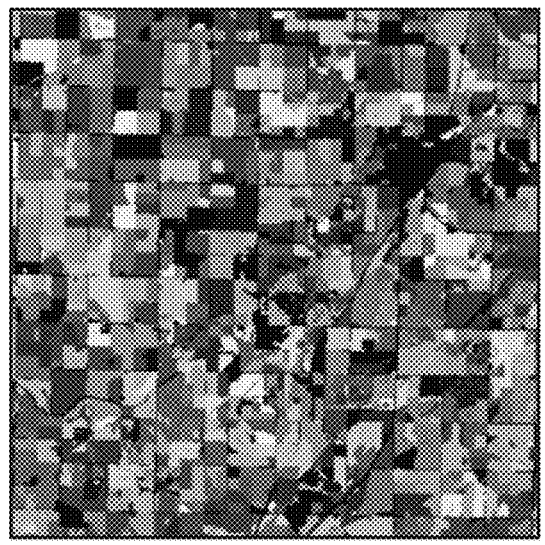
FIG. 21B depicts a boundary map.
Figure 21A:
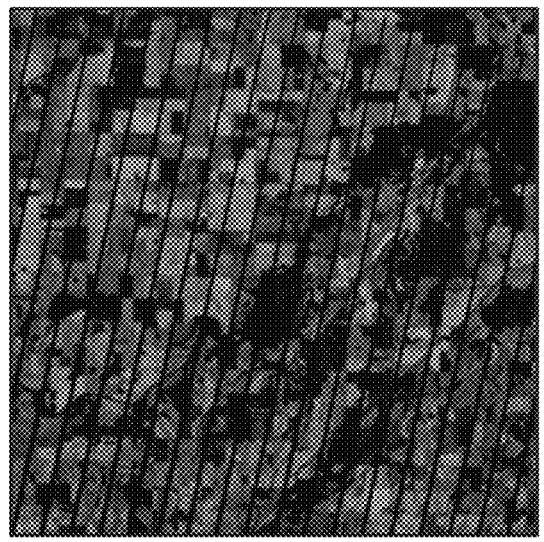
FIG. 21A depicts a Landsat 7 image.
Figure 22C:
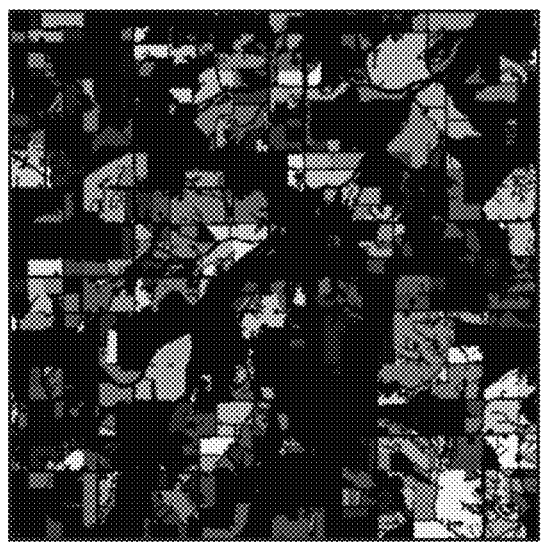
FIG. 22C illustrates a result of providing the image shown in FIG. 22A and the boundary map shown in FIG. 22B as input to process 2300.
Figure 22B:
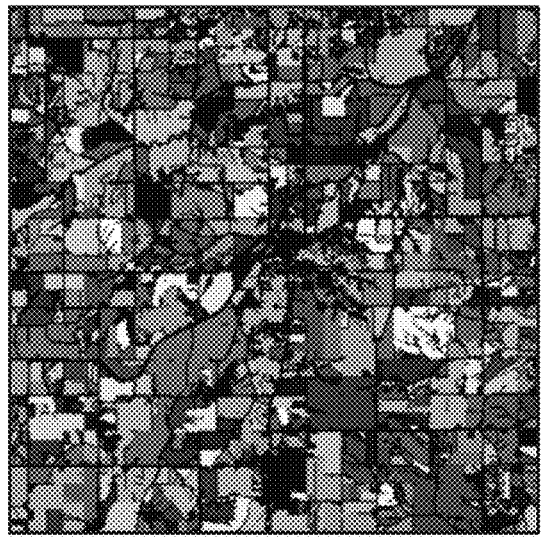
FIG. 22B depicts a boundary map.
Figure 22A:
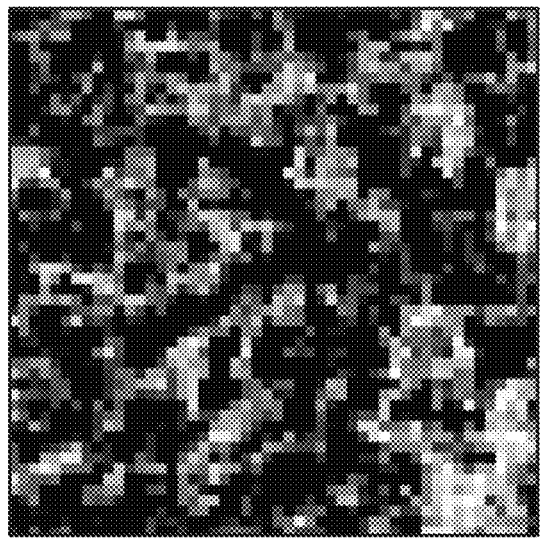
FIG. 22A depicts a portion of a MODIS image.
Figure 24B:
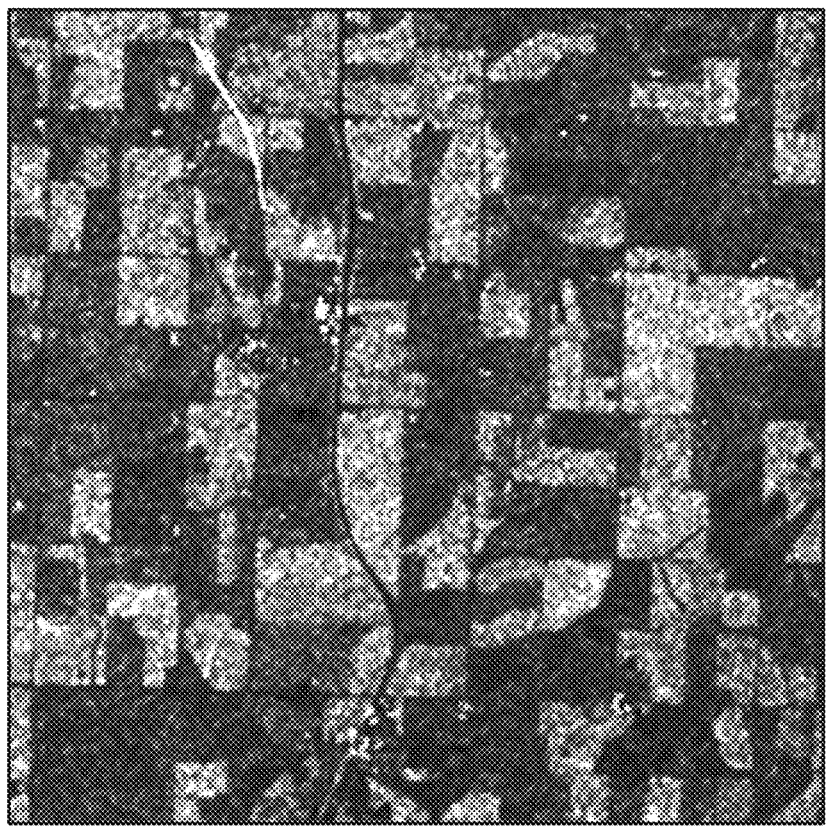
FIG. 24B shows a zoom into FIG. 24A.
Figure 25:
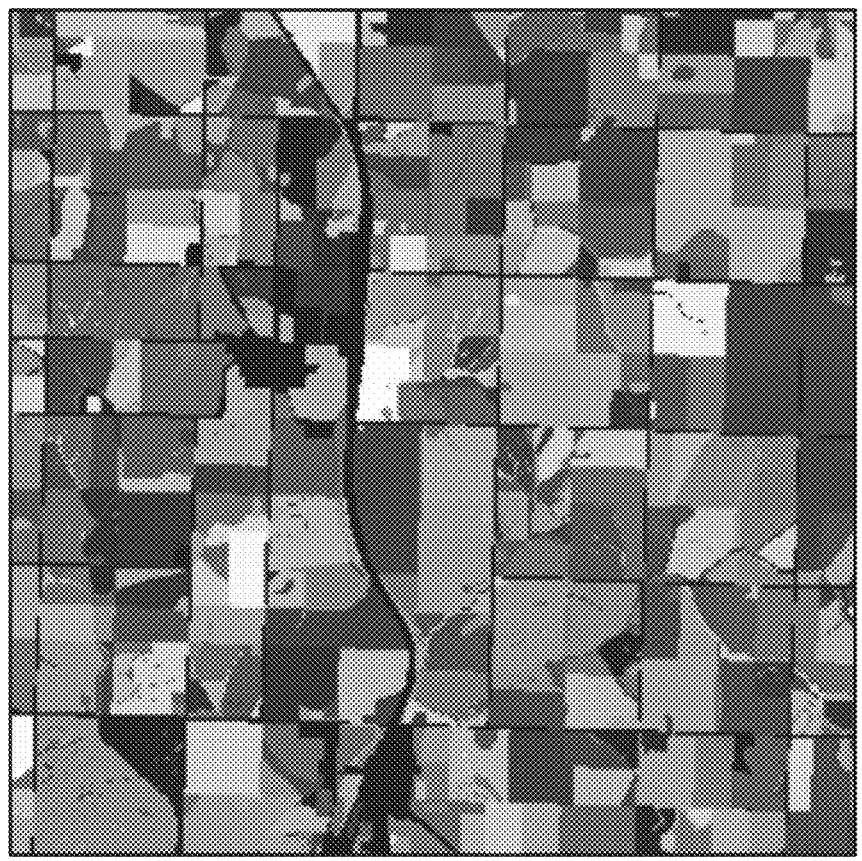
FIG. 25 illustrates an example of a boundary map.

FIG. 21A depicts a Landsat 7 image that includes (as diagonal black lines) scanline correction artifacts. FIG. 22A depicts a portion of a MODIS observation. FIG. 24B depicts a noisy observation by Sentinel-1 of a portion of land. FIGS. 21B, 22B, and 25 respectively depict boundary maps corresponding to the images shown in FIGS. 21A, 22A, and 24B. In each case, the captured observational data can be improved by performing an embodiment of process 2300 using the respective boundary map.

Figure 23:
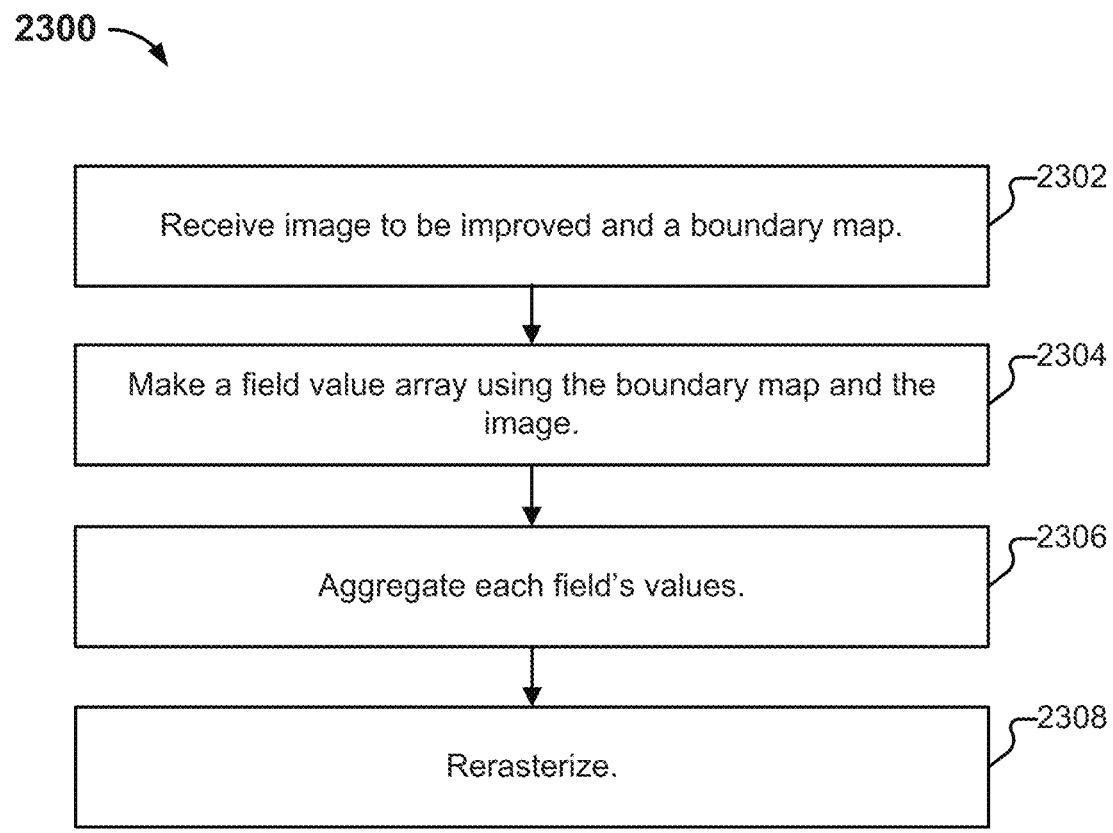
FIG. 23 illustrates an embodiment of a process for enhancing an image using a boundary map.

FIG. 23 illustrates an embodiment of a process for enhancing an image using a boundary map. In various embodiments, process 2300 is performed by image enhancer 332. One example way to implement image enhancer 332 is as a set of Python scripts incorporating the open-source libraries NumPy and SciPy. The process begins at 2302 when an image to be enhanced and a corresponding boundary map are received. As a first example, suppose that at 2302, image 2100 and boundary map 2130 are received. At 2304, a field value array is constructed, using the boundary map and the received image. The field value array is an array of deques, and is created by iterating over pixels in the received image, appending a given pixel's value to the appropriate field. At 2306, the values (extracted from the received image) are aggregated per field. A variety of aggregation techniques can be used, examples of which include determining the mean pixel value, the median pixel value, or a mode. As previously explained, for pixels where no data is present, a NaN value can be supplied (e.g., during ingestion), so that operations such as taking a median or mean are not impacted by the presence of zero values. The values determined at 2306 are used to perform, at 2308, a rerasterization operation, resulting in an enhanced image where each pixel in a field in the enhanced image has the same value as the rest of the pixels in the same field. As with various other examples provided throughout the Specification, where the image received at 2302 is multi-spectral, multiple values for a pixel can be operated on throughout process 2300 as applicable.

FIG. 21C illustrates a result of providing image 2100 and boundary map 2130 as input to process 2300. In particular, regularizing the pixel brightness values across the pixels bounded by a given field (e.g., using the median value) has in-painted the black stripes of missing data in the original image.

FIG. 22B depicts a boundary map (created in accordance with process 1100) for a portion of land, rasterized to 30 m resolution. FIG. 22A depicts a corresponding MODIS observation of the same portion of land that is represented by boundary map 2230. The MODIS observation (240 m resolution) has been upsampled so that both image 2200 and boundary map 2230 are the same size (e.g., with 2048×2048 pixels representing 30 m×30 m of ground in both cases). FIG. 22C illustrates a result of providing image 2200 and boundary map 2230 as input to process 2300. In particular, regularizing the pixel brightness values across the pixels bounded by a given field (e.g., using the median value) has resulted in a resolution-enhanced version of image 2200.

Embodiments of process 2300 can similarly be used to de-noise image 2450 (using boundary map 2500), resulting in an image such as image 27A. Noise in images is an obstacle to many kinds of image processing. This is especially true of automated processing, as it can be challenging for computer algorithms to extract image features amidst substantial noise as easily as humans can. A fundamental challenge is to remove noise without also removing essential image characteristics. Much of the information content of an image is contained in the image's edges. Accordingly, a technique that will preserve edges in the course of removing noise will be beneficial.

Figure 24A:
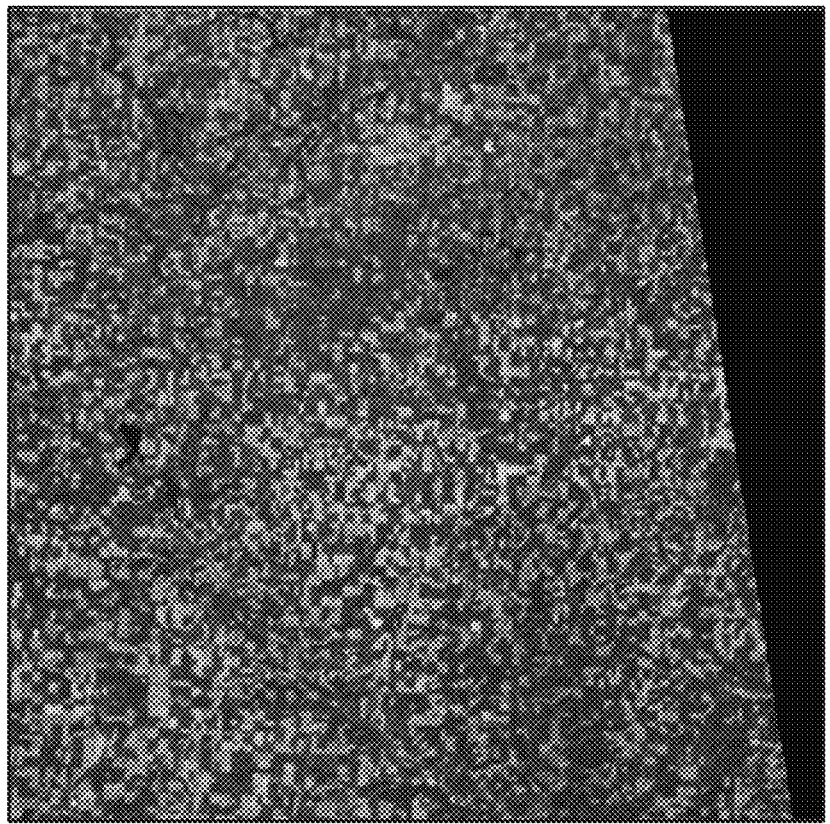
FIG. 24A shows an example of a processed SENTINEL-1A image.

One source of input to platform 302 is Sentinel-1 data. Sentinel-1 provides synthetic aperture radar (SAR) imagery. Benefits of SAR imagery include that it is cloud-free, and also that it can be continuously collected (including at night). One drawback of SAR imagery is that it can be very noisy. FIG. 24A shows an example of a processed Sentinel-1A image (UTM tile 15N_004_075 (Carroll, IA), taken Sep. 11, 2015), with each side of the image representing a distance of approximately 60 km. In the example shown in FIG. 24A, the first channel is the VH polarization, the second channel is the VV polarization, and a third channel has been added using $$\frac{VV - VH}{VV + VH}.$$

FIG. 24B shows a zoom into FIG. 24A, with each side of the image representing a distance of approximately 900 m. FIG. 25 illustrates an example of a boundary map that corresponds to the portion of land depicted in FIG. 24B. The following is an example approach to using boundary maps (whether generated in accordance with an embodiment of process 1100, or otherwise obtained, e.g., as governmental CLU data) to assist in image denoising.

Figure 26:
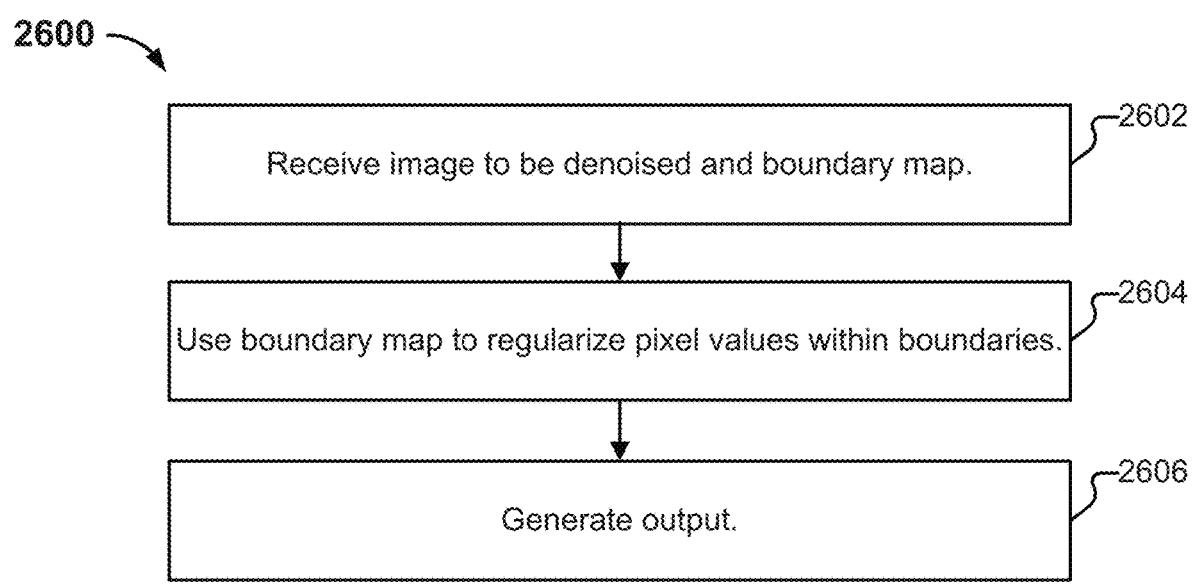
FIG. 26 illustrates an embodiment of a process for enhancing an image using a boundary map.
Figure 27B:
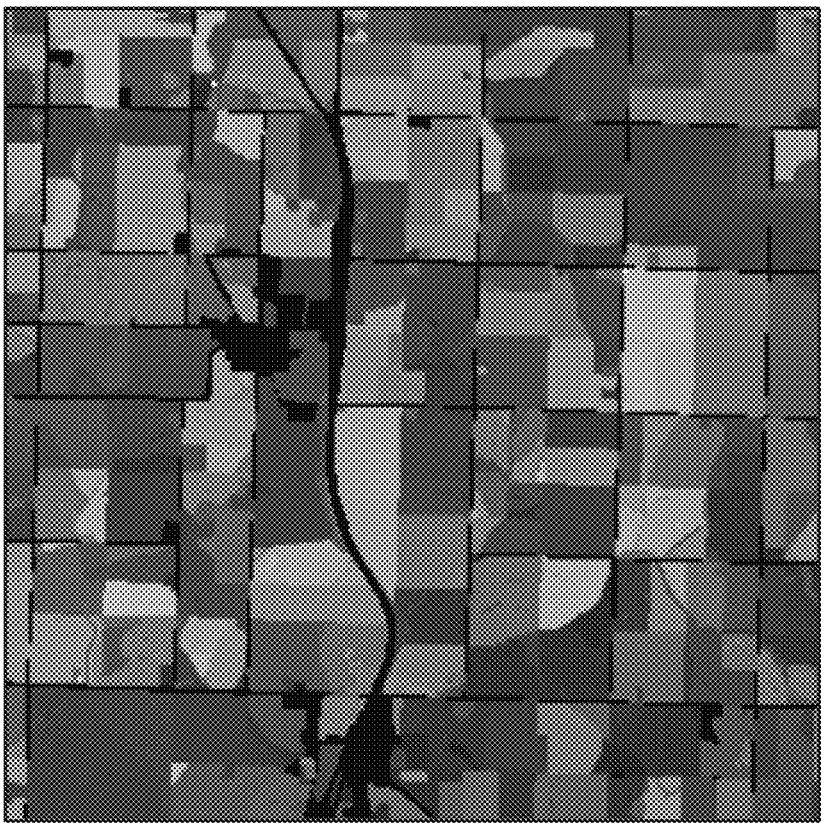
FIG. 27B depicts a result of regularizing the pixels in FIG. 24B using a field-wise mean of the logarithm of the pixel values.
Figure 27A:
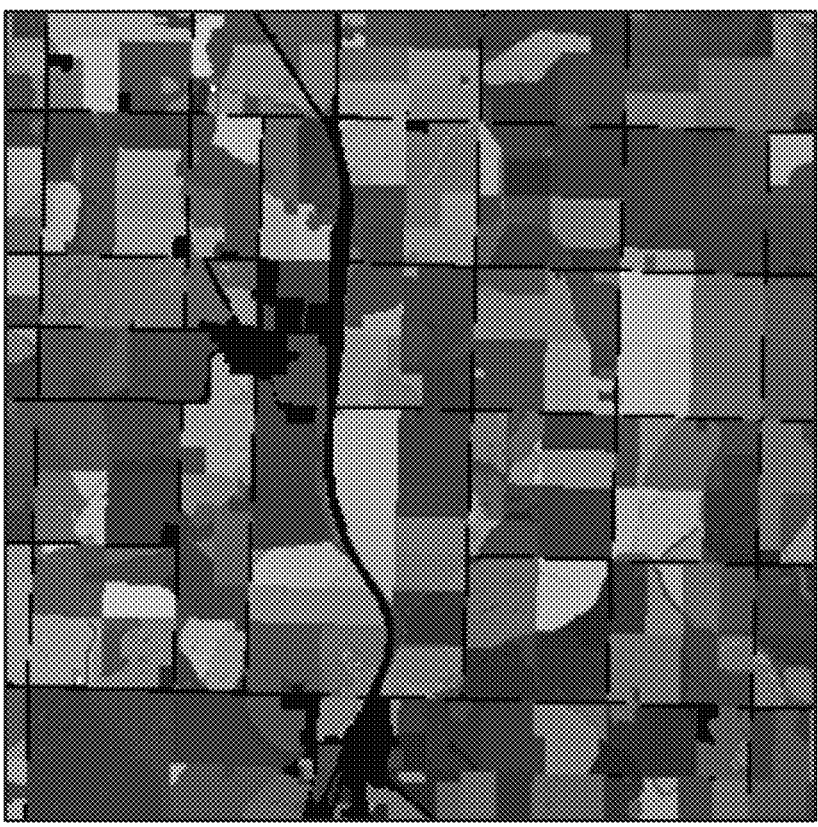
FIG. 27A depicts a result of regularizing the pixels in FIG. 24B using a field-wise median value.

One approach to using a boundary map such as boundary map 2500 to reduce noise in an image such as image 24B is shown in FIG. 26 and is an embodiment of process 2300. In various embodiments, process 2600 is performed by denoiser 334. One example way to implement denoiser 334 is as a set of Python scripts incorporating the open-source libraries NumPy and SciPy. The process begins at 2602 when an image to be denoised (e.g., image 2450) and a boundary map (e.g., boundary map 2500) are received. At 2604, for each field in the boundary map, a regularized value (or set of values, where data for multiple spectral bands is present at each pixel) is determined using pixels in the received image that are located within the field. An image comprising the constrained values is generated as output at 2606. As one example of the processing that can be performed at 2604, a mean value (or set of values, where the image is multi-spectral) can be determined across the pixels in the received image that correspond to a given field in the boundary map. The noise distribution of SAR often has outliers. Accordingly, instead of a mean value, a median value can also be used (e.g., to reduce the impact of outlier pixel values in the received image). FIG. 27A depicts a result of regularizing the pixels in FIG. 24B using a field-wise median value. FIG. 27B depicts a result of regularizing the pixels in FIG. 24B using the field-wise mean of the logarithm of the pixel values (per the multiplicative Gaussian model). The results shown in FIGS. 27A and 27B are not identical but are both similar and reasonable ways to reduce SAR noise.

V. ADDITIONAL PLATFORM DETAIL

Figure 28:
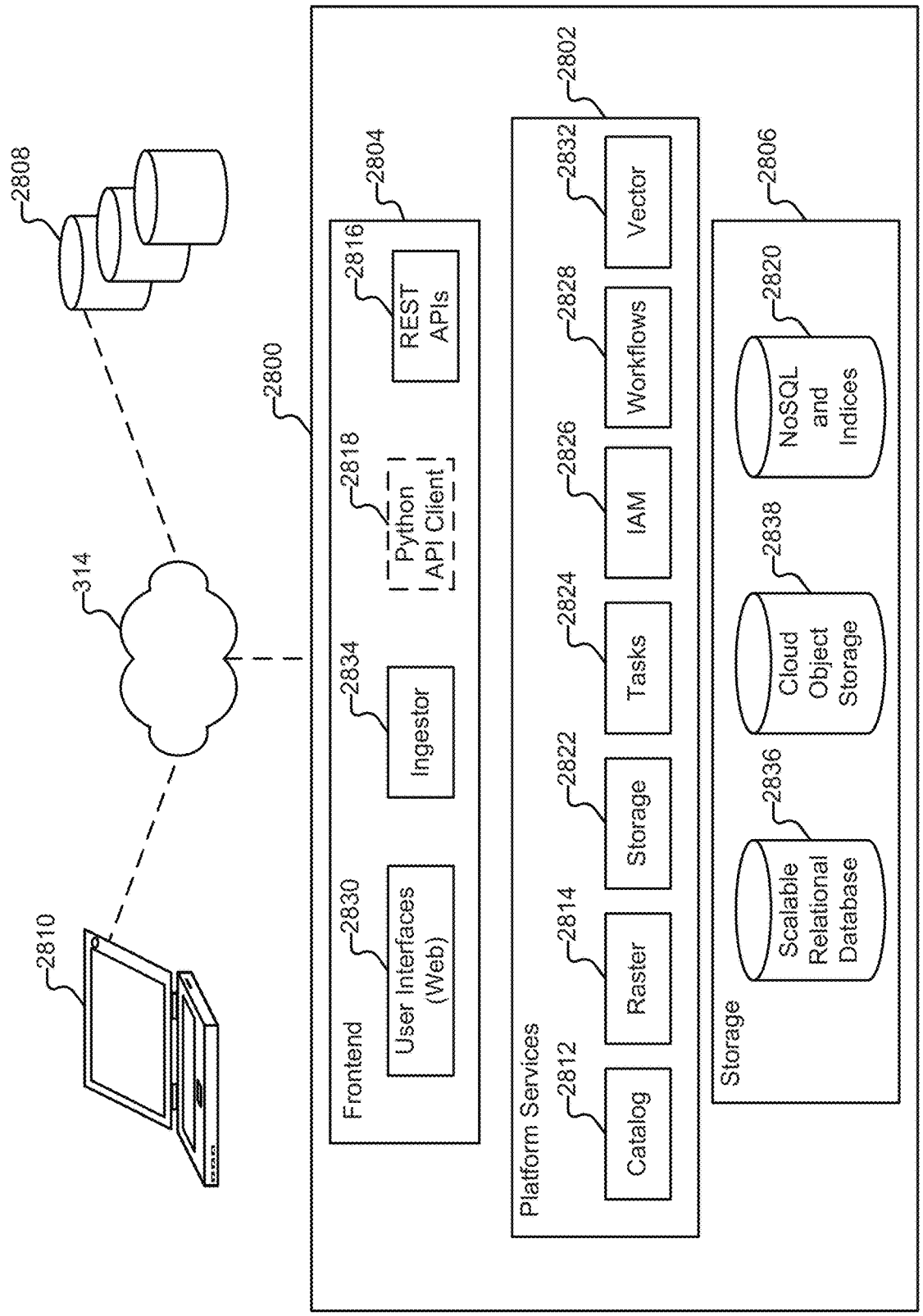
FIG. 28 illustrates an embodiment of a platform for processing and analyzing data in accordance with various techniques described here.

FIG. 28 illustrates an embodiment (2800) of platform 302 that makes available a set of platform services 2802 which can be used to support various applications. An example of such an application is thermal anomaly detection and classification, described in more detail below. Platform services 2802 can be implemented in a variety of ways. One example is as a set of microservices on a container orchestration cluster (e.g., built using the Flask micro web service framework with Kubernetes). The services can be accessed via REST APIs 2816 and/or an API client 2818 (e.g., implemented using Python). Platform services 2802 make use of a variety of types of storage 2806. These include a scalable relational database 2836 (e.g., Postgres or MySQL server), cloud object storage 2838 (e.g., Amazon S3, Google Cloud Storage, or Microsoft Azure Blob), and/or a key value pair store and associated indexing capabilities 2820 (e.g., Apache Cassandra, Amazon DynamoDB, Redis, or Elasticsearch).

Platform 2800 includes a set of interfaces 2804. Ingest interface 2834 is an embodiment of ingestor 308 and can be used to ingest a variety of types of data (e.g., raster data, point data, and LiDAR data) from a variety of sources 2808 (e.g., Sentinel-1 data from ESA and MODIS data from NASA). For a given ingestion action, ingestor 2834 selects an appropriate ingestion pipeline (e.g., implemented as a Python script) applicable to the data source. Users can also provide their own data to platform 2800 (e.g., using client device 2810) using an API made available by ingestor 2834. As applicable, platform 2800 processes the ingested data (e.g., uncompressing/recompressing, normalizing, applying data corrections, restructuring band order, etc.), stores the data in an appropriate location, and registers it with Catalog service 2812.

Catalog service 2812 is a repository of georeferenced images that provides a query language for performing searches. In an example embodiment, catalog service 2812 supports three types of classes: images, bands, and products. An image (represented by the class "Image" in the API) contains data for a shape on earth, as specified by its georeferencing. An image references one or more files (e.g., TIFF or JPEG files) that contain the binary data conforming to the band declaration of its product. A band (represented by the class "Band" in the API) is a 2-dimensional slice of raster data in an image. A product includes at least one band and all images in the product conform to the declared band structure. For example, an optical sensor will commonly have bands that correspond to the red, blue, and green visible light spectrum, which can be rastered together to create an RGB image. A product (represented by the class "Product") is a collection of images that share the same band structure. Images in a product can generally be used jointly in a data analysis, as they are expected to have been uniformly processed with respect to data correction, georegistration, etc. For example, multiple images from a product can be composited to run a process over a large geographic region. Some products correspond directly to image datasets provided by a platform, such as the Landsat 8 Collection 1 product which contains all images taken by the Landsat 8 satellite, is updated continuously as it takes more images, and is processed to NASA's Collection 1 specification. A product can also represent data derived from multiple other products or data sources—some may not even derive from Earth observation data. A raster product can contain any type of image data as long as it is georeferenced.

Raster service 2814 performs two general tasks: retrieving data from storage 2806 and providing a consistent way of splitting that data into smaller tiles. Examples of methods provided by raster service 2814 include "ndarray," "stack," and "raster," which retrieve raster data and return them either in an NumPy array or, for raster, an image file. The methods accept a list of image identifiers, which can be found by using Catalog 2812, and support rescaling, resampling, reprojecting, clipping, resizing, selecting bands of interest, and converting data type of the imagery in a single call.

Storage service 2822 persists data to backend storage objects. It provides a mechanism to store arbitrary data and later retrieve it using key-value pair semantics. A few example ways in which storage service 2822 can be used include: storing an auxiliary dataset useful for a particular analysis, storing custom shapes for regions of interest for an application, and uploading raster data that can later be registered via Catalog service 2812. An example interaction with storage service 2822 would be composed of a PUT API call to set a blob (chunk of bytes) to a key, then retrieve that data using a GET API call referencing the same key. There are several storage types that can be chosen when interacting with the Storage service 2822: "data," "tmp," "products," "result," and "logs." The "data" storage type is a default storage type. The "tmp" storage type is for temporary assets, and may be deleted after a given time period (e.g., seven days). The "products" storage type is for storing raster data. The "result" and "log" storage types are where the output and logs are stored from task processing.

Tasks service 2824 provides scalable compute capabilities to parallelize computations. In an example embodiment it works by packaging users' Python code and executing the code on hosted cloud infrastructure nodes. These nodes are able to access imagery at extremely high rates of throughput which, paired with horizontal scaling, allow for the execution of computations over nearly any spatio-temporal scale.

Identity and Access Management (IAM) service 2826 provides for user identity and access management. An example way to implement IAM service 2826 is as a third party identity provider (e.g., Auth0, Ping, or Okta).

Workflows service 2828 provides a computation engine for inventing and quickly deploying geospatial analyses. Users can use Workflows service 2828 to develop processes, interactively see changes recomputed on the fly, and run them at scale. One feature of the Workflows service 2828 is live visualization on an interactive map (e.g., as provided via a web interface 2830). In an example embodiment, users can build custom interactive tools with Workflows 2828 using ipywidgets and ipyleaflet in Jupyter notebooks. And, data can be retrieved as NumPy arrays or native Python types to use with other libraries. Workflows service 2828 also has an Array type that's intercompatible with NumPy, so complex numerical operations can be expressed without requiring users to learn new syntax.

Vector service 2832 allows users to store vector geometries (points, polygons, etc.) along with key-value properties, and query that data spatially and/or by properties. It can be used for data at the scale of millions to billions of features. An example use for Vector service 2832 is for storing the output from Tasks service 2824 (e.g., a computer vision detector might be run in thousands of tasks over many years of data across a continent; the objects it detects can be saved as features for later querying and analysis using Vector service 2832).

VI. BIOMASS ESTIMATION

Using techniques described herein, embodiments of platform 2800 can be used to train fully spatial models on sparsely sampled training data. As will be described in further detail, embodiments of the model training techniques include training with soft labels. Embodiments of generating soft labels and their incorporation in the training process are also described in further detail below.

One example application of embodiments of the techniques described herein is to estimate biomass density estimation. An example of biomass density estimation includes aboveground carbon estimation utilizing remote sensing.

The need to accurately measure historic and current above ground carbon (AGC) has become increasingly important as entities commit to sustainable practices. The release of carbon into the atmosphere due to deforestation is a major contributor to climate change, and companies which produce consumer goods are an integral part of this process. In order to understand the impact these companies have on the total carbon accounting, it would be beneficial to evaluate AGC at a global scale and measure changes over time.

The AGC stored in forests and other types of vegetation can be derived from above ground biomass (AGB). However, actual measurements of AGB are very sparse. Thus, it would be beneficial to develop models that predict AGB from other data sources. Using embodiments of the techniques described herein, models may be developed that predict above ground biomass density (AGBD) from data sources such as satellite imagery (e.g., multiband satellite imagery such as Landsat imagery at 30 m spatial resolution).

In some embodiments, the models described herein are trained on ground truth measurements from an instrument such as the Global Ecosystem Dynamics Investigation (GEDI) instrument. For example, aboveground biomass density measurements are available from the GEDI instrument on a global scale, where the GEDI mission collects height and vertical profile measurements in ecosystems across the world using a waveform Light Detection and Ranging (LiDAR) instrument aboard the International Space Station. However, one challenge in using GEDI measurements as training data is that the GEDI measurements are spatially sparse and only cover a narrow time window.

For example, the LiDAR measurements include point measurements, where each single measurement is for a circular footprint of approximately 25 meters in diameter on the ground, where an average value is generated for that footprint. The sparseness of the data is due in part to the GEDI instrument being mounted on the International Space Station (ISS), where the measurements are along the flight path of the ISS. For example, as the space station flies over the earth, a laser is beamed down, and the return signal is measured. The instrument determines, from the returned waveform, the type of return, such as a ground return, or a top-of-canopy return. From the delay of top-of-canopy and ground return, the instrument determines the height of the canopy (e.g., of trees), and obtains an elevation model. When the instrument fires the laser, the firings will be spaced apart along the flight track. The flight tracks are spaced apart as well. This results in a sparse sample of ground truth when considering a specific location on Earth. This is in particular as compared to the region covered by a 256×256 pixel tile of a portion of the Earth using 10 m or 30 m resolution imagery, where the tile then represents an area between 7 square kilometers to 60 square kilometers.

Due to this, it is difficult to generate a continuous label map of AGBD for training samples. Using embodiments of the soft label generation techniques described herein, soft labels or guesses of AGBD are inferred from a secondary input source, allowing for a continuous label map of AGBD to be produced. Having a continuous label map provides various benefits and improvements to model training and accuracy by allowing training to be more stable and a more accurate model to be achieved.

While embodiments of techniques for model training using soft labels are described herein in the context of above ground carbon estimation for illustrative purposes, the soft label-based model training techniques described herein may be variously adapted to accommodate training of any other types of predictive models for which training data is sparsely labeled.

Forest Carbon Estimation

In the domain of forest carbon estimation, prior to the launching of the GEDI satellite instrument, a comparable data set of above ground biomass density was not readily available. For example, average or aggregate carbon content or biomass measurements were determined through field groundwork, to, for example, map forested areas to determine a biome. A single aggregate value of carbon density was then determined and applied for an entire geographic region.

In some embodiments, the forest carbon techniques described herein utilize data from the NASA GEDI mission. The GEDI mission collects height and vertical profile measurements in ecosystems across the world using a waveform Light Detection and Ranging (LiDAR) instrument aboard the International Space Station. Over 10 billion 25-meter diameter footprint measurements are expected to be collected over the lifetime of the GEDI mission. The GEDI data is available in various processing levels: The raw waveforms (level-1), elevation and height metrics/canopy cover (level-2) and aboveground biomass density (level-4).

In some embodiments, the forest carbon models described herein utilize the billions of measurements in the level-4 dataset as training data. In some embodiments, the inputs to the models are multi-band satellite images. Depending on the use case, an appropriate input data source is chosen where, in some embodiments, the input resolution also defines the resolution of the output map.

While the GEDI dataset offers measurements of above ground biomass density AGBD for recent years, it is largely incomplete at higher resolution due to its sparsity. For example, there is not continuous coverage of the measurements, where the aboveground biomass density (AGBD) measurements are available from the GEDI instrument on a global scale within a latitude range of 51.6° N to 51.6° S, but the measurements are spatially sparse and only cover a narrow time window. It would be beneficial to estimate AGBD for portions of the Earth for which there is no GEDI data.

Described herein are embodiments of techniques to scalably quantify forest carbon for current and historical time periods utilizing, for example, several remotely sensed data sets and machine learning technology.

In some embodiments, a machine learning model or network, such as a convolutional neural network (CNN), is used to generate such AGBD estimates. In some embodiments, the biomass estimation model described herein uses a secondary source as input to predict AGBD as a continuous map at the resolution of the input source. As one example, the input to the model is multi-band satellite images. In some embodiments, given an input satellite image (that is made up of pixels), the model predicts, as output, a continuous map of labels at the resolution of the input image, where each label is an above ground biomass value estimated (by the model) for a corresponding pixel of the satellite image.

One example of the input satellite imagery is Landsat collection 2, level 2 imagery at the surface level processing as input with six bands (red, green, blue, near infrared (NIR), short wave infrared (SWIR1), and SWIR2 bands) at a spatial resolution of 30 m. Other satellite or observational imagery may be utilized as appropriate. In some embodiments, the selection of such a dataset as the input upon which AGBD estimations are made is based on the coverage of the dataset. For example, the use of Landsat satellite imagery as the input source is motivated by its global coverage, its relatively high spatial resolution, as well as the image collection going back to the mid 1980's, which allows deployment of the model in historical data. That is, the Landsat satellite imagery is expansive in both spatial and temporal coverage. As the spatial coverage of the Landsat imagery is large, this in turn allows for greater spatial coverage of ABGD estimations since they will be predicted from the Landsat imagery. Other examples of input sources that may be used include Sentinel-2 data.

With the use of GEDI data (which in some cases is calibrated based on a select number of field/ground data), in conjunction with machine learning models, carbon content of a forest may be measured in a much more granular way than previously possible. Further, gaps in AGBD GEDI measurements may be filled.

For example, the GEDI level-4 dataset offers measurements of AGBD for recent years but is largely incomplete at higher resolution due to its sparsity. Embodiments of a model are described herein that uses a secondary source (e.g., Landsat imagery) as input to predict AGBD as a continuous map at the resolution of the input source, while using the GEDI level-4 dataset for training.

FIG. 29 illustrates an embodiment of a sample input image and corresponding ground truth data. In this example, at 2902, a sample input image in RGB with overlaid ground truth measurements is shown. At 2904, the ground truth measurements are shown. The sparsity of the ground truth measurements (2904) is illustrated in this example, where when overlaid on the sample image as shown at 2902, only a small fraction of the pixels in the sample image have corresponding GEDI measurements. In some embodiments, the AGBD estimation models described herein fill in such gaps in AGBD measurements.

As will be described in further detail below, the biomass estimation models described herein use ground truth measurements from the GEDI instrument as training data. The ability of the model to accurately estimate AGBD is dependent upon the availability and coverage of the training data that the model is trained with. The sparsity of the GEDI measurements may also thus have an impact on the accuracy of the biomass estimation model.

For example, as shown in FIG. 29, given sample input satellite image 2902 of a portion of the Earth's surface, the ground truth measurements corresponding to that portion of the Earth's surface are sparse. For example, there are only AGBD measurements for a small fraction of the pixels in the image. Suppose the use of such an image tile and ground truth measurements as a training sample. Due to the sparsity of the ground truth, the target map for the sample image would only contain a small fraction of labels that are available per sample compared to the total number of output pixels (for example, where the target label map for the sample image included only the ground truth measurements as hard labels, where only those pixels with corresponding ground truth measurements are labeled, and those pixels without corresponding ground truth measurements are left unlabeled). In this case, as a large fraction of the pixels in the image are unlabeled, the training process would not be able to utilize the information in all pixels of the image tile. Being able to utilize the information in all pixels of the sample image would be beneficial for spatial context, which would improve the accuracy of the model.

The sparsity of the ground truth with respect to training is addressed using embodiments of techniques described herein. In some embodiments, in order to make training more stable and achieve a better model (e.g., more accurate model that takes into account spatial context), prior guesses or soft labels are introduced for pixels in the sample satellite image with no ground truth label attached. Various embodiments of generating soft labels are described herein.

A training sample is then generated that includes the training satellite image, as well as a corresponding target label map that includes a combination of both the ground truth labels and the soft labels. For example, during training, the training label map corresponding to the sample satellite image is generated by combining the soft labels with the actual ground truth labels.

As will also be described in further detail below, in some embodiments, the training process is configured to take into account that learning is based not only on actual ground truth labels, but also soft labels, which are prior guesses. In some embodiments, this includes biasing how the model learns from hard labels versus soft labels during the training process. As one example, the model "learns" by determining how to update its model parameters according to a loss function, which is used to determine the difference between what the model is predicting and what the label values are (which may be considered as a "target" for the model to meet). Optimizing the model includes updating model parameters to minimize these losses. For example, the model parameters are iteratively updated so that the biomass values predicted for the pixels of the sample images match as closely as possible to the existing labels for those pixels (according to the loss function, where the labels are targets for the model to try to meet). In some embodiments, the loss function used to guide model training is constructed to take into account that soft labels are not actual ground truth measurements. As one example, the contribution of (differences to) ground truth labels is weighted differently to the contribution of (differences to) soft labels in the loss function.

As one example, ground truth labels have a weight contribution of 1, while the weights of the soft labels are exponentially decayed from 1 to 1e-6 over the training period. This accounts for the soft labels being prior guesses, where as the model improves, such soft labels may become noisy and limit the accuracy of the model. In some embodiments, by reducing the contribution of the soft labels later in the training process, the model is still able to utilize the information in all pixels (as all pixels have corresponding labels now, rather than some being unlabeled, and thus the model parameters can be updated by calculating losses for all pixels, and not only a small fraction of them), which is beneficial for spatial context, in the early stages of the training process, and focus on the true (ground truth) labels in later stages of the training process. That is, the contribution of soft labels in the loss function may be set to be different to the weighting for true labels. The weight contribution of soft labels may also be adjusted as a function of the stage that the training process is in. Further details regarding weight of soft labels in loss calculations during training are described below.

Figure 30:
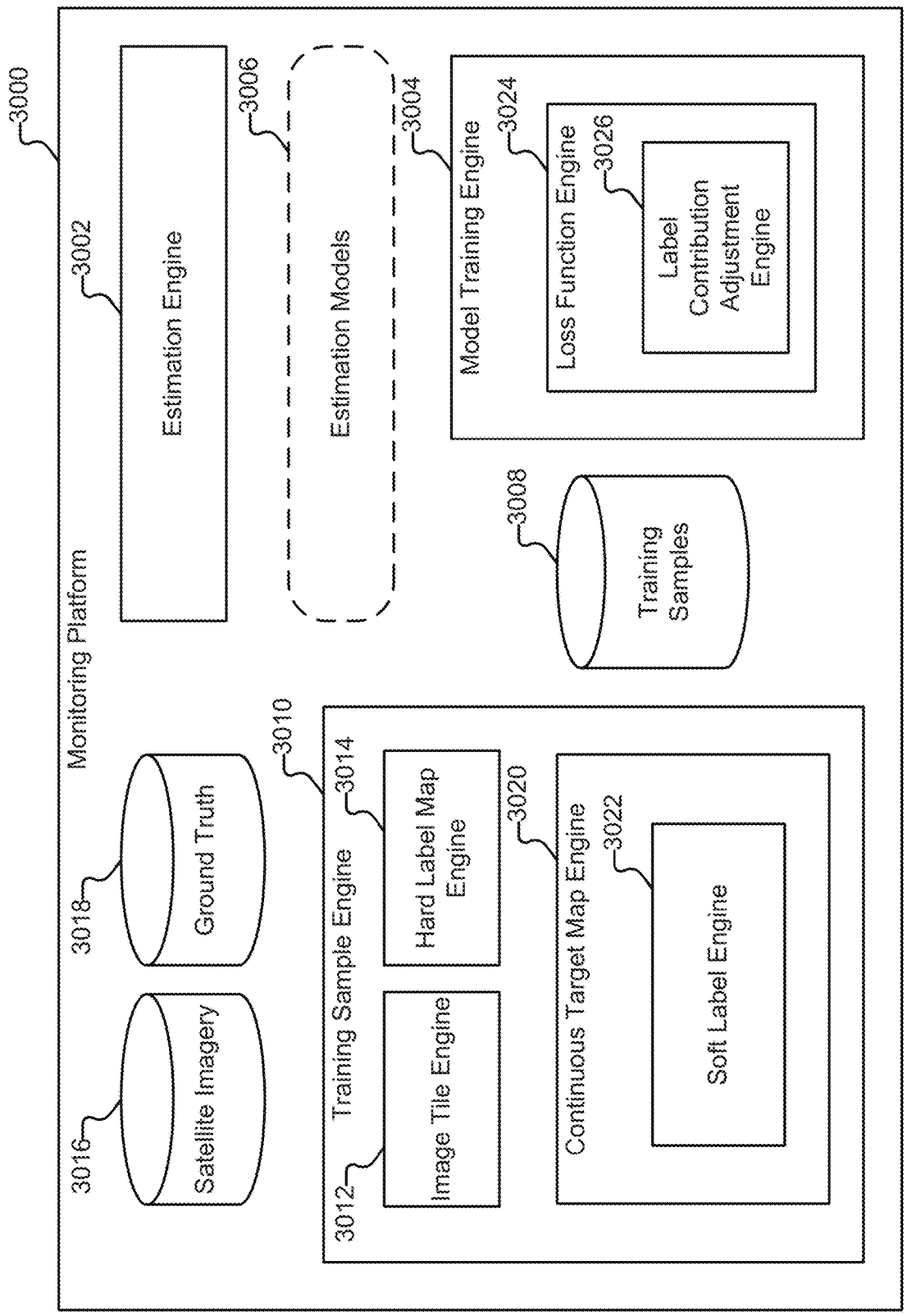
FIG. 30 illustrates an embodiment of a system for environmental monitoring.

FIG. 30 illustrates an embodiment of a system for environmental monitoring. In some embodiments, platform 3000 is an alternative view of platform 2800 of FIG. 28. In this example, platform 3000 includes estimation engine 3002 and model training engine 3004. In some embodiments, estimation engine 3002 is configured to provide a satellite image as input to an estimation model in estimation models 3006, where the estimation model provides, as output, a corresponding output map of estimated values (e.g., AGBD predictions), where the output map includes, for each pixel in the input image, a corresponding biomass estimated value.

Figure 31:
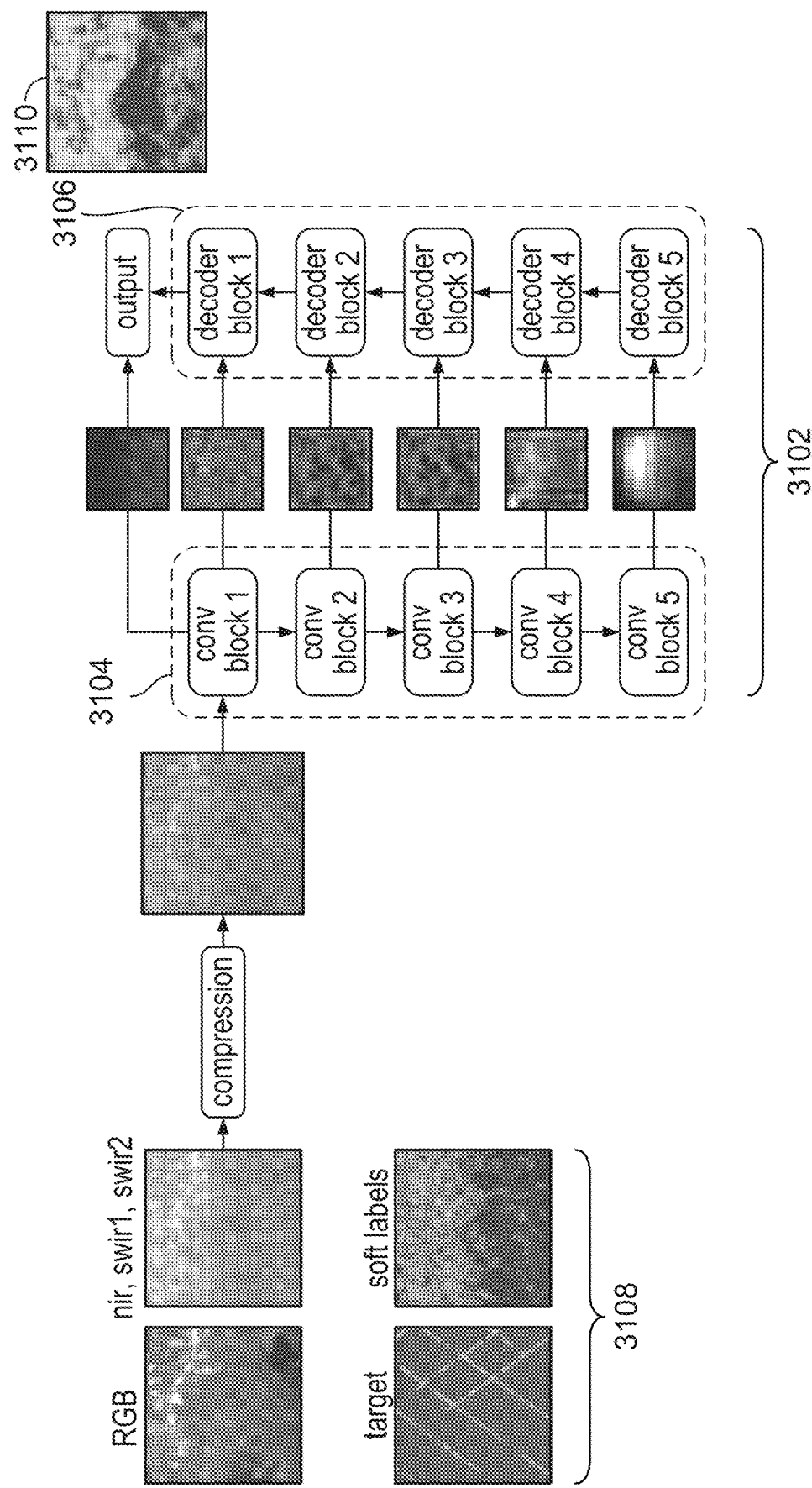
FIG. 31 illustrates an embodiment of an architecture of an estimation model.

FIG. 31 illustrates an embodiment of an architecture of an estimation model, such as an estimation model in estimation models 3006. As one example, the model is a convolutional neural network (CNN) with an encoder network to process the input data and a decoder network to generate the output map. The encoder-decoder setup forms a feature pyramid network (FPN). Other encoder architectures may be utilized, as appropriate. In some embodiments, the input to the model is a 6-band image (red, green, blue, nir, swir1, swir2). In some embodiments, the model takes a 6-band image as input and generates an output map at the same resolution as the input.

In some embodiments, the encoder network is a feature extractor. As one example, ResNet-50 is selected as the encoder. In some embodiments, the FPN includes decoder blocks where each block takes the features from level 1-1 and 1 as input. In some embodiments, the features of level1−1 are up-sampled before concatenating with the features of level1 followed by two convolutional layers. In some embodiments, the resulting feature is then fed to the decoder block of level1+1. In some embodiments, the encoder weights are set to the ImageNet pre-trained weights and kept fixed during training. In this example configuration, the encoder expects an input with 3 bands. Therefore, in some embodiments, a compression layer is added at the input which reduces the number of channels from six to three. As one example, the compression layer is a 1×1 convolution where the weights are initialized with a value sampled from a normal distribution of a certain mean and standard deviation.

In this example, model training engine 3004 includes loss function engine 3024. As will be described in further detail below, the model training includes determining an optimal set of model parameters for an estimation. The determination of the optimal set of model parameters is guided according to a loss function. Further details regarding loss functions are described below. In this example, loss function engine 3024 further includes label contribution adjustment engine 3026. Label contribution adjustment engine 3026 is configured to adjust the weight contribution of soft labels during the training process. Further details regarding adjustment of the contribution of soft labels to loss function calculations are described below.

Training Biomass Estimation Models

Model training engine 3004 is configured to train biomass estimation models in models 3006. As described above, in some embodiments, the model uses a ResNet-50 network with fixed weights. In some embodiments, since the weights are fixed, the second layer after the input is a compression layer which reduces the number of channels from six to three. In some embodiments, the encoder weights are kept fixed during training. In some embodiments, the encoder is trained together with the decoder.

Model training engine 3004 is configured to train estimation models using samples from training samples data store 3008. In some embodiments, training sample engine 3010 is configured to generate the training samples that are included in training samples data store 3008. In this example, training sample engine 3010 further includes image tile engine 3012 and hard label map engine 3014. Image tile engine 3012 is configured to take as input satellite imagery from satellite imagery data store 3016 and generate image tiles to be used as input for the training process. Further details regarding generating input image tiles are described below. Hard label map engine 3014 is configured to determine, given an input image tile, a corresponding map of hard label target values from ground truth data store 3018. Further details regarding determining the map of ground truth values corresponding to an input training image tile are described below.

Training sample engine 3010 further includes continuous target map engine 3020. Continuous target map engine 3020 is configured to generate a continuous map of label values corresponding to a sample satellite image to be included in a training sample. As used herein, a "continuous" label map refers to the label map having target values corresponding to each pixel of the sample image. For example, the sample image is composed of a grid of pixels, where each pixel is associated with a corresponding unique index. The continuous target map includes, for each pixel index, a corresponding label value.

In this example, continuous target map engine 3020 further includes soft label engine 3022. In some embodiments, soft label engine 3022 is configured to generate soft labels. As described above, due to the sparsity of the ground truth, the initial target map only contains a small fraction of labels that are available per sample compared to the total number of output pixels.

For example, while one pixel may have a corresponding ground truth measurement, it is unlikely that there is ground truth measurements for surrounding pixels. Suppose that the input image 2902 and the sparse ground truth map 2904 were used as a sample image. In this case, while the training is able to compare how close its current prediction (given its parameter values at the current stage of training) for a pixel is to the actual ground truth measurement (e.g., by using a loss function) in order to determine how to update its parameter values in a manner so that its predictions will be more accurate, the training would not be able to take into account spatial context from the surrounding pixels (as there are no actual ground truth measurements, and thus no hard labels for the model to compare its predicted values to using the loss function). Thus, the sparsity of labels for the training sample may limit the training of the model (as model parameters would only be updated based on minimizing losses with respect to only pixels that have labels, and not unlabeled pixels). That is, the model training would be biased to only minimize errors or discrepancies with respect to target values for those pixels in the training samples that happened to have ground truth labels. This would cause the selection of the model parameters, during training, to be too focused only on those pixels that happened to be labeled, without learning from having to accurately predict surrounding pixels as well. This would potentially result in a model that is overfitted to the labeled pixels, having not been optimized to correctly predict or minimize errors to surrounding pixels For example, the model training would not be "punished" for generating incorrect or nonsensical values for those pixels that did not have labels or target values to compare against. If there are only sparse labels in a sample training image (where only a small subset of the pixels in the sample training image have actual labels), then the model is only learning or optimizing by comparing against those small subsets of pixels (because for the other pixels, for which it does also make predictions, it does not have ground truth to compare to, and thus cannot use the determined deviations from those pixels to inform its optimization).

In some embodiments, to address the problem of training images being only sparsely labeled, and in order to make training more stable and achieve a better model, prior guesses (or soft labels) are introduced for those pixels in the image tile with no ground truth label attached. The introduction of soft labels addresses the challenge of not having a full, continuous map of target labels to learn from. Having a continuous map of labels for an image in a training sample allows a model such as a CNN to evaluate pixel-level information while also taking spatial context into account. Having a continuous map of labels for images in training samples improves the ability of the model to interpret input images, and optimally determine relationships between input satellite images and output biomass estimation maps. For example, with a continuous map of labels, the model is trained to correctly predict not only individual pixels that have labels, but also to accurately predict surrounding pixels as well. That is, the model will have more training data to learn from, as there are more loss function values that can be calculated to guide how model parameters are to be updated. Filling in such gaps in labels with soft labels forces the model to learn from predictions on pixels that did not originally have actual ground truth labels. For example, the model, during training, would have to learn to correctly predict every pixel (or otherwise minimize errors with respect to every pixel, and not only those that had ground truth labels). The soft labeling described herein allows for the building of continuous label maps that in turn then allow for the ability to train much more powerful models, such as convolutional deep neural nets, etc., that utilize the spatial context of the labels and can generate a continuous output. The soft labeling techniques described herein allow for the use of such powerful models that take into account spatial context, even if the source ground truth data is sparse.

In some embodiments, continuous target map engine 3020 calls soft label engine 3022 to generate soft labels for those pixels in the sample image that do not have corresponding ground truth labels (where the ground truth labels are also referred to herein as "hard" labels or "true" labels). The continuous target map engine is then configured to generate a continuous target map as output by combining hard labels and soft labels into the outputted map. For example, those indices in the map corresponding to pixels with ground truth data are labeled with the ground truth data as values. Those indices in the map corresponding to pixels without ground truth labels are assigned soft labels as target values.

By having a continuous target map, the model learns the optimal model parameters by not only learning to recreate labels for a small number of pixels that happen to have ground truth, but instead learns based on all pixels, which represent spatial context for a training sample. This allows for the development of a spatially aware model that takes into account spatial context. CNNs are examples of models or networks that take into account spatial context.

The following are embodiments of generating a training sample, where the training sample includes two components:

An input image, such as a multispectral 6-band satellite image

A target map, which includes labels (hard and/or soft labels) of biomass density measurements for each pixel in the input image.

The following are embodiments of generating a training data set, including generating input images and corresponding continuous target maps, which includes generating soft labels.

Determining an Input Image for a Training Sample

The following are embodiments of determining an input image tile of a training sample. In some embodiments, the input image is a composite of multiple images. For example, multiple measurements are taken over a region to remove clouds. For example, compositing, as described above, is performed on the input so that the input imagery is composited. The median of all satellite observations is taken for the input. Cloud masking, for example as described above, is performed whenever clouds are filtered out. The portions in which clouds are filtered are then filled in with other observations. Depending on the region, longer or shorter compositing may be performed. As one example, a year of data is collected. A median composite is built for all observations for a given spot or location. Further embodiments of image compositing and cloud masking are described above.

Determining a Hard Label Map Corresponding to a Sample Image

As described above, in some embodiments, a training sample is a pairing of a sample satellite image and a corresponding map of labels. While the satellite image is rasterized, the source data may not be. The following are embodiments of preprocessing steps of converting the source data (GEDI measurement) to a pixel-based measurement.

As one example, the corresponding ground truth is all of the measurements within that same year (typically within a narrower time range, as there may only be a few measurements in a couple of weeks or months for the location).

For the target map, it is relatively rare that the same measurement of the exact same coordinate repeats. Rather, there are multiple tracks, where each track is done on a different date. It is unlikely that there will be two tracks on the same day. Multiple passes lead to multiple tracks. In some embodiments, rather than a mean or median operation, building the target map is done by accumulating biodensity measurements over the timeframe of interest (e.g., within the same year) and overlaying them on top of each other to generate the target map for the same sample.

As one example, suppose that the input image is a yearly composite. The ground truth label map is all of the measurements that have been taken within that same year. This is done for every year (or any other time period as appropriate) of data that is available. For example, for the year 2019, a 2019 composite is generated. All of the measurements captured within 2019 are collected and included in the target map (ground truth mapping of labels to pixels in the input image). Similar processing is performed for other years. For example, for 2020, a median composite image (6-band) is generated. A corresponding ground truth map/target map is generated by aggregating all of the biomass density measurements over the course of the year.

The following is an example of generating an initial training sample including an input image and a corresponding hard label target map. An area is defined for which training data is to be generated. As one example, suppose that all of Malaysia is selected as an area of interest (AOI). The area of interest is then tiled into multiple tiles (e.g., 256×256 pixel tiles). Each tile is an example of a sample image. For example, for Landsat 30 m resolution, or Sentinel-2, 10 meter resolution, 256×256 pixel tile size images are generated. The tile sizes correspond to the sample sizes. For each of the tiles, the corresponding imagery is aggregated, and a composite image is created. The input image tiles are thus generated.

As described above, the data received from GEDI (biomass density measurements that are labels of interest in this example) is not rasterized. Rather, what is received is a value or measurement at a coordinate. The following is an example of generating a target map corresponding to an image tile. This includes performing rasterization, where the coordinates of GEDI data are translated to appropriate pixels in image tiles. For every tile for which a training sample is created, all of the measurements within the timeframe of interest that have a coordinate that lands within that tile are aggregated (as the image tile represents a portion of the surface of the Earth, each pixel corresponds to a coordinate or set of coordinates on the Earth). In order to generate the target map, the measurements are rasterized (converted into pixels). For example, the coordinates of a measurement are taken. For a given tile, that coordinate corresponds to a specific pixel. The value for that pixel is then set to the GEDI measurement value (or aggregate of GEDI measurements that fall within the coordinates corresponding to that pixel). Thus, the GEDI data has been rasterized, or otherwise translated from a geo-coordinate system to pixel indices.

Using the techniques described herein, the training data is now in a rasterized format that can be used by the model.

Quality Verification for Soft Label Generation

As will be described in further detail below, in some embodiments, soft labels for unlabeled pixels in an image are generated based on hard labels that exist for labeled pixels in the image. In some embodiments, prior to generation of soft labels, quality checks are performed with respect to the hard labels to ensure that they can be used as a basis for generating soft labels.

In some embodiments, for the hard labels that are available, hard labels that do not meet a quality threshold are filtered out or discarded (and not included in the target map). For example, only GEDI measurements that meet a quality threshold are kept. In some embodiments, the source data includes, per each measurement, a quality flag from the GEDI instrument. For example, for GEDI, each measurement includes a variety of attributes. One of the attributes is a quality flag. If the quality flag is set to one, this indicates that a high quality measurement was taken.

In some embodiments, in the ground truth label map, only high quality samples are kept. For low quality labels (measurements), those ground truth measurement labels are removed from the sample (from the map). This prevents soft labeling based on ground truth measurements that were of low quality.

In some embodiments, in order for soft labels to be generated, the quality verification includes determining whether there is a minimum number of point measurements (that are of the threshold quality) within each sample (for that sample image). If an insufficient number of hard labels of sufficient quality are present for the sample image, then that sample image is not included in the training set. This results in the threshold number of labeled pixels being a threshold number of labels that have been determined to be high quality measurements.

As shown above, in some embodiments, prior to generating soft labels, a pre-processing step is performed to determine that there are a threshold number of pixels that have ground truth data. For example, as will be described in further detail below, in some embodiments, soft labels for unlabeled pixels (i.e., pixels that did not have target values) are determined based on similarity to labeled pixels, where an unlabeled pixel (that did not have ground truth measurements) is assigned, as a soft label, the biomass density value of the labeled pixel (pixel that does have a ground truth measurement) that the unlabeled pixel is determined to be most similar to.

In this case, if there was only one pixel that is labeled with a ground truth measurement, then there is only one labeled pixel to compare all unlabeled pixels against, and that one pixel would always have the highest similarity score. This would result in an output label map that is all the same value, which would not be beneficial in most cases. In some embodiments, prior to generating soft labels, the aforementioned pre-processing steps are performed to determine that there is a threshold number of pixels that have quality ground truth data.

Thus, in some embodiments, soft labeling is performed for images where there is at least a threshold number of labeled pixels. As one example, images with 100 or more labeled pixels are kept, while images with less than the threshold number of labeled pixels are not used. Other threshold numbers of hard labels may be utilized, as appropriate. The threshold is used to filter out samples that would not be beneficial in generating soft labels. Filtered out samples are not included as samples in the training dataset. The use of a minimum threshold number of labeled pixels for a sample (with true labels, or labels based on ground truth) facilitates ensuring that there is a high variety of labels in the set of labeled pixels (e.g., variety in the different measured ground truth biomass density values).

The following are further examples of determining input images and ground truth label maps of a training dataset. As one example, for the training of the model, a training AOI (Area of Interest) corresponding to a region of the earth is defined, where the training AOI may also represent various land cover types as well. Multiple AOIs may also be grouped together. In some embodiments, to generate the training dataset, the corresponding AOIs are split into non-overlapping tiles of a certain size (e.g., 256×256 pixels) at a specified resolution (e.g., 30 m/pixel). In some embodiments, for each tile, a cloud free median composite of Landsat-8 scenes is generated which intersects with the given tile. As one example, for illustrative purposes, the composite time window is 1 year and all years from 2019-2021 are processed. Other composite time windows and periods of time may be used. In some embodiments, for each year (or any other duration of time, as appropriate), all GEDI measurements within the given tile are stored as ground truth values. This results in multiple data samples for the same tile if GEDI measurements are available for multiple years.

In some embodiments, for each GEDI footprint, a number of variables are stored, including AGBD, the associated uncertainties, and data quality flags. In some embodiments, these quality flags are used to filter the measurements within a tile according to certain requirements. In some embodiments, in order to guarantee high quality measurements, the flag 14_quality_flag is required to be 1. Other example requirements are the minimum number of measurements in each tile (e.g., at least 100 ground truth measurements for the tile). Other minimum numbers of measurements may be utilized, as appropriate. This ensures that there are enough measurements for the generation of the soft labels, further details of which will be described below.

Generating Soft Labels

In some embodiments, the model architecture described in conjunction with the example of FIG. 31 generates an output map of the same size as the input image. In most cases of such a configuration, the target is expected to be a continuous map of the same size as the output from which the loss is calculated. However, as described above, in the case of GEDI measurements, the target is not continuous but is composed of sparse target values. One approach for this situation is to only evaluate the loss function at pixels for which a ground truth value is available. However, this approach may result in over-fitting on the sparse pixels and generating of a non-homogeneous output.

The following are embodiments of techniques for generating continuous target maps. In some embodiments, generating continuous target maps includes generating soft labels, as will be described in further detail below.

As described above, initially the target map of the sample is a map of ground truth measurements corresponding to the sample satellite image. Due to the sparsity of GEDI measurements, the initial target map is a partial map, and is not continuous, where there are only ground truth measurements for a fraction of the pixels in the input satellite image. At this initial state, the target map indicates only GEDI measurements for corresponding pixels in the satellite image.

The following are embodiments of generating training samples by determining soft labels for unlabeled pixels. In some embodiments, the soft labels are derived or otherwise generated based on existing hard labels. Embodiments of generating soft labels are described in further detail below.

Generating Soft Labels based on Spectral Similarity

In some embodiments, a continuous target map is generated based on the spectral similarity at the input level. In some embodiments, soft labels for unlabeled pixels are determined based on the similarity of unlabeled pixels to labeled pixels. In some embodiments, a soft label for an unlabeled pixel is determined based on determining a labeled pixel that the unlabeled pixel is most similar to. As one example, the ground truth map is evaluated. A pixel that has a ground truth label is identified. The same corresponding pixel in the input image (e.g., 6-band RGB, NIR, SWIR1, SWIR2 image) is identified. A similarity score (score of spectral similarity based on the 6-band values recorded for the pixels) between that pixel and each of the pixels that do not have a ground truth is determined or calculated. For example, the input for the pixel (6-band values for a pixel) is compared to the input (6-band values) of the pixels that do have labels, where in some embodiments similarity scores are determined. For example, the set of pixels that do not have ground truth labels in the ground truth map are identified. The input image is then evaluated, the 6-band values for those pixels that do not have ground truth labels are taken, and a similarity score is calculated for those unlabeled pixels against all of the pixels that do have labels (similarity based on 6-band values). That is, in some embodiments, the similarity of an unlabeled pixel to all pixels that have a label is determined.

In some embodiments, the soft labels are calculated according to the largest spectral similarity to all pixels with a ground truth label. As one example, the spectral similarity between a given unlabeled pixel and each labeled pixel is determined. The labeled pixel with which the given unlabeled pixel is most spectrally similar to is then identified. The label for the identified, most spectrally similar labeled pixel is then applied or assigned to the unlabeled pixel. In this example, pixels that are spectrally similar are given similar label values. That is, pixels that are similar in the input space (6-band spectral space) are given similar labels in the output space (biomass label values).

The following is an example of determining spectral similarity between two pixels. In some embodiments, a scalar product is taken of the 6-band values for the two pixels being compared, using the below equation, where, in this example, spectral similarity is defined as cosine similarity $$\sigma(X_i, X_j) = \frac{X_i \cdot X_j}{\|X_i\| \|X_j\|}$$

where $X_i$ and $X_j$ are the vectors with spectral information of all bands for pixels i and j. In some embodiments, for each pixel with no label, a is computed with respect to all pixels which have a label (hard labels). In some embodiments, the value of the hard label for which a is maximal is then assigned to the pixel with no label to generate a soft label.

In this example, $X_i$ is the vector with six values of the six bands for one of the pixels. $X_j$ is the vector with six values of the six bands for the other pixel. If the two pixels are similar in the six bands, then the value is relatively larger.

As one example, the similarity score is between −1 and +1, where +1 indicates complete alignment between the six-band values of the two pixels, and −1 indicates that the two pixels are very dissimilar with respect to their six-band values.

A performance benefit of this similarity determination approach described herein is that the aforementioned operation can be executed as a single call. For example, the soft labels can be calculated efficiently for all non-labeled pixels by arranging them in a matrix A of size n×b and all hard label pixels in a matrix B of size m×b with b being the number of bands. That is, in this example, in order to assign a value to each pixel with no label, the non-label pixels are arranged in a matrix A of shape n×b where n is the number of non-label pixels and b is the number of bands. All pixels with a label are arranged in a matrix B of shape m×b where m is the number of labeled pixels.

The soft labels are then calculated, where for example, for each non-label pixel, the index of the label to be assigned is calculated by:

$$\text{label}_{idx} = \text{argmax}(\hat{A}\hat{B}^T)$$

where $\hat{A}$ and $\hat{B}$ are the row normalized matrices of A and B

In this example, the pixels of the input image are divided into two sets, matrix A and matrix B. Matrix A includes all of the pixels that do not have a corresponding attached label. Matrix B includes all of the pixels that do have a corresponding label attached. In this example, A is a matrix, where each row is a vector X, where each row corresponds to an unlabeled pixel, and the columns are the 6-band values of that pixel. The size of the matrix A in this example is the number of unlabeled pixels times 6. Similarly, B is a matrix, where the size of the matrix is the number of labeled pixels times 6.

To perform the similarity determination operation, here B is transposed so that it is now a matrix that is six by the number of labeled pixels. In some embodiments, normalization is performed on the two matrices (denominator of above $\|X_i\|$ $\|X_j\|$). Matrix multiplication is then performed, which effectively compares one unlabeled pixel against all of the labeled pixels. A score is determined for each of the comparisons. A next unlabeled pixel is then compared against the same set of labeled pixels to obtain another set of scores.

As a result of this matrix multiplication, a similarity score matrix is determined with all of the scores per row, with all of the non-labeled pixels in the row dimensions. For each row, the column with the highest score (determined, for example, using an argmax operation along the column dimension, which is of cosine similarity scores) is selected. This results in a vector, where for each unlabeled pixel, the vector indicates the index of the label to be applied to the unlabeled pixel.

In some embodiments, the hard labels are combined with the soft labels to generate a target map. For example, the target map is then a combination of hard and soft labels defined as:

$$\hat{y} = m \otimes \hat{y_h} + (1-m) \otimes \hat{y_s},$$

where m is a mask for which $m_{i,j}=1$ if pixel i,j is a hard label and $m_{i,j}=0$ otherwise. Here $\otimes$ denotes the element wise product.

As shown in this example, a continuous target map is generated based on the spectral similarity at the input level (the 6-band values of the input image, in this example). For example, for each unlabeled pixel, the labeled pixel that is the most similar to it with respect to 6-band values (input values) is found. For the labeled pixel that is determined to be the most similar to the unlabeled pixel, the label of the identified most-similar pixel is assigned or applied as a soft label of the unlabeled pixel (as a guess of a label for the unlabeled pixel). For example, the biomass density value for the most similar labeled pixel is applied as a soft label for the unlabeled pixel. As one example, the ground biomass density is a continuous scalar value between zero and 500.

The result of the training sample generation processing described above is a set of training samples for all tiles that exist in an AOI. Each training sample includes an input image (tile) and a corresponding continuous, full label map (that includes both ground truth labels and soft labels).

Using the techniques described herein, models can be trained for any area of interest by generating training samples as described herein, for example, by obtaining input imagery tiles, determining GEDI measurements (or any other type of label values) for the same tile, etc. Soft labels are generated dynamically (and need not be pre-computed), for example, during training.

Figure 32:
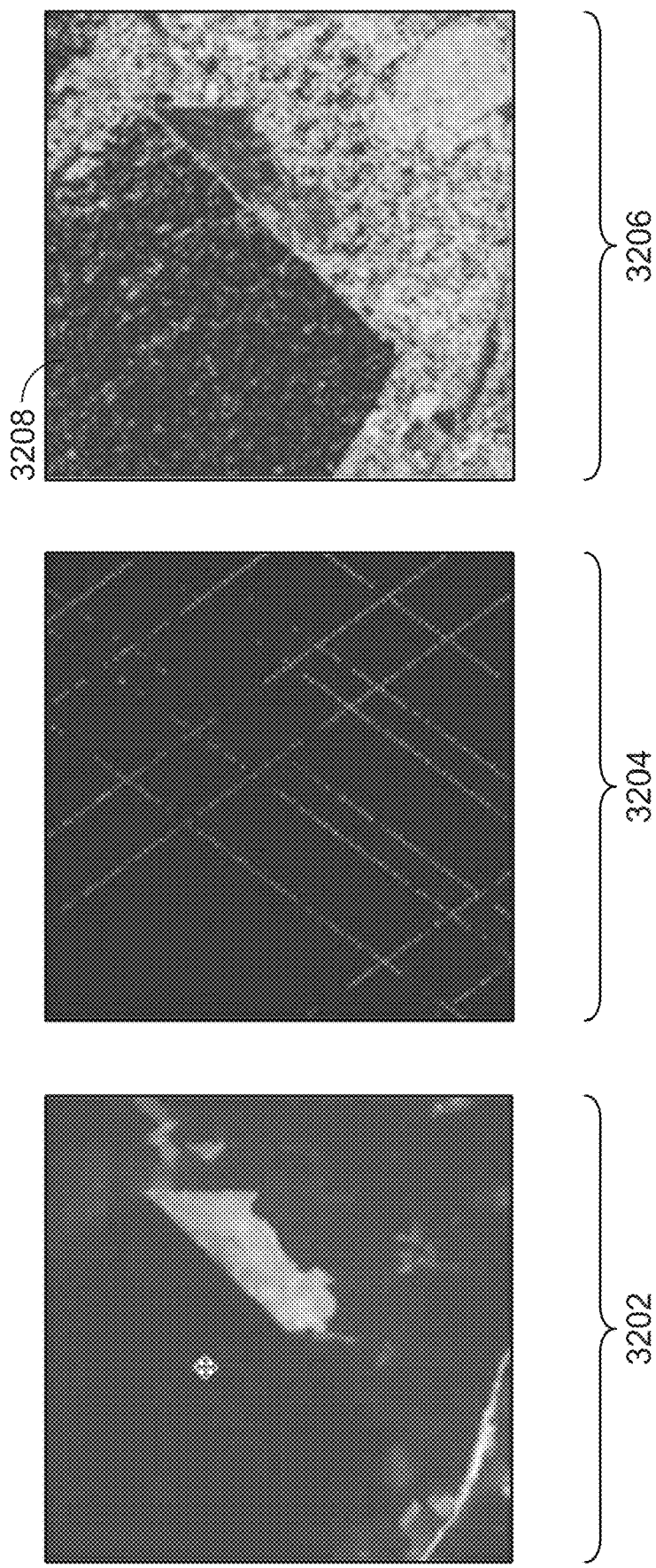
FIG. 32 illustrates an embodiment of an output label map including hard labels and soft labels.

FIG. 32 illustrates an embodiment of an output label map including both hard labels and soft labels. In this example, at 3202 is a satellite image that is an example of input training data. At 3204 is a map of ground truth labels corresponding to the image. As shown in this example, there are only ground truth labels for a small fraction of the pixels in image 3202.

As shown in the example of 3204, point measurements from GEDI are shown along tracks. Each point has a value attached. In some embodiments, the value of the point is indicated visually via color coding. (as one example, red indicates a higher value, and blue indicates a lower value). The values of the tracks correlate with what is being imaged in the image tile 3202.

In this example, the sample 3202 is an image with 400×400 pixels. However, only a small subset of those pixels have a corresponding ground truth measurement. As described above, in some embodiments, a minimum number of ground truth hard labels that meet or exceed a quality threshold are required in order to generate soft labels. As one example, in some cases, a minimum of 100 points (number of pixels with ground truth measurements) is required to keep a sample of ground truth measurements (labels) with respect to quality. 100 pixels out of 400×400 pixels is a relatively small fraction of measurements.

At 3206 is an example of an output label map that includes both the hard labels from ground truth map 3204, as well as soft labels (determined as described above) for the remaining unlabeled pixels. In this example, soft labels have been generated for the remaining pixels in the image for which ground truth measurements were absent or unavailable or not taken. In this example, the output label map 3206 is now continuous and includes labels for every single pixel. While the map (of labels, where each pixel in the map corresponds to a pixel in the input image) may be noisy, it represents the input (left image) fairly well, with similar label values over forests, and patches where there is more ground. While the structures in the input image are captured by the labeling, for a given portion, there is still variation and noise within the structure (e.g., portion 3208 of forests in output label map 3206).

As described above, it would be beneficial if a fully spatial model such as a CNN were trained on input images where each input image has a corresponding full map of labels (e.g., label for every pixel of the input image). However, due to the sparsity of measurements from instruments such as GEDI, the biomass measurement map for an image would be relatively sparse, resulting in only a partial map of labels. In this example, a full map of labels 3206 is generated from a partial map of labels 3204 and the input image 3202, where the full map is generated by determining soft labels. The soft labels are prior guesses of what the missing labels would be for unlabeled pixels in the input image. In this way, the fully spatial model such as a CNN has a full, continuous map of labels for an input image that it can train on.

In the above example, the input image 3202 and continuous target map 3206 are stored as a training sample (e.g., in training samples data store 3008). An estimation model is then trained using such samples. The following is an embodiment of training a model. Referring to the example of FIG. 31, as one example, the model 3102 is an encoder (3104)-decoder (3106) configuration, where the encoder is a convolutional neural net that uses a backbone network. As one example, ResNet-50 is used, as described above. The encoder is configured to take as input the input image and extract features. In this example, an RGB, 6-band input image is shown.

In some embodiments, a compression layer is included as pre-processing, as some encoder networks take 3-band images as input. For example, the training sample 3108 is fed as input to the compression layer, where training sample 3108 includes the image tile (which is shown in two parts, an RGB image and an NIR, SWIR1, and SWIR2 map) and both the target (hard labels) and soft labels. If the encoder is not modified (where its weights are not trained), a compression layer is applied that is a learned operation that compresses the 6-band image to a 3-band image. The compressed 3-band image is fed down the encoder, where features are taken out at various levels.

The decoder is then built. In this example, it is the decoder that is being trained using the training samples (with soft labels) generated as described above. In this example, a feature pyramid network is shown. The deepest level features are fed into the decoder, and a set of convolutions and upsampling is performed, where feature maps are fed in from the level above, until the output resolution is reached again. Eventually, an output map 3110 is predicted. The output map is then compared to the continuous target map of hard and soft labels using a loss function, where the results of the loss function (e.g., deviation of the model predictions for the input image from the hard/soft labels) are used to update model parameter values for a next stage or iteration of the training process.

Using Combined Hard and Soft Label Maps for Training

Soft labels are predicted target values for pixels that did not have corresponding ground truth data. The following are embodiments of accounting for soft labels in the training process.

The machine learning model being trained can be considered as a non-linear fitting function with a large number of parameters (e.g., on the order of millions of parameters). Over the course of training, guesses (model predictions) of the various parameters are made (e.g., for various combinations of values for the parameters). A combination of parameter values is selected, and for that given combination of parameters, the output of the model is compared to the training data, where the labels of the training data are targets for the model to try to predict. The selection or adjustment of the parameter values is adjusted based on how close the model output is to the training data. The process is repeated multiple times, where each time the parameters are adjusted (e.g., evaluation of a new combination of parameters), the difference between the output and the training data is computed, and the parameters are again adjusted or updated accordingly. In this way, the training of the model is guided based on the training data.

For example, the training process involves minimizing an objective function, the loss, using the gradient descent technique in which the model parameters are updated in each step according to the partial derivatives of the loss with respect to each model parameter until eventually a model is arrived at with a specific set or combination of chosen parameters that predicts the ground truth in the training data with minimal loss. The space of combinations of parameters is numerous. As the model is training, it gradually approaches or converges on a combination of model parameter values that allows the model to accurately predict the ground truth labels (or otherwise is at a minimum with respect to losses). At the end of the model training process, an optimal combination of parameter values is determined. In some embodiments, the training process is a type of statistical sampling process, where the parameter values are adjusted according to the local topology in the parameter space that is not necessarily deterministic or an analytic fit. In some embodiments the parameter values are updated in a multi-stage, iterative process, where the updates are determined according to loss functions.

A purpose of the model is that given a 6-band input image, the model predicts the biomass density for each pixel in the image. During training, the model is trained so that, given a 6-band input image of a training sample, the model prediction output matches as closely as possible to the target map of labels, which are target values for the model to try to meet. The closeness of the model predictions to the target values is determined according to a loss function. The model parameters are updated for a next stage of the training based on the loss function, which is calculated between the model predictions and the target values.

As described above, the model includes numerous parameters, each of which can take on various values. Thus, the parameter space is large (e.g., where the parameter space is the number of possible combinations of values for the model parameter values). As described above, the determination of the optimal model parameter values is guided by a loss function during training. The loss function is used to determine, given the combination of model parameter values being evaluated at a current step (where the training is a multi-step process), how closely the predicted output matches the labels in the target map. Based on how the output matches the target values (labels), the model parameter values are updated, and the model is run again with the updated model parameter values to determine whether the difference between the new predicted output (based on the updated model parameter values) is closer or not to the labels. Over the course of the training, the model parameter values are updated (thereby exploring the model parameter space) until an optimal combination of model parameter values is determined. In the case of soft labels, the loss function will be based on comparisons or determining differences to not only hard labels (ground truth measurements) but also soft labels, which themselves are guesses as to what the label for a pixel should be. That is, soft labels, which may have some inaccuracy (due to not being actual ground truth measurements), will contribute to the calculation of the loss function, and in turn guide or otherwise impact the training of the model (e.g., parameter selection).

As described above, training of the model is a multi-stage process, in which the training process iteratively steps through the parameter space to ultimately converge at a most optimal combination of parameters, where guidance in updating of the parameters is according to a loss function. The initial stages of the training process typically involve larger steps in the parameter space, while later stages of training typically involve fine tuning that is localized about a more specific region of the parameter space.

As described above, the selection of model parameters is guided by the difference between what is predicted by the model at that step, and the labels in the target map. This includes guiding model parameters based on the difference between predicted biodensity values and the labeled biodensity values in the target map accompanying the input image.

If a pixel has a ground truth label, then the predicted output for that pixel is being compared against a ground truth label, and the difference to a ground truth label is being used to guide tuning of the model (selection of the model parameters).

If a pixel has a soft label, then the predicted output for that pixel is being compared against a prior guess, and the difference to this guessed label is being used in part to guide tuning of the model.

One example optimal progression of the model training is that the model parameters are selected in earlier stages to be initially in an appropriate region of parameter values, where then fine tuning of the parameter values is performed in later stages to determine the most optimal set of parameter values. However, if there are insufficient training samples (labeled data) to learn from (e.g., sparse number of targets to compare against to determine whether the parameters are being chosen in the appropriate way), then the choice of parameter values may start, at the beginning of the training, to go in a non-optimal or wrong direction (e.g., beginning in the wrong initial parameter space, and then trying to make random adjustments while in that wrong parameter space).

In the initial stages of tuning, guiding of the parameter selection using the soft labels is beneficial in taking larger steps in the parameter space. The introduction of soft labels addresses the issue of the sparsity of labeled data to train on, and ensures that the model parameter values move toward the optimal model configuration (e.g., region of parameter space) at the beginning of the training. Without the soft labels, only a small number of differences could be calculated in the loss function and used to determine what direction to take the model parameters in. That is, the soft labels aid the initial stages of the training to guide the model parameters to roughly the optimal region in the parameter space (and away from the general space of combinations of model parameters that would be inaccurate).

After the initial region of parameter space is identified, the remainder of the training process involves fine tuning within or around the parameter space to determine the most optimal combination of model parameters. At this point, because the soft labels are prior guesses and not actual ground truth data, they may not be as instructive to learn from when determining fine tuning of model parameter values.

For example, initially, the introduction of soft labels to fill in the gaps in the ground truth data is beneficial for teaching the network about spatial context. They are beneficial in converging the model parameters towards a near final model that has taken into account spatial context (e.g., based on trying to accurately make predictions on all pixels, not only those that happened to have ground truth measurements). Towards the end of the training, where there is fine tuning based on what was learned earlier (e.g., to arrive at the near final model parameter space), the soft labels become noise. When performing more localized parameter exploration (in the region of the parameter space identified using the aid of soft labels), the soft labels, which are guesses, may be too inaccurate to facilitate convergence of the model to the final, optimal parameter values.

As described above, one example model to generate soft labels is to determine them according to cosine similarity, where the soft labels are examples of good prior guesses for pixels with no target or hard values (e.g., no corresponding GEDI measurements) in the early stages of training. However, as training progresses and the network gets better (e.g., during the later stages of the training process, where fine tuning is being performed to converge on final model parameters), these soft labels may become too noisy and may limit the performance of the network (e.g., due to overfitting, or due to the additional information for spatial context becoming lost). In some embodiments, the model training process takes into account that the soft labels being used as target values in the loss function are not ground truth measurements, and weights their contribution in the loss function accordingly.

In some embodiments, a weight schedule is used for the soft labels incorporated into the loss function (which in turn impacts how deviations from soft labels guide the determination of an optimal combination of model parameter values). For example, to address the issue of noise of soft labels, the dependence on differences to soft labels in guiding parameter selection is adjusted as training progresses via weighting in the loss function. As one example, the loss function is defined as:

$$L = \frac{1}{w}\sum_{i,j}(m_{i,j} + \lambda(1 - m_{i,j})) \cdot (\ln(\hat{y}_{i,j} + 1) - y_{i,j})^2$$

where $= \Sigma_{i,j} m_{i,j} + \lambda(1 - m_{i,j})$ is, for example, a normalization factor to account for the varying number of measurements in each sample. In some embodiments, due to the large range of target values, the squared error is calculated in log scale between the target values $\hat{y}_{i,j}$ and the model predictions $\hat{y}_{i,j}$. Then, in some embodiments, the weighted average over all pixels is calculated where hard labels have a weight of 1 and soft labels a weight of $\lambda$. As described above, in some embodiments, the value of $\lambda$ is adjusted during training. As one example, the default schedule is an exponential decay from a value of 1 to 1e−6 with a decay rate of −13.82/epoch. Other schedules can also be used such as linear, constant, and zero (with zero corresponding to no soft label).

In the above example, m and y are matrix representations of an image, where $m_{i,j}$ and $y_{i,j}$ refer to specific values in the respective maps. The following is an example of weighting the losses with respect to soft labels (versus hard labels). For example, consider the portion of the loss function $m_{i,j}+\lambda(1-m_{i,j})$. m in this portion of the loss function is a map that indicates which labels are hard labels, and which labels are soft labels. As one example, the matrix includes binary values, such as 1 and 0, where if an index's value is 1, then this indicates that the label for that pixel at that index is a hard label, and if the index's value is 0, then this indicates that the label for that pixel at that index is a soft label. Different weights are assigned based on the type of label at that index. For example, the loss function calculates the loss for each pixel. The pixels that have hard labels are assigned a weight of 1. The pixels that correspond to a soft label are given a weight of lambda. A loss is calculated for each pixel. Normalization is also performed to reduce or minimize the amount of variation from sample to sample, as the number of hard to soft labels changes depending on the sample. The parameter lambda is used to take into account the distinction between soft and hard labels during training.

By assigning a lower weight to soft labels in the loss function (as compared to hard labels), even if the model's predicted output deviates from the soft label value, then the impact of that calculated loss is less severe. That is, the updating of the model weights (examples of model parameter weights) is less affected by the model incorrectly predicting soft labels versus hard labels. On the other hand, if model output with respect to hard labels is incorrect, then this has a greater impact on the updating of the model weights than if the soft labels were incorrect. In some embodiments, giving both hard labels and soft labels equal weights at the beginning of training guides the model in the correct direction. At later stages of training, where the potential inaccuracy of the soft labels may negatively impact the fine tuning of the parameter models, the soft labels are made less relevant by reducing their weight (lambda factor). For example, setting lambda to zero corresponds to only using losses relative to hard labels to determine updates to the model parameters. In some embodiments, this is done during fine tuning, where at the same time that the soft label weight is decreased, the learning rate is also decreased. At the end of the model training, the soft labels no longer contribute to determining how the model parameters are to be updated (for example by setting lambda to zero), and only the hard labels are used to determine the final combination of parameter values.

As described above, various schedules may be used for the weighting of soft label contributions in the loss function over the course of the training process. In some embodiments, the lambda value remains constant throughout training. For example, soft labels are given a smaller weight than hard labels that are kept constant throughout training. In this way, exploration of the optimal model parameter values is guided more by losses calculated with respect to hard labels, while still attempting to get soft labels correct. However, the impact of not matching soft labels is smaller, while still being taken into account.

In other embodiments, the parameter lambda is varied over the course of training. For example, the weighting of soft labels is reduced as the training progresses. For example, the weighting of soft labels is decreased linearly from a starting value (e.g., of one) to zero. The decrease in lambda may also be exponentially decayed, as described above.

In the example of exponentially decaying lambda, hard labels and soft labels are treated equally at the beginning of training (where they contribute to the loss function in the same way), so that the soft labels can aid in allowing spatial context to be taken into account when taking larger steps in the parameter space during the earlier stages of training. During later stages of training, where fine tuning is occurring, and the soft labels may no longer be beneficial for training, but be noisy, the contribution of soft labels (which are guesses, and are not ground truth, and are not necessarily what the correct value for a pixel should actually be) is reduced as compared to hard labels. If, as the model improves its predictive ability over the course of training, the weight of the soft labels is not adjusted (e.g., is treated the same as a hard label throughout the entire training process), then the model becomes limited by the noise or inaccuracy of the soft labels.

As shown in this example, the contribution of deviations between model predicted values and soft label target values is weighted differently in the loss function, as compared to hard labels. The contribution of soft labels to the loss function is adjustable via adjustment of the lambda factor. In some embodiments, to determine which labels are hard labels and which labels are soft labels, the training engine is provided a map that indicates, for a given index in the continuous target map, where the label at that index is a hard label or a soft label. The training engine then determines the appropriate lambda value to apply given the type of the label. Further, in some embodiments, for a label that is determined to be a soft label, the training engine further determines the lambda value based on a stage of the training process. In some embodiments, after the generally appropriate parameter space has been identified, the lambda factor for soft labels is ramped downwards, reducing their impact on determining or influencing the next step or change or update in parameter values. As shown in this example, the lambda factor or the impact of the soft labels when making evaluations in the loss function is adjusted over the course of training the machine learning model.

In this way, the soft labels have facilitated guiding the training of the model to an appropriate parameter space. Fine tuning within that general parameter space is then performed (e.g., based on smaller and smaller steps or deviations in the parameter space), where the fine tuning of model parameters is impacted primarily by the ground truth labels (as they are likely to be more accurate than the soft labels).

That is, the training process involves exploring the parameter space (e.g., all of the possible combinations of model parameter values) to ultimately determine an optimal combination of parameter values (optimal based on minimizing differences between predictions and target labels). The exploration of the parameter space is performed over multiple updates to the model parameters, where the updates are determined based on calculation of the loss function. The soft labels are used to determine large steps or changes in parameter values to identify the generally appropriate region of the parameter space that the optimal parameters are likely to be in. When performing smaller and smaller steps within the parameter space identified using the soft labels, the fine tuning is based on the actual ground truth labels, and the impact of the soft labels is minimized during these later stages of the training. The contribution of soft labels to the loss function is adjusted based on the stage of training being performed. By the end of the training process, an optimal set of parameter values has been converged on. As described in the examples of above, the soft labels are used to facilitate taking of relatively large steps in the parameter space to determine an optimal region. As the training converges on the optimal model (by changing the parameter values and smaller steps), more attention is paid to the hard labels than the soft labels in the loss function.

For example, in some embodiments, the model is guided, at the beginning of the training process, to minimize losses with respect to both hard and soft labels (e.g., to correctly predict both hard and soft labels). As the training progresses, and a region of parameter space to more finely search within has been identified (e.g., the direction in the parameter space to explore, based on, for example, gradient descents), the soft labels are weighted less and less. The model then focuses primarily on the hard labels. This is accomplished by exponentially decaying or otherwise reducing the soft label weights in the loss function. At the end of the training process, for example, only the hard labels contribute to the loss function, such that the later stages of the training are primarily guided by comparisons of model predictions to hard labels in the loss function.

The following are further embodiments of weighting the contribution of soft labels in the model training process. In some embodiments, the lambda factor is adjusted each iteration of a forward and then backward pass. There is a continuous adjustment base in some embodiments. In some embodiments, the lambda parameter is adjusted as a function of the step in the training (e.g., decrease in lambda as the number of steps that have been performed in the training process increases). In some embodiments, each step corresponds to a batch.

As one example, a batch size includes 128 samples. The model evaluates 128 samples, then calculates a loss using the current value of lambda for that step. The parameters are then adjusted based on the calculated loss. The training then proceeds to the next step or stage. At the next step, the lambda factor is adjusted (according to the step count) to be smaller, for example. The next 128 samples are taken, and the process is repeated, with the loss calculated with the reduced lambda weight. In this example, each step corresponds to evaluation of 128 samples, determining a loss, and then determining an update to the model parameters for the next step. For example, with the total number of samples in the entire training set being much larger than 128, a forward pass with 128 samples is performed, where at a given step, the loss calculation is based on evaluation of 128 training samples at a time. The weights of the model are then adjusted, and another forward pass with another 128 samples is performed.

With respect to batching, suppose one set or combination of model parameter values is used. The model is run using this combination of model parameter values. The loss function is executed to determine the differences between the model predictions and the corresponding target values in the target map (e.g., based on a pixel-by-pixel calculation of difference between the predicted value and the target values for each pixel).

A step is then taken in changing the combination of parameter values to see if this reduces the loss and improves the model's accuracy. Sufficient data samples (e.g., batch size) should be available so that the comparison of the model output and the corresponding target map (the target that the model is being trained to reach with its predictions) is able to guide the selection of parameter values. There should be sufficient samples in the batch size so that enough comparisons can be determined (where a comparison cannot be made if there is no label in the target map to compare the predicted output against), as each individual sample can be noisy. The batch size determines the number of comparisons that are made before another iteration of changing parameter values is performed, and another step is taken. When the next step in adjusting the parameters in the model is taken, there is a higher confidence that the manner in which the parameter values are being changed or updated is in an optimal direction (e.g., according to calculating model gradients in the model space).

Multiple models may be trained with embodiments of the techniques described herein variously adapted to accommodate for various use cases where, for example, Sentinel-2 imagery at 10 m resolution or Landsat at 30 m resolution is used.

In various embodiments, using a platform such as platform 3000, the models can be deployed at scale in various regions across the globe. For example, the models may be deployed over regions such as SE Asia, West Africa, Brazil, Argentina and the contiguous United States.

Estimation models tuned or deployed for various regions may be generated. In various embodiments, expanding into a new region includes querying GEDI data in that region, tuning a regionally specific model, and deploying it in the new area. The GEDI data set is an ideal training set, as there are billions of GEDI measurements that can be used as training data.

Estimating Biomass Density

The estimation models trained using the techniques described above (e.g., using target maps that are made continuous by introducing soft labels) may then be used to make various predictions, such as estimations of biomass density, given an input satellite image. For example, a trained model takes as input unlabeled 6-band imagery, and outputs a map of predicted biomass density labels. That is, the trained models described take a satellite image as input, and predict aboveground biomass as an output. As one example, suppose an input image that is multispectral that includes 6-band imagery (RGB, and three thermal bands—near infrared (NIR), SWIR-1 (short-wave infrared), SWIR-2). This input image is put into a trained, fully spatial model that is configured to predict a biomass value for each pixel in the input image. The output of the model is a continuous map of biomass values. For example, for each pixel of the input image, a corresponding biomass value is estimated for a given pixel. Once the model is trained, every time a new satellite image comes in, a new estimate of biomass can be produced.

Embodiments of the biomass estimation techniques described herein may be used to estimate and monitor biomass using remote sensing data at a global scale, at as high a resolution as possible.

In various embodiments, the biomass estimation models described herein provide estimates of current biomass stocks in natural systems (e.g., forests, savannas, grasslands), historical baselines and time series, and facilitate monitoring changes over time.

The following are various embodiments of applications for predicting values using models trained using soft labels.

Supporting Workflows Utilizing Forest Carbon Estimation

Various entities in several segments have a need for forest carbon estimation. Some of these example uses are:
   Carbon credit project prospecting
   Carbon credit project estimation
   Carbon credit monitoring
   Scope 3 supply chain monitoring
   Organizational GHG insetting activities The techniques described herein provide an efficient way to generate this metric for the example workflows listed above, as well as other workflows. Existing traditional approaches have required costly on-site visits to assess carbon. Additionally, these visits have to be executed periodically to ensure carbon changes are accounted for. The forest carbon estimation techniques described herein circumvent this step and allow the users to focus on other aspects of carbon project and supply chain management.

Historical Biomass Prediction

In some embodiments, when training the model, current present-day biomass data from GEDI is used. The model is trained using the present-day label data and corresponding present-day satellite imagery.

Not only can present-day satellite imagery be fed as input to the trained model, but past, historical satellite imagery (e.g., 6-band imagery) may also be input into the trained model. The trained model then generates biomass density predictions for the historical satellite imagery.

This provides a way to measure or predict biomass density in the past, where direct measurements may not have been taken. This allows a history of biomass densities to be built up, with changes over time in biomass density being observable.

For example, GEDI data is not only sparsely sampled spatially, as described above, but also temporally. For example, for an area of interest, ground truth measurements may have only been taken sporadically, over time.

On the other hand, the spatial and temporal coverage of satellite imagery is typically robust. For example, as described above, in addition to having wide spatial coverage, datasets such as Landsat imagery also have wide temporal coverage, with decades of historical images that can be fed as input to the model. In this way, the input data to the model is available in the past. The spatial and temporal coverage of the satellite imagery can be leveraged, by using the model described herein, to also provide improved spatial and temporal coverage of measurements, despite sparsity of direct measurements.

The following are examples of applying predictive models (developed using present-day training data) to historical data.

Crop Yield: As one example, the techniques described herein may be used to model crop yield using yield data from the recent past, then apply to historical records of data to create long historical baselines of yield.
   Tree cover: As another example, tree cover is modeled using present data from the recent GEDI satellite. The model is then applied to historical data from before when the satellite existed.
   Biodiversity: As another example, recent field measurements are used to correlate to remote-sensed data, where the models are then applied to historical data to estimate biodiversity over time.
   Pollution monitoring: As another example, present-day pollution measurements around industrial facilities are used, where these measurements are correlated to observables with a historical record, and the model is then applied to the historical data to produce a modeled pollution record over time.

Soil Properties Estimation

While prediction of biomass density was described herein for illustrative purposes, the techniques described herein may be used to predict other types of data that is typically sparsely directly measured. Soil measurements are another example of sparsely sampled data, and the techniques described herein may be variously adapted to fill in the gaps in soil properties estimation.

For example, high-fidelity soil properties require intensive on-ground point measurements. This results in a dataset of highly accurate measurements, however, these are sampled at single points distributed over large areas of interest. It is valuable to model soil properties continuously across agricultural and natural systems.

In various embodiments, the techniques described above may be variously adapted to accommodate this use-case. For example, in some embodiments, soft labels are created based on data similarity to the data over the on-ground samples, then the neural net models are trained against continuous target label maps that include both soft and hard labels, and the training is completed by adjusting model weights as the training progresses.

Soft Label Augmentation to Human Labeling

The embodiments of soft-labeling described herein may be used in processes of annotations, where, for example, a human labels a small set of pixels, then soft labels are generated for every pixel in each image (e.g., spectral similarity, or a random-forest classifier model). In some embodiments, the resulting full-coverage label maps with both soft and hard labels that are then used to train the final model.

Additional Embodiments of Generating Soft Labels

The following are alternative embodiments of generating soft labels.

Generating Soft Labels Using Machine Learning

In the above examples, similarity (e.g., spectral similarity as defined using cosine similarity) of the input pixels was used to generate soft labels. The following are alternative embodiments of determining soft labels. In some embodiments, machine learning models or networks are used that take the input image and propose soft labels. The use of machine learning to determine soft labels allows for more accurate soft labels to be generated.

As one example, a student-teacher setup is utilized that is adapted for segmentation tasks. This setup is usable in cases where only a small fraction of data is labeled, and pseudo labels (soft labels) are to be generated. The following are embodiments of using a student-teacher model setup to determine soft labels.

In this example, two models of the same architecture are utilized. For example, two convolutional neural networks, such as that described above, are used. The first model, referred to in this example as the "teacher" model, is trained using samples with target maps that include soft labels, where, for bootstrapping, those soft labels at the initial state are generated, for example, using spectral similarity, as described above (this may be done because in the beginning, there is not yet a model that can actually produce soft labels yet).

In this example, the teacher model is not trained to the end. It is trained for a number of epochs, where every training sample in the training set is gone through once. The model having gone through all of the training samples once is one example definition of an epoch. If the model goes through all of the training samples a second time, then the model has been trained for two epochs. Typically, the model is trained for multiple epochs, such as 100 epochs.

In this example, the teacher model is partially trained for up to some number of epochs, such as five epochs, or any number of epochs as appropriate (and is not trained to convergence). The teacher model is then in a certain state (e.g., the parameter values have been updated to a certain state at this stage of training).

The partially trained teacher model is then used to predict labels for a sample 6-band input image. This results in an output map of predicted labels. This predicted output map is then used to generate a new target map of labels for the input image. For example, the hard labels are kept. The gaps that are the pixels with unattached ground truth data are filled with the labels predicted by the partially trained teacher model as soft labels. That is, the partially trained teacher model has already undergone some amount of training or learning to predict the biomass density for each pixel. That partially trained model may then be used to make a prediction for those pixels that do not have hard ground truth data.

The second model, referred to in this example as the "student" network is then trained from the beginning, this time using samples that are pairs of input images and target maps, where the target map includes the hard data from GEDI, and the soft labels generated using the partially trained teacher model. That is, the hard labels are combined with soft labels that have been generated using the partially trained teacher model.

In some embodiments, the student model is trained up until the point where it is in the same condition as the teacher model, and then trained further, such that the student model has now surpassed the teacher model with respect to training. The student-teacher model is effective, as even though the soft labels are not "true" information, there are still hard labels to learn from. The student may then be trained further (e.g., more epochs) using the teacher model-generated soft labels and the hard labels. The student becomes better (more accurate, or with less loss according to the loss function) than the teacher at predicting values, and then the roles of the student and teacher models are swapped.

For example, the student becomes the teacher, generating soft labels, and informs the previous teacher model to continue training past the student model. In this case, when the teacher model is first run for some number of epochs, the largest steps in exploring the model parameter space are likely to have been taken. Fine tuning is then performed for the models in the later stages.

In embodiments of utilizing cosine similarity, as described above, to generate soft labels, each epoch is run on the same samples of combination of input image and soft labels, where soft labels are the same across all epochs because they are based on cosine similarity between pixels in the image.

On the other hand, by using models such as that described herein to predict soft labels, the training data evolves, as the soft labels are no longer based on the cosine similarity, but are being generated by a model, which is trained to generate more accurate soft labels. The use of models that are being updated over time effectively results in new samples being generated (new soft labels to train on for some set of epochs). For example, by using embodiments of the student teacher model described herein, where training takes numerous epochs, training data is generated where the soft labels are not fixed for every epoch. Instead, they are updated as well from one epoch to the next by predicted using models that are in turn being updated over the course of training. For example, for the same image tile, soft labels that are updated over time to be increasingly more accurate may be used for training (where the soft labels for the image tile are not static over the course of training).

In the end, both student teacher models (which are both CNNs) will converge after some number of epochs. Either can be used as a trained model for predicting labels for other input images.

The use of such a neural network-based model approach to predict soft labels provides various benefits. By using a model such as that described herein to determine soft labels, more information about the pixels in the input image is extracted to propose soft labels. As shown in the embodiments described herein, in a two model approach, one model predicts soft labels from the input, and then informs the other model to use both that information, as well as the hard labels, where the two models then exchange information.

The two-model approach allows for the spatial context to be taken into consideration when predicting soft labels. This is in contrast to determining spectral similarity based on only one pixel compared to another pixel. For example, the machine learning approach will take the entire input image (including spatial context of all of the pixels) into account when predicting an output.

The lambda factor described above may be utilized to weight the contribution of soft labels versus hard labels. In some embodiments, the selection of the lambda factor is based on the type or manner in which the soft labels were generated.

The following are embodiments of integrating model-generated soft labels into training of a CNN model (in a student teacher setup), while accounting for soft labels in loss functions.

As described above, in some embodiments, to bootstrap initial training of the teacher model, spectral similarity is used to determine soft labels for training samples. This allows earlier stage training of the teacher model so that the largest steps in the parameter space are taken, and guided in the appropriate direction. The teacher model is then used to predict new soft labels for the training samples. The student model is then trained from the outset using the training sample images paired with target maps that include the model-predicted soft labels. After the student model is trained for some number of epochs, the roles of the two models are reversed. The updated model (with more optimal model parameters after training) is used to determine new soft labels for the input images (going through them all over again in new epochs), and provides those new predicted target values for soft labels to the other model, where that model is trained for some number of epochs to improve or otherwise optimally tune its model parameters. In each swap of the teacher and student (taking turns training and generating soft labels for the others' training), the way soft labels are predicted is updated. Because one of the models is trained to do its job, then that model is used to predict the soft labels. In each iteration, improved soft labels are predicted or generated for use as target maps for image tiles.

In the end, both networks will converge and be (substantially) the same. For example, both models are trained in the above way (with each determining soft labels for training the other model, and swapping roles after training for a number of epochs) for hundreds of epochs overall. For example, each model is trained until the loss function does not decrease further (or according to a gradient), or if overfitting begins to occur on the training set. The hard labels will inform the model in optimization, until a level is reached in which nothing further is learned (i.e., the model training has converged). At this point of the dual model training, the teacher will predict what the student model would also predict as labels. Either network can then be used to predict labels given an arbitrary input (e.g., 6-band image).

With the model-predicted soft labels, the soft labels used as target values will be less noisy (as compared to if they were determined using cosine similarity, for example). In some embodiments, as the soft labels may be more accurate, the soft labels need not be decayed over the course of the training. They may still be weighted differently from hard labels, as they are still not the same ground truth measurements, and may be weighted less than the ground truth measurements in the loss function. However, because they are less noisy and more accurately predicted using the model, they need not be decayed during the fine tuning of the model. Other strategies for setting lambda for soft labels may be utilized.

In the example of using cosine similarity, the soft label maps for the training input data are fixed. When using the two model approach, improved (more accurate) soft labels are predicted or produced as the teacher and student models iteratively swap (where they are updating the way the soft labels are predicted). That is, rather than the soft label predictions being the same or static for a given image tile, they improve over time. Thus, in the two-model approach, lambda can be set higher, rather than decaying the lambda factor. In this example, the hard labels are still provided more weight, as they are the ground truth. Having the hard labels have a higher weight biases the model to learn more from hard labels than soft labels.

Figure 33:
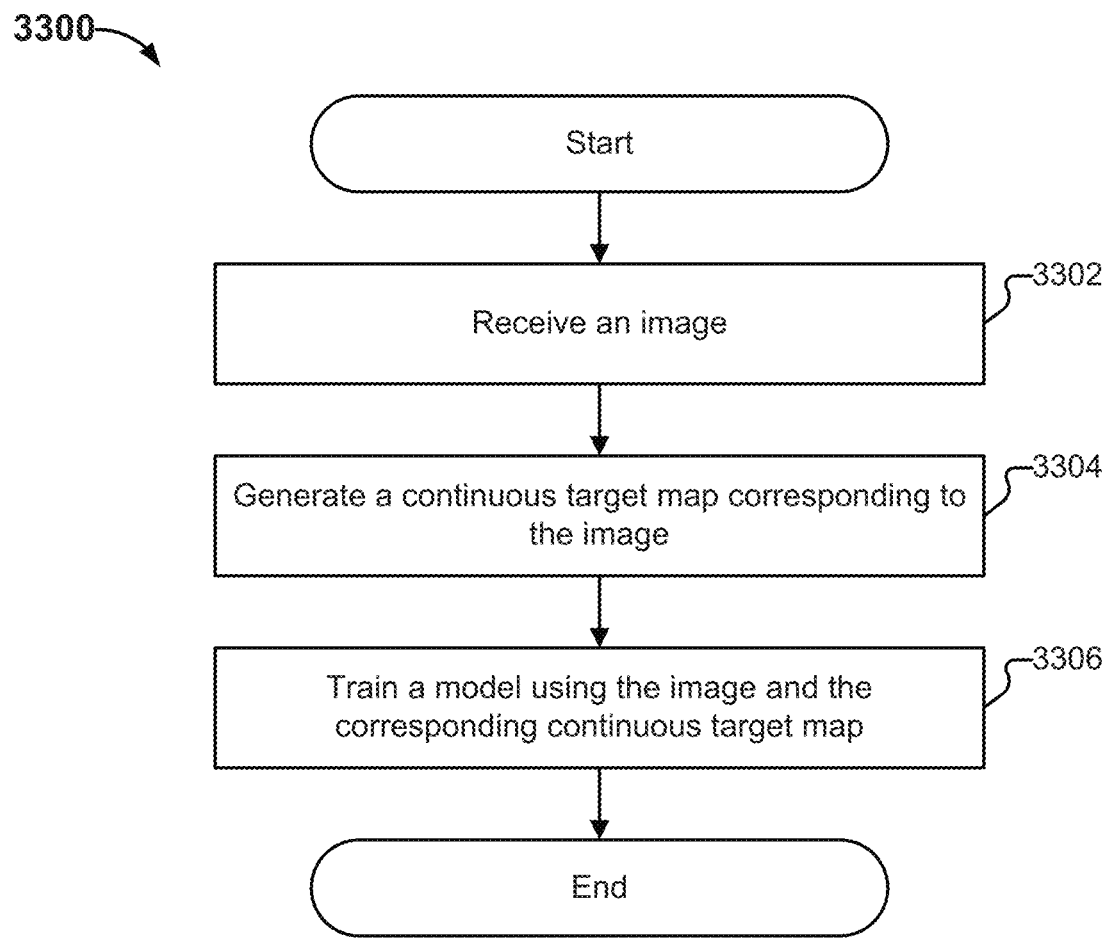
FIG. 33 is a flow diagram illustrating an embodiment of a process for training a model.

FIG. 33 is a flow diagram illustrating an embodiment of a process for training a model. In some embodiments, process 3300 is executed by platform 3000 of FIG. 30. The process begins at 3302 when an image is received. At 3304, a continuous target map corresponding to the image is generated. At 3306, a model is trained using the image and the corresponding continuous target map.

Figure 34:
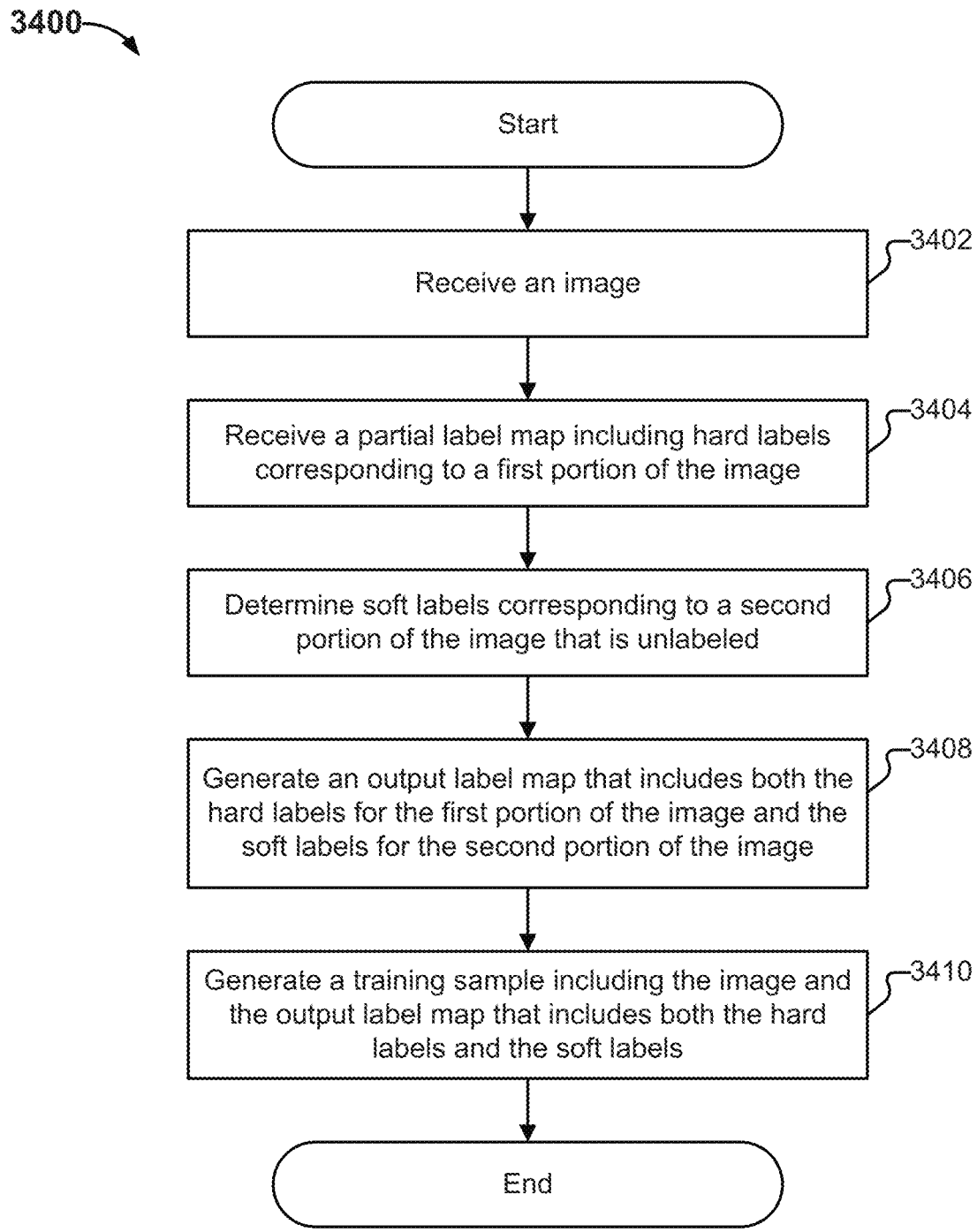
FIG. 34 is a flow diagram illustrating an embodiment of a process for training a model using soft labels.

FIG. 34 is a flow diagram illustrating an embodiment of a process for training a model using soft labels. In some embodiments, process 3400 is executed by platform 3000 of FIG. 30. In some embodiments, process 3400 is used to implement steps 3302 and 3304 of process 3300 of FIG. 33. The process begins at 3402 when an image is received.

At 3404, a partial label map including hard labels corresponding to a first portion of an image is received.

At 3406, soft labels corresponding to a second portion of the image that is unlabeled are determined. In some embodiments, soft labels are predicted based on hard labels and properties or characteristics or features of the input image. As described above, the soft labels may be predicted or otherwise generated in a variety of ways. As one example, similarity of an unlabeled pixel to a labeled pixel (e.g., spectral similarity) is used to predict a soft label for a pixel that is unattached with ground truth measurements. As another example, a model, such as a CNN is used that takes into account pixel features to determine soft labels.

At 3408, an output label map that includes both the hard labels for the first portion of the image and the soft labels for the second portion of the image is generated. The output label map that includes both hard labels and soft labels is an example of the continuous target map at step 3304 of process 3300.

At 3410, a training sample including the image and the output label map that includes both the hard labels and the soft labels is generated. The training sample is then used to train an estimation model, such as at step 3306 of process 3300.

Figure 35:
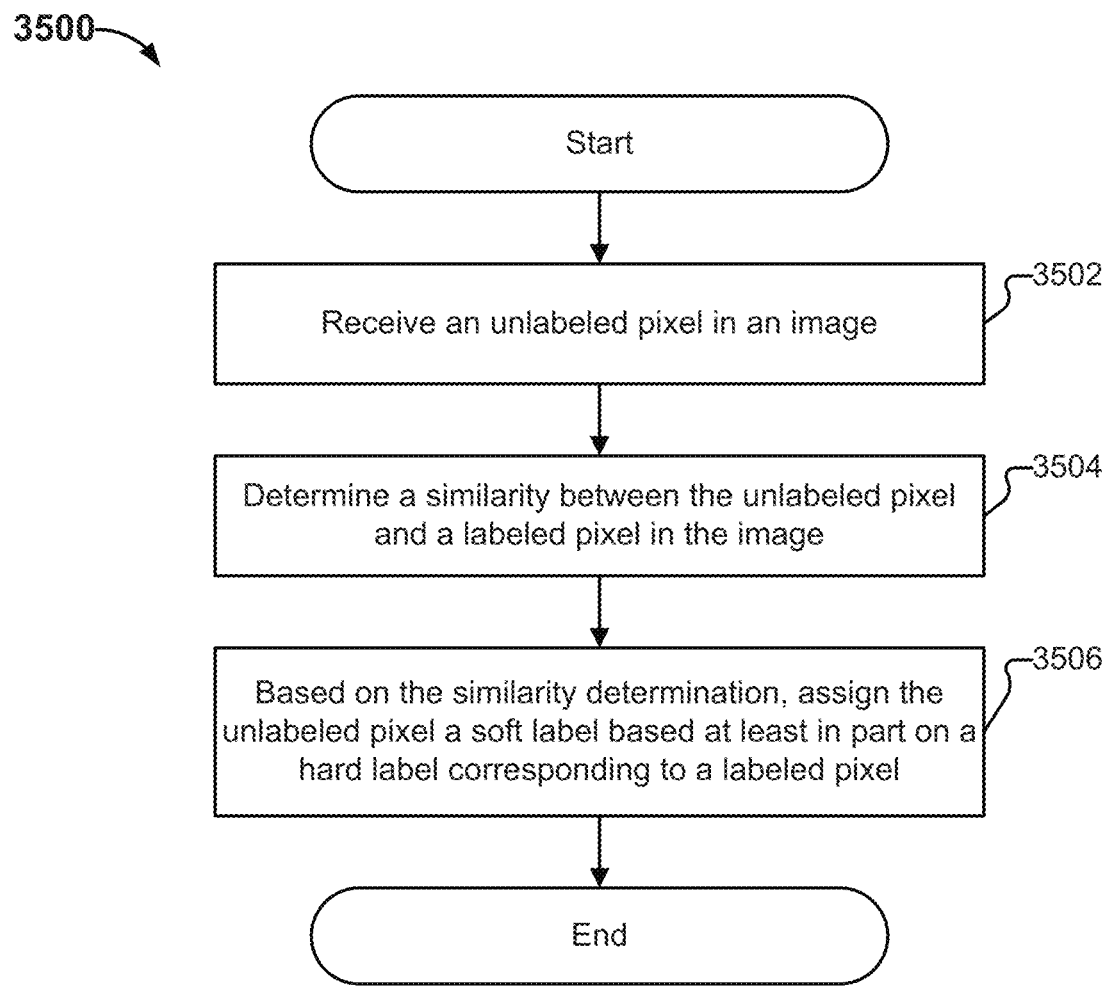
FIG. 35 illustrates an embodiment of a process for generating soft labels.

FIG. 35 illustrates an embodiment of a process for generating soft labels. In some embodiments, process 3500 is executed by platform 3000 of FIG. 30. In some embodiments, process 3500 is used to implement step 3406 of process 3400 of FIG. 34. In some embodiments, the process begins at 3502 when an unlabeled pixel in an image is received.

At 3504, a similarity between the unlabeled pixel and a labeled pixel in the image is determined. As described above, spectral similarity is one example way of determining similarity between two pixels. In some embodiments, the spectral similarity is determined by calculating cosine similarity.

At 3506, based on the similarity determination, the unlabeled pixel is assigned a soft label based at least in part on a hard label corresponding to a labeled pixel.

Figure 36:
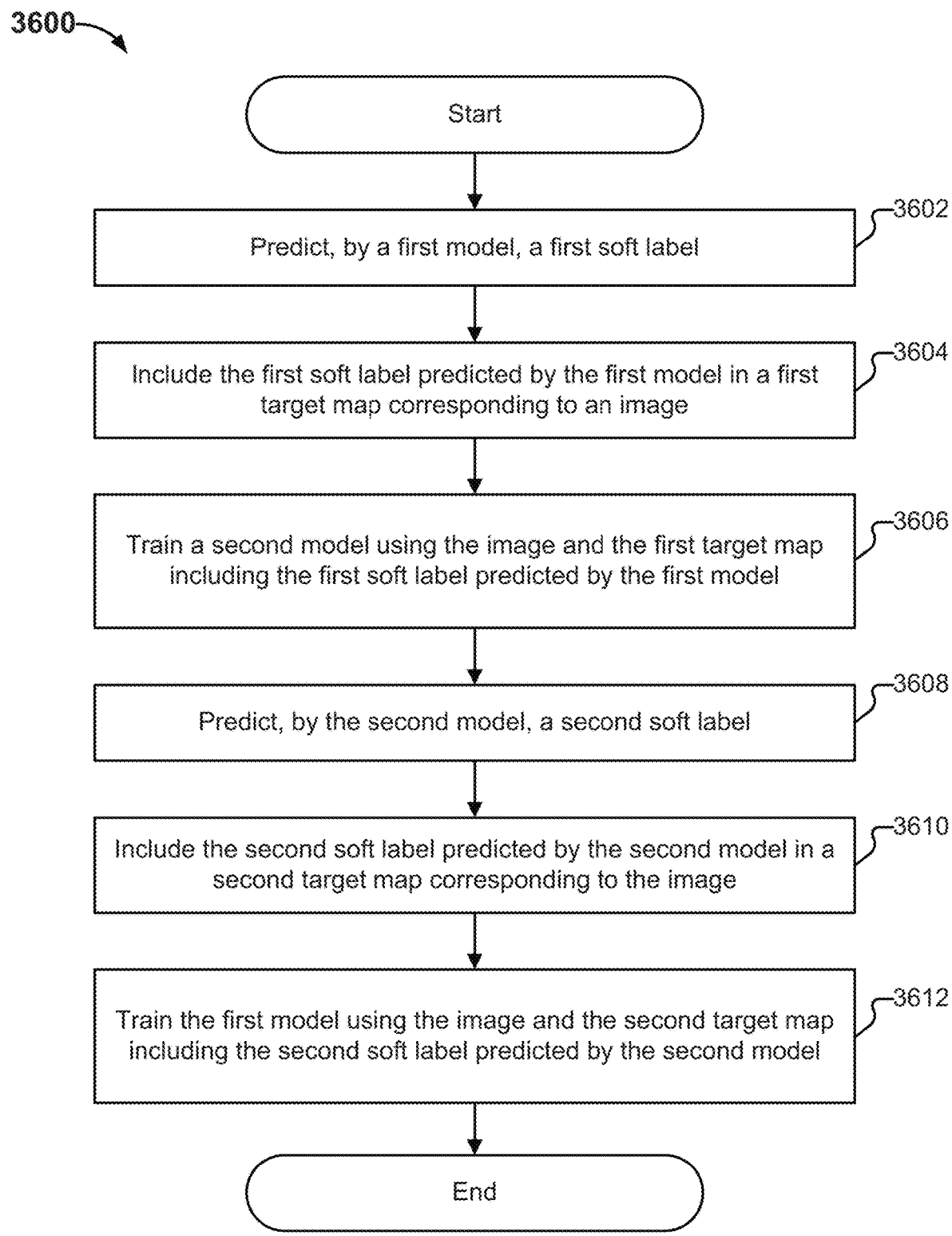
FIG. 36 illustrates an embodiment of a process for generating soft labels.

FIG. 36 illustrates an embodiment of a process for generating soft labels. In some embodiments, process 3600 is executed by platform 3000 of FIG. 30. In some embodiments, process 3600 is used to implement step 3406 of process 3400 of FIG. 34. In some embodiments, the process begins at 3602 when a first soft label is predicted by a first model. In some embodiments, the first model is a partially trained model. For example, the first model is one of a student model or teacher model in a student-teacher model framework.

At 3604, the first soft label predicted by the first model is included in a first target map corresponding to an image.

At 3606, a second model is trained using the image and the first target map including the first soft label predicted by the first model. For example, the second model is trained partially (e.g., for a number of epochs, but not to convergence).

At 3608, a second soft label is predicted by the second model.

At 3610, the second soft label predicted by the second model is included in a second target map corresponding to the image.

At 3612, the first model is trained using the image and the second target map including the second soft label predicted by the second model. For example, training of the partially trained first model is continued. In some embodiments, process 3600 is repeated, with the two models swapping roles (of predicting soft labels for training the other model, and being trained using the soft labels of the other model) until completion of training (e.g., convergence of one or both models).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive an image comprising a plurality of pixels;
receive a partial label map including hard labels corresponding to a first subset of pixels of the image;
determine soft labels corresponding to a second subset of pixels of the image that is unlabeled, wherein determining a soft label for an unlabeled pixel in the second subset of pixels of the image comprises comparing a set of characteristics of the unlabeled pixel against a set of characteristics of a labeled pixel in the first subset of pixels of the image;
generate an output label map that includes both the hard labels included in the partial label map corresponding to the first subset of pixels of the image and the soft labels determined for the second subset of pixels of the image; and
train a model using both the image and the output label map that includes both the hard labels and the soft labels; and
a memory coupled to the processor and configured to provide the processor with instructions.

2. The system of claim 1, wherein the soft label for the unlabeled pixel is determined based at least in part on a determined similarity of the unlabeled pixel to the labeled pixel in the first subset of pixels of the image.

3. The system of claim 2, wherein a corresponding hard label of the labeled pixel is assigned as the soft label for the unlabeled pixel.

4. The system of claim 2, wherein the similarity is determined based at least in part on a determined spectral similarity.

5. The system of claim 4, wherein the spectral similarity is determined based at least in part on a cosine similarity.

6. The system of claim 1, wherein the image comprises a multi-band satellite image.

7. The system of claim 1, wherein during training of the model, a weight is applied to a contribution of the soft label in a loss function.

8. The system of claim 7, wherein the weight applied to the contribution of the soft label in the loss function is different from a weight applied to a contribution of a hard label in the loss function.

9. The system of claim 7, wherein the weight applied to the contribution of the soft label is adjusted based at least in part on a stage of the training.

10. A method, comprising:
receiving an image comprising a plurality of pixels;
receiving a partial label map including hard labels corresponding to a first subset of pixels of the image;
determining soft labels corresponding to a second subset of pixels of the image that is unlabeled, wherein determining a soft label for an unlabeled pixel in the second subset of pixels of the image comprises comparing a set of characteristics of the unlabeled pixel against a set of characteristics of a labeled pixel in the first subset of pixels of the image;
generating an output label map that includes both the hard labels included in the partial label map corresponding to the first subset of pixels of the image and the soft labels determined for the second subset of pixels of the image; and
training a model using both the image and the output label map that includes both the hard labels and the soft labels.

11. The method of claim 10, wherein the soft label for the unlabeled pixel is determined based at least in part on a determined similarity of the unlabeled pixel to the labeled pixel in the first subset of pixels of the image.

12. The method of claim 11, wherein a corresponding hard label of the labeled pixel is assigned as the soft label for the unlabeled pixel.

13. The method of claim 11, wherein the similarity is determined based at least in part on a determined spectral similarity.

14. The method of claim 13, wherein the spectral similarity is determined based at least in part on a cosine similarity.

15. The method of claim 10, wherein the image comprises a multi-band satellite image.

16. The method of claim 10, wherein during training of the model, a weight is applied to a contribution of the soft label in a loss function.

17. The method of claim 16, wherein the weight applied to the contribution of the soft label in the loss function is different from a weight applied to a contribution of a hard label in the loss function.

18. The method of claim 16, wherein the weight applied to the contribution of the soft label is adjusted based at least in part on a stage of the training.

19. A computer program product embodied in a non-transitory computer readable medium and comprising computer instructions for:
  receiving an image comprising a plurality of pixels;
  receiving a partial label map including hard labels corresponding to a first subset of pixels of the image;
  determining soft labels corresponding to a second subset of pixels of the image that is unlabeled, wherein determining a soft label for an unlabeled pixel in the second subset of pixels of the image comprises comparing a set of characteristics of the unlabeled pixel against a set of characteristics of a labeled pixel in the first subset of pixels of the image;
  generating an output label map that includes both the hard labels included in the partial label map corresponding to the first subset of pixels of the image and the soft labels determined for the second subset of pixels of the image; and
  training a model using both the image and the output label map that includes both the hard labels and the soft labels.

* * * * *